(12) United States Patent
Pavlichenko et al.

(10) Patent No.: US 12,332,165 B2
(45) Date of Patent: Jun. 17, 2025

(54) VOLATILE LIQUID ANALYSIS

(71) Applicant: President and Fellows of Harvard College, Cambridge, MA (US)

(72) Inventors: Ida Pavlichenko, Watertown, MA (US); Elijah Shirman, Arlington, MA (US); Sören Brandt, Somerville, MA (US); Timothy Sheung Bun Wong, Richmond Hill (CA); Austin Tripp, North York (CA); Joanna Aizenberg, Boston, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 779 days.

(21) Appl. No.: 17/054,868

(22) PCT Filed: May 16, 2019

(86) PCT No.: PCT/US2019/032739
§ 371 (c)(1),
(2) Date: Nov. 12, 2020

(87) PCT Pub. No.: WO2019/222548
PCT Pub. Date: Nov. 21, 2019

(65) Prior Publication Data
US 2021/0231558 A1    Jul. 29, 2021

Related U.S. Application Data

(60) Provisional application No. 62/672,352, filed on May 16, 2018.

(51) Int. Cl.
*G01N 21/31* (2006.01)
*G01N 21/41* (2006.01)
*G06N 3/08* (2023.01)

(52) U.S. Cl.
CPC ............. *G01N 21/31* (2013.01); *G01N 21/41* (2013.01); *G06N 3/08* (2013.01)

(58) Field of Classification Search
None
See application file for complete search history.

(56) References Cited

U.S. PATENT DOCUMENTS

| 4,912,051 A | 3/1990 | Zaromb |
|---|---|---|
| 6,125,687 A | 10/2000 | McClelland et al. |

(Continued)

FOREIGN PATENT DOCUMENTS

| WO | WO-2007/138506 A1 | 12/2007 |
|---|---|---|
| WO | WO-2016/040616 A1 | 3/2016 |

OTHER PUBLICATIONS

Angelome et al., "Monitoring Solvent Evaporation from Thin Films by Localized Surface Plasmon Resonance Shifts," J. Phys. Chem. C, Oct. 7, 2010, vol. 114, pp. 18379-18383.

(Continued)

*Primary Examiner* — Matthew G Marini
(74) *Attorney, Agent, or Firm* — Wilmer Cutler Pickering Hale and Dorr LLP

(57) ABSTRACT

A method for analyzing a volatile liquid mixture is described. The method includes providing a sensor, and placing the sensor within a chamber. The mixture is stored in the chamber for a duration sufficient to achieve a series of dynamic non-equilibrium mass-transfer processes: (1) spreading and wetting of the analyte on at least a portion of the bottom-inside surface of the chamber from the source of the injection, (2) evaporation of at least a portion of the analyte liquid into a vaporized analyte, (3) convection and/or diffusion of the vaporized analyte through the chamber to the sensor, and (4) sorption of the vaporized analyte on the sensor. The sensor detects, over time, a plurality of non-equilibrium spectral responses, each corresponding to at (Continued)

least one compositional change in the analyte liquid. The method further includes machine learning algorithms to measure or predict the compositional change and/or presence of contaminants.

28 Claims, 66 Drawing Sheets

(56) References Cited

U.S. PATENT DOCUMENTS

| | | | | |
|---|---|---|---|---|
| 6,759,010 | B2* | 7/2004 | Lewis | G01N 15/0826 |
| | | | | 73/23.3 |
| 7,229,593 | B1* | 6/2007 | Ho | G01N 13/00 |
| | | | | 73/1.01 |
| 8,480,955 | B2 | 7/2013 | Yaghi et al. | |
| 8,735,161 | B2 | 5/2014 | Yaghi et al. | |
| 8,861,072 | B2 | 10/2014 | Arsenault et al. | |
| 9,213,000 | B2* | 12/2015 | Ozin | G01N 21/7703 |
| 9,595,894 | B2 | 3/2017 | Wang et al. | |
| 2012/0113421 | A1 | 5/2012 | Vignoud et al. | |
| 2013/0217110 | A1* | 8/2013 | Ootani | C12Q 1/00 |
| | | | | 435/283.1 |
| 2018/0042582 | A1 | 2/2018 | Pringle et al. | |

OTHER PUBLICATIONS

Ash et al., "Diffusion in multiple laminates," Brit. J. Appl. Phys., Jun. 1, 1965, vol. 16, pp. 873-884.

Chen et al., "Diffusion Lag Time for Multiple and Periodic Laminates," Chemical Engineering Communications, (1991), vol. 109, pp. 195-207. 14 pages.

Colodrero et al., "Response of Nanoparticle-Based One-Dimensional Photonic Crystals to Ambient Vapor Pressure," Langmuir, Jul. 17, 2008, vol. 24, pp. 9135-9139.

Condon, "Surface Area and Porosity Determinations by Physisorption. Measurements and Theory," Elsevier, Amsterdam, first edition, Jul. 21, 2006. 297 pages.

Exner et al., "A step towards the electrophotonic nose: integrating 1D photonic crystals with organic light-emitting diodes and photodetectors," Laser & Photonics Reviews, published online Jun. 11, 2014, vol. 8(5), pp. 726-733.

Fuertes et al., "Sorption Properties of Mesoporous Multilayer Thin Films," The Journal of Physical Chemistry C: Letters, published online Feb. 13, 2008, vol. 112, pp. 3157-3163.

Gemici et al., "Targeted Functionalization of Nanoparticle Thin Films via Capillary Condensation," Nano Letters, published on web Feb. 16, 2009, vol. 9, No. 3, pp. 1064-1070.

Goodwin et al., "Characterization of the Evaporation Rates of Complex Hydrocarbon Mixtures Under Environmental Conditions," The Canadian Journal of Chemical Engineering, Aug. 1976, vol. 54, pp. 290-294.

International Search Report and Written Opinion mailed Jul. 19, 2019, in the International Application No. PCT/US2019/032739. 12 pages.

Kelly et al., "Identification and Quantification of Organic Vapors by Time-Resolved Diffusion in Stacked Mesoporous Photonic Crystals," Nano Letters, Jul. 12, 2011, vol. 11, pp. 3169-3173 and Supporting Information. 13 pages.

Kobler et al., "Vapor-Sensitive Bragg Mirrors and Optical Isotherms from Mesoporous Nanoparticle Suspensions," ACS Nano, published online Jun. 19, 2009, vol. 3, No. 7, pp. 1669-1676.

Lee et al., "All-Nanoparticle Thin-Film Coatings," Nano Letters, published on web Sep. 9, 2006, vol. 6, No. 10, pp. 2305-2312.

Lotsch et al., Clay Bragg Stack Optical Sensors, Advanced Materials, published online Oct. 6, 2008, vol. 20, pp. 4079-4084.

Murguia et al., "Two-dimensional wavelet transform feature extraction for porous silicon chemical sensors," Analytica Chimica Acta, Jun. 27, 2013, vol. 785, pp. 1-15.

Okamoto et al., "Changes in evaporation rate and vapor pressure of gasoline with progress of evaporation," Fire Safety Journal, available online Apr. 8, 2009, vol. 44, pp. 756-763.

Okamoto et al., "Evaporation characteristics of ETBE-blended gasoline," Journal of Hazardous Materials, available online Jan. 9, 2015, vol. 287, pp. 151-161.

Okamoto et al., "Evaporation characteristics of multi-component liquid," Journal of Loss Prevention in the Process Industries, Jan. 2010, vol. 23, pp. 89-97.

Pavlichenko et al., "Humidity-Enhanced Thermally Tunable TiO2/SiO2 Bragg Stacks," The Journal of Physical Chemistry C (2012), Dec. 8, 2011, vol. 116, pp. 298-305.

Pedregosa et al., "Scikit-learn: Machine Learning in Python," Journal of Machine Learning Research, Oct. 2011, vol. 12, pp. 2825-2830.

Ranft et al., "Tandem MOF-Based Photonic Crystals for Enhanced Analyte-Specific Optical Detection," Chemistry of Materials, Mar. 5, 2015, vol. 27, pp. 1961-1970.

Sanchez-Sobrado et al., "Interplay of Resonant Cavity Modes with Localized Surface Plasmons: Optical Absorption Properties of Bragg Stacks Integrating Gold Nanoparticles," Advanced Materials, published online Mar. 11, 2011, vol. 23, pp. 2108-2112.

Thommes et al., "Physisorption of gases, with special reference to the evaluation of surface area and pore size distribution (IUPAC Technical Report)," Pure and Applied Chemistry, Jul. 2, 2015, vol. 87, pp. 1-19.

Valiullin et al., "Correlating phase behaviour and diffusion in mesopores: perspectives revealed by pulsed field gradient NMR," Physical Chemistry Chemical Physics, first published as an advance article on the web Mar. 16, 2009, vol. 11, pp. 2833-2853.

Wang et al., "Volatile Organic Compounds Volatilization from Multicomponent Organic Liquids and Diffusion in Unsaturated Porous Media," Vadose Zone Journal, Nov. 2003, vol. 2, pp. 692-701.

Xiong et al., "Detection of Homologue and Isomer Vapors through Dynamic Reflection Spectra of Hollow Mesoporous Silica Sphere Photonic Crystals," Chemistry—An Asian Journal, published online Oct. 24, 2018, vol. 13, pp. 3670-3675.

Zhang et al., "Photonic sensing of organic solvents through geometric study of dynamic reflection spectrum," Nature Communications, Jun. 17, 2015, vol. 6:7510, pp. 1-7.

\* cited by examiner

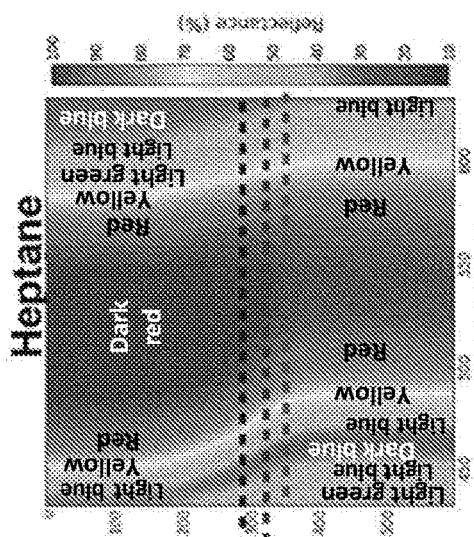
FIG. 4A Pentane
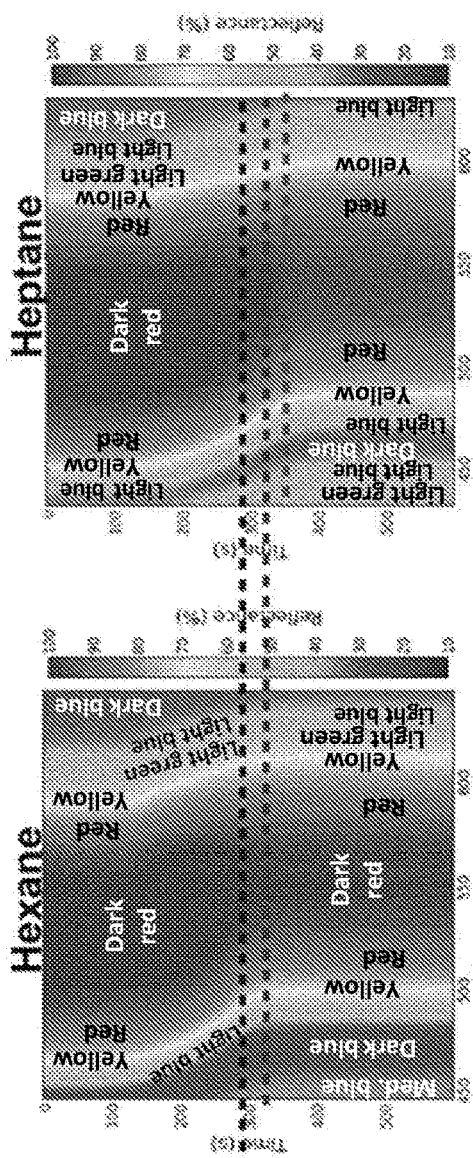
FIG. 4B Hexane
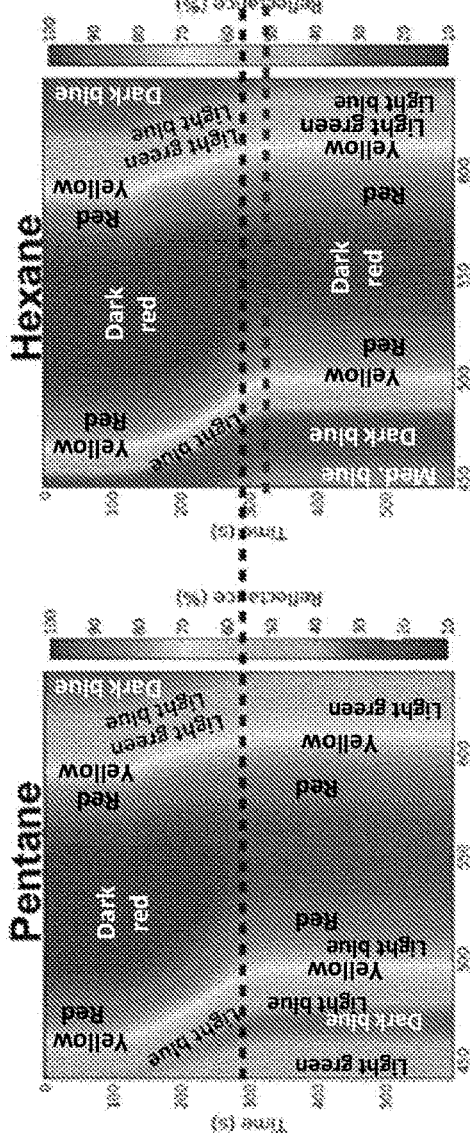
FIG. 4C Heptane
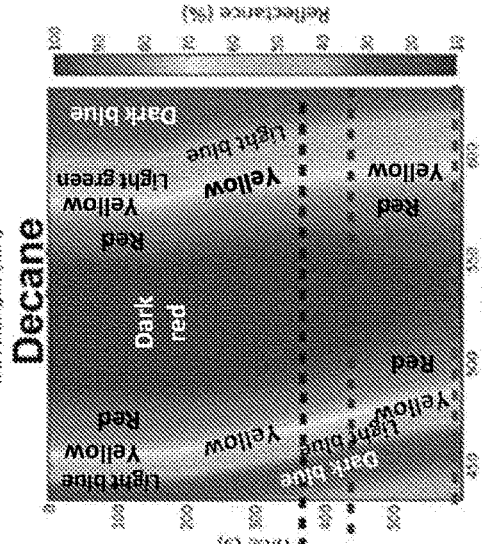
FIG. 4D Octane
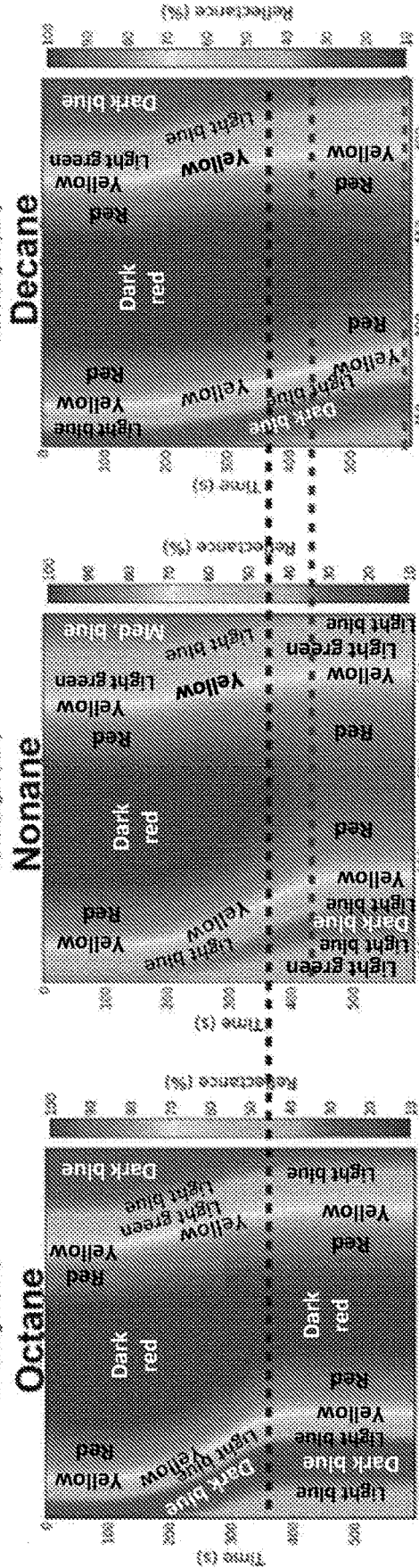
FIG. 4E Nonane
FIG. 4F Decane

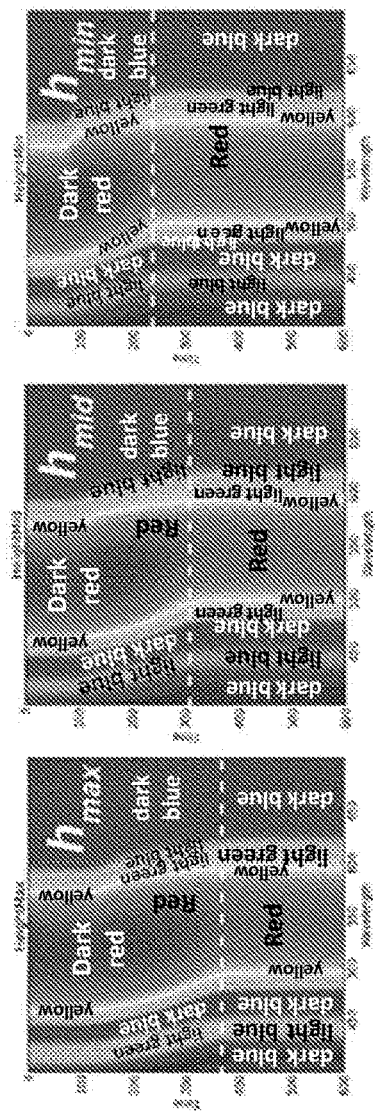
FIG. 5G
FIG. 5F
FIG. 5E
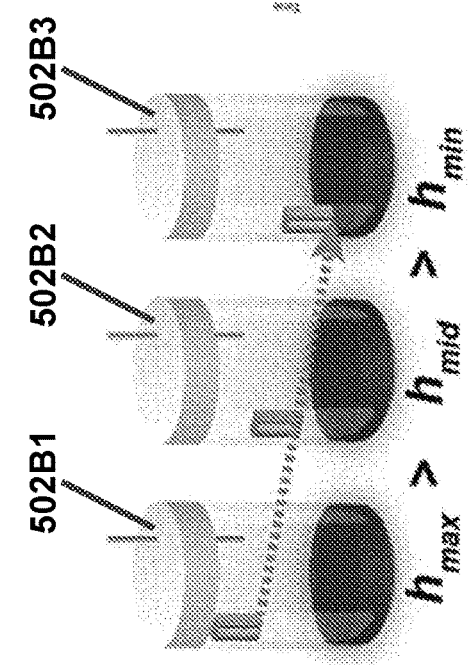
FIG. 5D

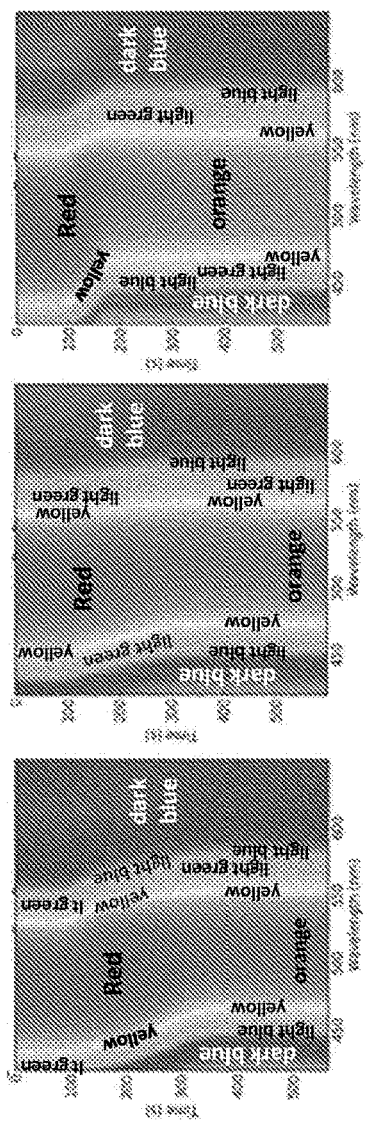
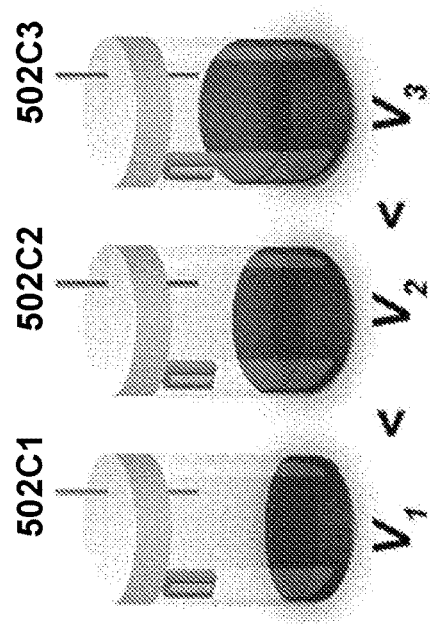
FIG. 5K
FIG. 5J
FIG. 5I
FIG. 5H

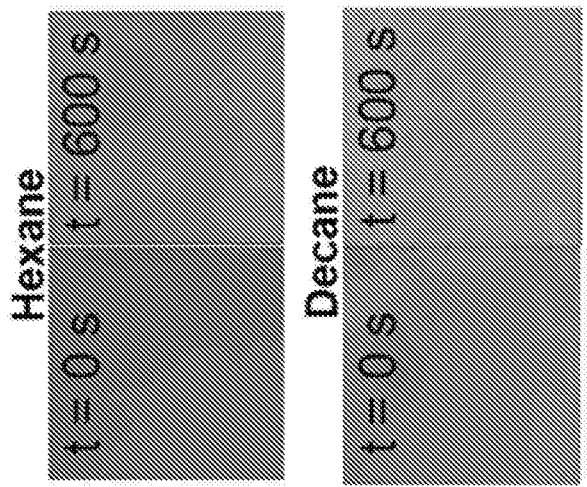
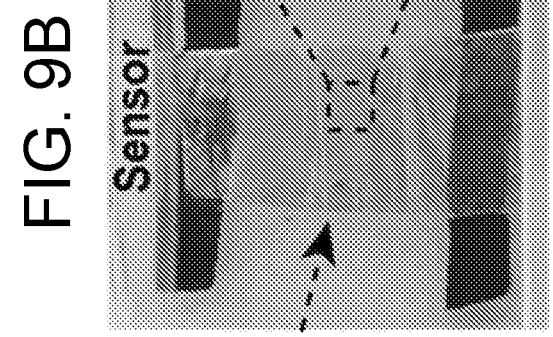
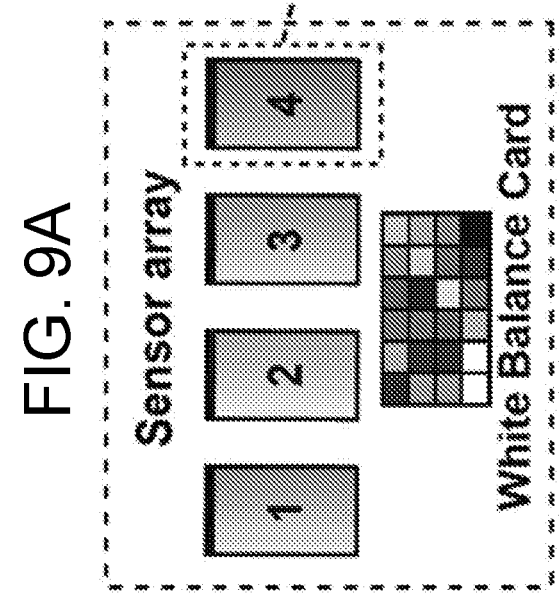
FIG. 9A  FIG. 9B  FIG. 9C  FIG. 9D

FIG. 25B

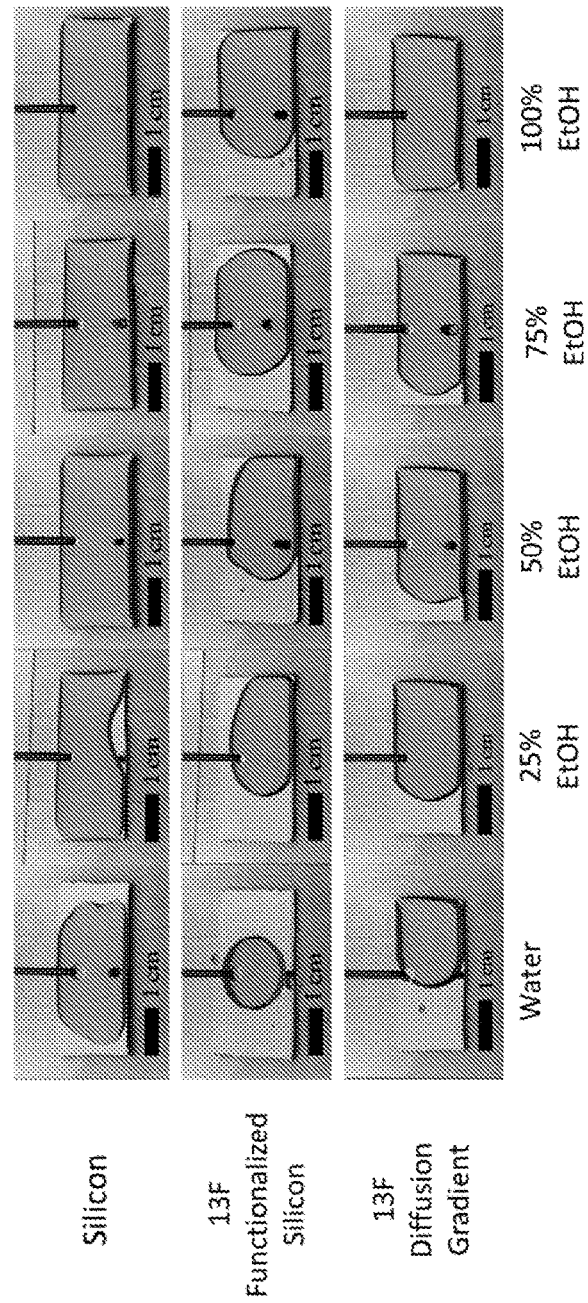
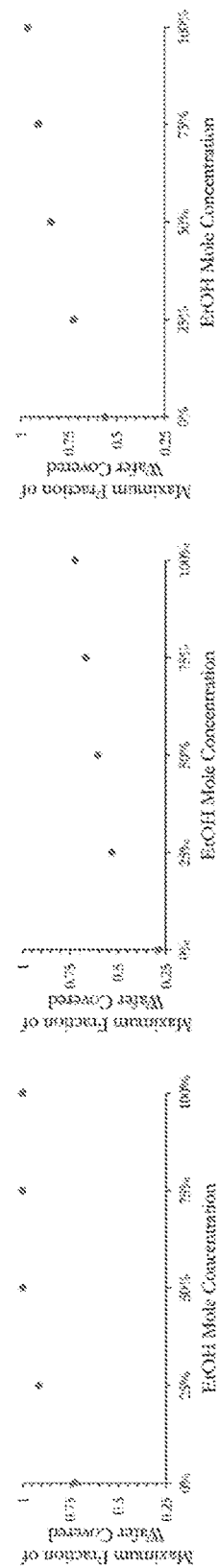
FIG. 31A
FIG. 31B

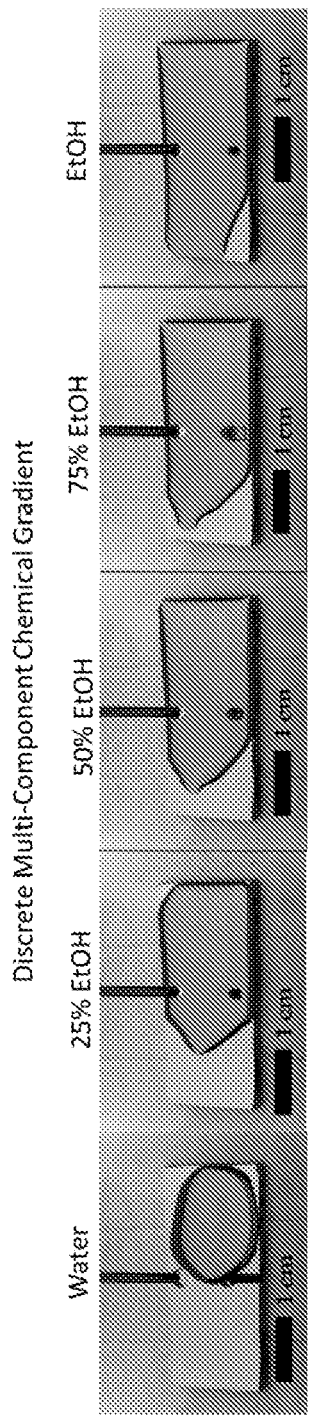
FIG. 32A
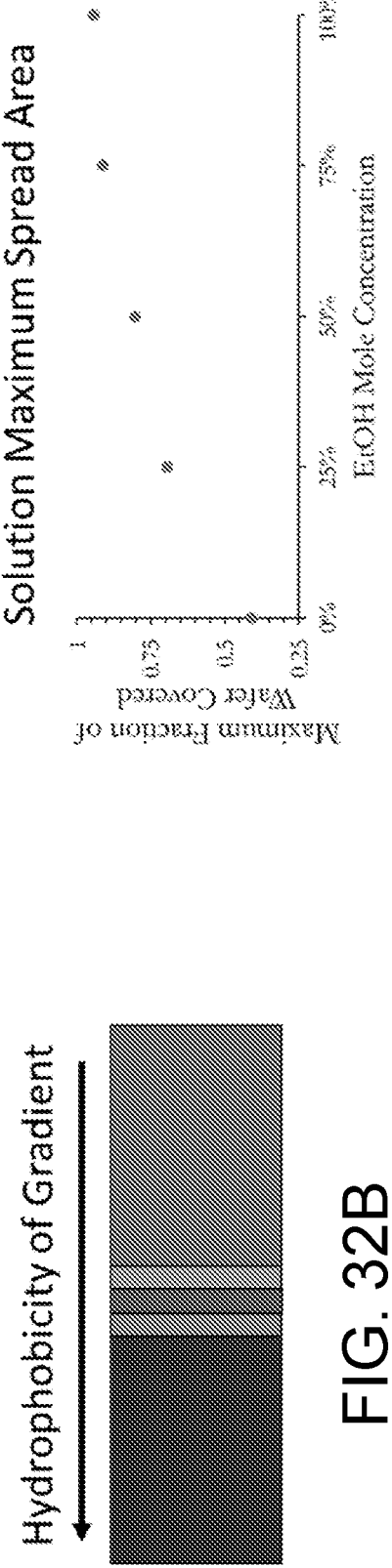
FIG. 32C
FIG. 32B

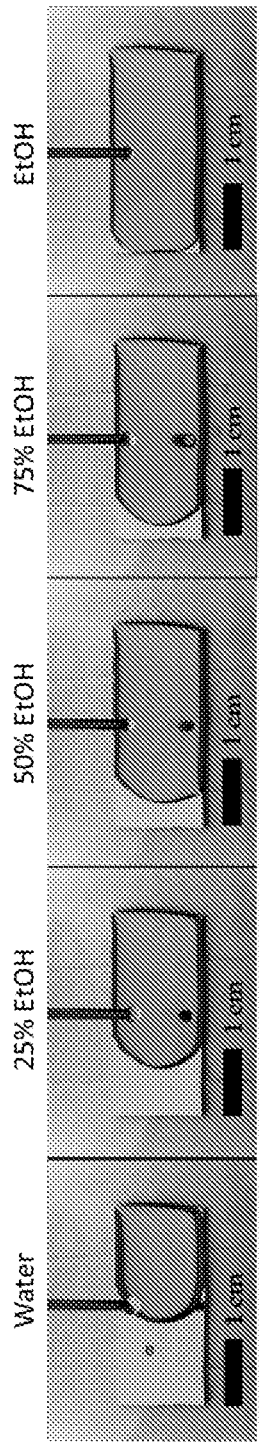
FIG. 33A
FIG. 33B
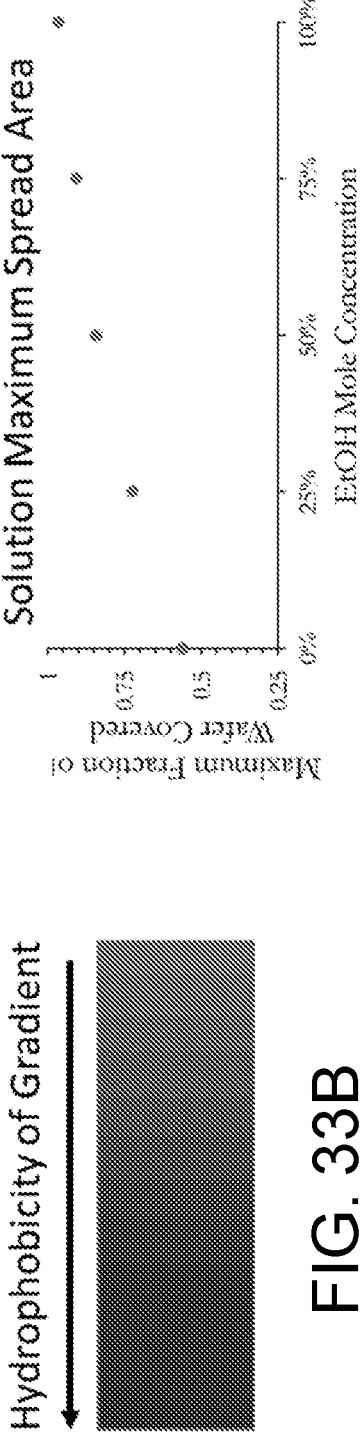
FIG. 33C

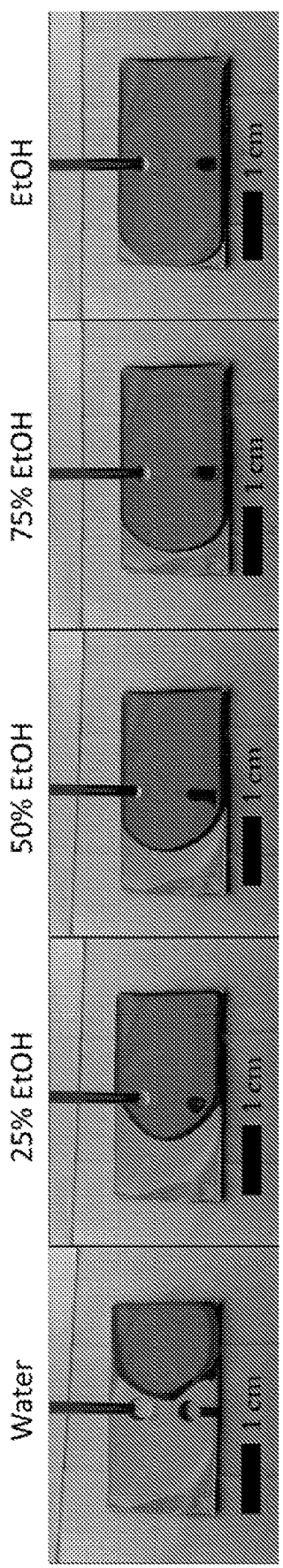
FIG. 34A
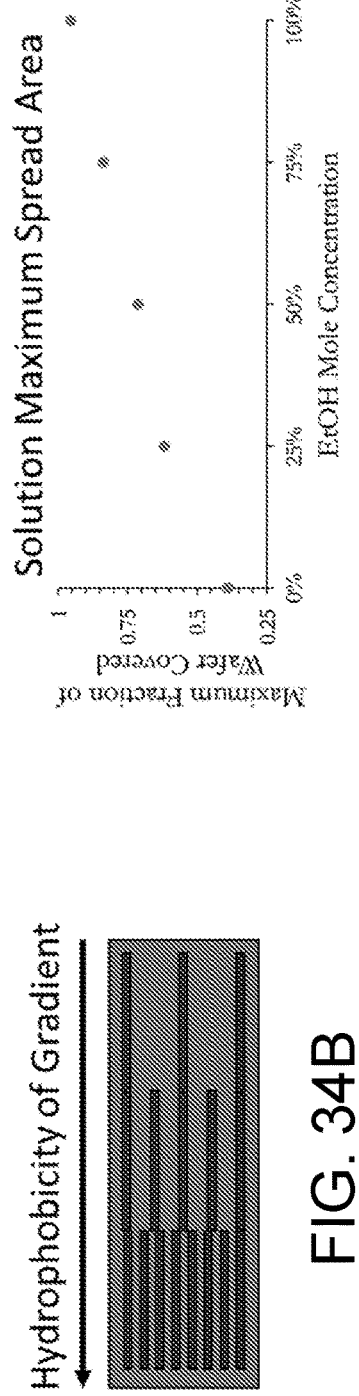
FIG. 34B
FIG. 34C

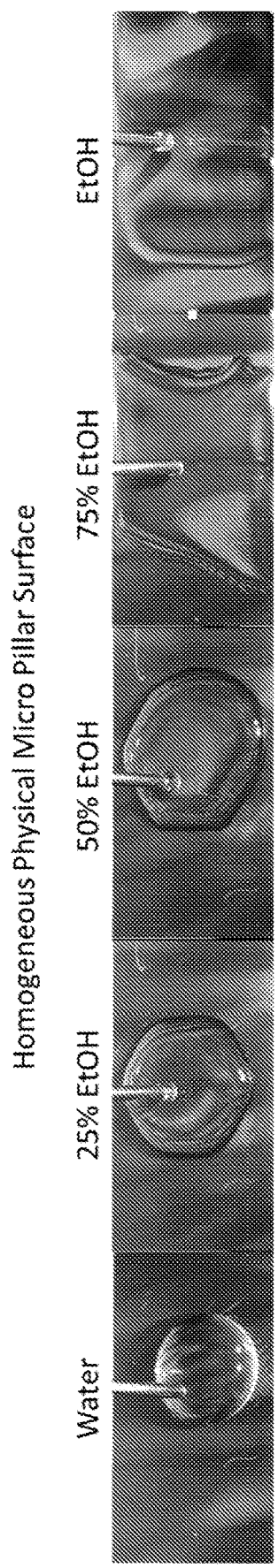
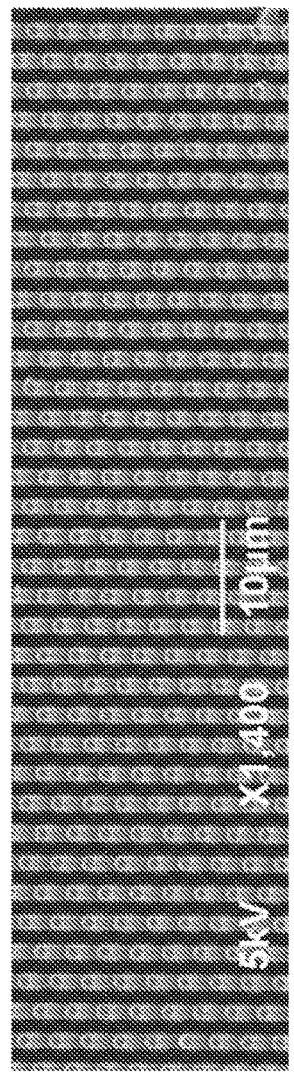
FIG. 35A
FIG. 35B

VOLATILE LIQUID ANALYSIS

CROSS-REFERENCE TO RELATED APPLICATIONS

This application is a National Stage Entry of PCT International Application No. PCT/US2019/032739, filed May 16, 2019, which claims the benefit and priority of U.S. Provisional Patent Application No. 62/672,352, filed on May 16, 2018, the contents of each of which are hereby incorporated by reference in their entirety.

STATEMENT REGARDING FEDERALLY SPONSORED RESEARCH OR DEVELOPMENT

The invention was made with U.S. Government support under contract no. DTFR531C00025, awarded by the U.S. Federal Railroad Administration, and contract no. DTPH5617C00002, awarded by the Department of Transportation. The Government has certain rights in the invention.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

INCORPORATION BY REFERENCE

All patents, patent applications and publications cited herein are hereby incorporated by reference in their entirety in order to more fully describe the state of the art as known to those skilled therein as of the date of the invention described herein.

FIELD OF THE DISCLOSURE

The present disclosure relates generally to the field of volatile liquids. More particularly, the present disclosure relates to the analysis of volatile liquid mixtures.

SUMMARY

In one aspect, a method for analyzing a volatile liquid mixture is described, including:
  providing a sensor including a substrate and a sensor material;
  placing the sensor within a chamber;
  injecting an analyte liquid into the chamber;
  storing the analyte liquid in the chamber for a duration sufficient to achieve:
  (1) movement of the liquid analyte, including spreading and wetting at the surface at the bottom of the inside of the chamber from the source of the injection,
  (2) evaporation of at least a portion of the analyte liquid into a vaporized analyte,
  (3) convection and diffusion of the vaporized analyte through the chamber to the sensor, and
  (4) sorption of the vaporized analyte on the sensor material;
  detecting, over time and by the sensor, a plurality of non-equilibrium sensor responses, each of the plurality of non-equilibrium sensor responses corresponding to at least one of the evaporation, the diffusion, and the sorption; and
  determining a compositional change in the analyte liquid based on the plurality of non-equilibrium sensor responses.

In any one or more of the embodiments described herein, the sensor material includes a non-porous material that is configured to undergo at least one of: a physical modification; and a chemical modification, upon sorption of the vaporized analyte thereon.

In any one or more of the embodiments described herein, the non-porous material is configured such that a density of the non-porous material changes upon sorption of the vaporized analyte thereon.

In any one or more of the embodiments described herein, the non-porous material is configured such that a refractive index of the non-porous material changes upon sorption of the vaporized analyte thereon.

In any one or more of the embodiments described herein, the sensor material includes a plurality of layers disposed on the glass substrate, the plurality of layers including a first layer and a second layer, the first layer including first nanoparticles and the second layer including second nanoparticles, the plurality of layers including a plurality of pores defined by the first nanoparticles and the second nanoparticles and corresponding to interstitial spaces therebetween.

In any one or more of the embodiments described herein, the sensor material includes a photonic crystal.

In any one or more of the embodiments described herein, the photonic crystal is a 1-D porous photonic crystal.

In any one or more of the embodiments described herein, the photonic crystal is a 2-D porous photonic crystal.

In any one or more of the embodiments described herein, the photonic crystal is a 3-D porous photonic crystal.

In any one or more of the embodiments described herein, the sensor material is chemically functionalized.

In any one or more of the embodiments described herein, the substrate includes glass, and the sensor material includes a single layer film having a thickness of less than 1 μm thick.

In any one or more of the embodiments described herein, the substrate includes glass, and the sensor material includes a bilayer film having an overall thickness of less than 1 μm thick.

In any one or more of the embodiments described herein, the substrate includes glass, and the sensor material includes a multilayer film including a first layer and a second layer, the first layer including first nanoparticles and the second layer including second nanoparticles, the multilayer film including a plurality of pores defined by the first nanoparticles and the second nanoparticles and corresponding to interstitial spaces therebetween.

In any one or more of the embodiments described herein, the substrate includes glass, and the sensor material includes a multilayer film including a first layer and a second layer, the first layer including material templated with a first type of porogen, and the second layer including a second type of porogen, the multilayer film including a plurality of pores defined by the first porogen and the second porogen and corresponding to interstitial spaces therebetween.

In any one or more of the embodiments described herein, the substrate includes glass, and the sensor material includes a multilayer film including a first layer and a second layer, the first layer including first type of non-porous vapor-responsive material and the second layer including second type of non-porous vapor-responsive material.

In any one or more of the embodiments described herein, the photonic sensor includes a porous photonic crystal (PPC).

In any one or more of the embodiments described herein, the sensor includes a field-effect transistor (FET).

In any one or more of the embodiments described herein, the porous photonic crystal (PPC) includes a plurality of pores having an average dimension of between 1 nm and 50 nm.

In any one or more of the embodiments described herein, a first spectral response of the plurality of non-equilibrium spectral responses is correlated with the evaporation of the at least a portion of the analyte liquid.

In any one or more of the embodiments described herein, the determining the compositional change in the analyte liquid is performed by extraction of discriminating and independent features from the plurality of non-equilibrium spectral responses, and implementation of the extracted discriminating and independent features into effective machine learning algorithms encompassing pattern recognition, classification and regression.

In any one or more of the embodiments described herein, the analyte liquid includes a multicomponent liquid.

In any one or more of the embodiments described herein, each of the plurality of non-equilibrium spectral responses includes a bandgap shift.

In any one or more of the embodiments described herein, the compositional change is within the range of 0.01%-100%.

In any one or more of the embodiments described herein, the multilayer film includes six bilayers.

In any one or more of the embodiments described herein, detecting the plurality of non-equilibrium spectral responses is performed using a spectrophotometer.

In any one or more of the embodiments described herein, the first nanoparticles include silica and the second nanoparticles include titania.

In any one or more of the embodiments described herein, the pores of the plurality of pores have an average dimension of between 1 nm and 50 nm.

In any one or more of the embodiments described herein, wherein the sensor includes a nanogenerator.

In any one or more of the embodiments described herein, wherein the sensor includes photomechatronic nanostructures for example, surface-acoustic-wave-actuated piezo- and triboelectric photonic nanogenerators.

In any one or more of the embodiments described herein, the surface at the bottom of the inside of the experimental chamber has homogeneous and inhomogeneous chemical patterns on nano- and microscale.

In any one or more of the embodiments described herein, the surface at the bottom of the inside of the experimental chamber has homogeneous and inhomogeneous topography patterns on nano- and microscale.

In another aspect, a device is described, including:
a chamber having an injection site inside the chamber;
an injection port to transport a volatile liquid mixture from outside the chamber to the injection site; and
a sensor capable of detecting over time a plurality of non-equilibrium sensor responses when the volatile liquid mixture:
(1) accumulates at the injection site,
(2) moves away from the injection site, wherein the movement spreads and wets one or more surfaces of the inside of the chamber,
(3) evaporates into a plurality of vaporized analytes, wherein the plurality of vaporized analytes undergoes convection and diffusion throughout the inside of the chamber, and
(4) undergoes sorption onto the sensor material,
wherein each of the plurality of non-equilibrium sensor responses corresponds to at least one of the spreading and wetting, evaporation, the convection, the diffusion, and the sorption of at least one of the plurality of vaporized analytes, and
wherein the plurality of non-equilibrium sensor responses is indicative of a composition or property of the volatile liquid mixture, or a change over time thereof.

In any one or more of the embodiments described herein, the composition is a chemical composition.

In any one or more of the embodiments described herein, the property is a physical property.

In any one or more of the embodiments described herein, the physical property is selected from the group consisting of vapor pressure, boiling point, flash point, viscosity, water content, corrosivity, petroleum testing parameters and a combination thereof.

In any one or more of the embodiments described herein, the accumulation at the injection site, the movement away from the injection site, wherein the movement spreads and wets one or more surfaces of the inside of the chamber, the evaporation into a plurality of vaporized analytes, wherein the plurality of vaporized analytes undergoes convection and diffusion throughout the inside of the chamber, the sorption onto the sensor material of the volatile liquid mixture, and a combination thereof, of the volatile liquid mixture corresponds to the composition, the property, or a combination thereof.

In any one or more of the embodiments described herein, the sensor material includes a non-porous material configured to, upon sorption of the vaporized analyte onto the sensor material, undergo at least one of a physical modification and a chemical modification.

In any one or more of the embodiments described herein, the physical or chemical modification includes at least one of a density change and a refractive index change.

In any one or more of the embodiments described herein, the sensor material includes a plurality of layers disposed on the substrate, the plurality of layers including at least a first layer and a second layer.

In any one or more of the embodiments described herein, the plurality of layers has a thickness of less than 1 μm.

In any one or more of the embodiments described herein, the plurality of layers includes 1 to 50 layers.

In any one or more of the embodiments described herein, the plurality of layers includes six layers.

In any one or more of the embodiments described herein, the first layer includes a plurality of first porogens and the second layer includes a plurality of second porogens, the first layer including a plurality of first pores defined by interstitial spaces between the first porogens and the second layer including a plurality of second pores defined by interstitial spaces between the second porogens.

In any one or more of the embodiments described herein, the first layer includes a plurality of first nanoparticles and the second layer includes a plurality of second nanoparticles, the first layer including a plurality of first pores defined by interstitial spaces between the first nanoparticles and the second layer including a plurality of second pores defined by interstitial spaces between the second nanoparticles.

In any one or more of the embodiments described herein, the first nanoparticles include silica and the second nanoparticles include titania.

In any one or more of the embodiments described herein, the first pores and the second pores have a dimension between about 0.1 nm and about 500 nm.

In any one or more of the embodiments described herein, the sensor material is selected from the group consisting of a photonic crystal, a field effect transistor, a nanogenerator, and photomechatronic nanostructures.

In any one or more of the embodiments described herein, the sensor material includes a photonic crystal.

In any one or more of the embodiments described herein, the photonic crystal includes a porous photonic crystal.

In any one or more of the embodiments described herein, the porous photonic crystal is selected from the group consisting of a 1-dimensional porous photonic crystal, 2-dimensional porous photonic crystal, and a 3-dimensional porous photonic crystal.

In any one or more of the embodiments described herein, the porous photonic crystal includes a plurality of pores having at least one dimension between about 0.1 nm and about 500 nm.

In any one or more of the embodiments described herein, the sensor material includes photomechatronic nanostructures including at least one of surface-acoustic-wave-actuated piezo-electric nanogenerators or triboelectric photonic nanogenerators.

In any one or more of the embodiments described herein, wherein the substrate includes glass.

In any one or more of the embodiments described herein, the sensor material is chemically functionalized.

In any one or more of the embodiments described herein, the first layer includes a first non-porous vapor-responsive material and the second layer includes a second non-porous vapor-responsive material.

In any one or more of the embodiments described herein, the surface of the inside of the chamber has at least one of homogeneous and inhomogeneous chemical patterns on nanoscale and microscale.

In any one or more of the embodiments described herein, the surface of the inside of the chamber has at least one of homogeneous and inhomogeneous topography patterns on nanoscale and microscale.

In any one or more of the embodiments described herein, one or more of the plurality of non-equilibrium sensor responses includes a spectral response.

In any one or more of the embodiments described herein, wherein the spectral response includes a bandgap shift.

In any one or more of the embodiments described herein, the device further includes a spectrophotometer configured to detect wherein the spectral response.

In any one or more of the embodiments described herein, the one or more of the plurality of non-equilibrium sensor responses includes a color change.

In any one or more of the embodiments described herein, the device further includes a camera configured to detect the color change.

In any one or more of the embodiments described herein, the device further includes at least one processor configured to run one or more machine learning algorithms on data representing the plurality of non-equilibrium spectral responses, the machine learning algorithm capable of determining or measuring the composition or the property of the volatile liquid mixture based on discriminating and independent features of the data representing the plurality of non-equilibrium spectral responses, wherein at least one of the one or more machine learning algorithms comprises at least one of pattern recognition, classification, regression, and segmented regression.

In any one or more of the embodiments described herein, the one or more machine learning algorithms are selected from the group consisting of LASSO, kernel ridge regression, decision trees, bagging classifiers, multiclass logistic regression, principle component analysis, linear discriminant analysis, supervised machine learning, semi-supervised machine learning, non-supervised machine learning, support vector machines, transfer learning neural networks, segmented regression, or a combination thereof.

In any one or more of the embodiments described herein, the one or more machine learning algorithms predicts physical or chemical properties of one or more components of the volatile liquid mixture, wherein the one or more components of the volatile liquid mixture are known or unknown to the machine learning algorithms.

In any one or more of the embodiments described herein, the sensor is further capable of detecting one or more non-volatile contaminants in the volatile liquid mixture.

In any one or more of the embodiments described herein, the detecting the one or more non-volatile contaminants includes measuring the concentration of the contaminant, measuring one or more physical properties of the contaminant, or identifying the chemical composition of the contaminant, and changes thereof over time.

In any one or more of the embodiments described herein, the one or more non-volatile contaminants is water, hydrogen sulfide, metals, biological substances, agricultural substances, sediments, or a combination thereof.

In any one or more of the embodiments described herein, the one or more machine learning algorithms are further configured to predict the composition or the property, or change over time thereof, of the volatile liquid mixture that is known or unknown to the machine learning algorithms.

In any one or more of the embodiments described herein, the machine learning algorithms predict the one or more non-volatile contaminants in the volatile liquid mixture, or the change over time.

In any one or more of the embodiments described herein, the determining a composition or property of the analyte liquid includes comparing one or more of the plurality of non-equilibrium sensor responses to a library of non-equilibrium sensor responses.

In any one or more of the embodiments described herein, the determining a composition change or property change in the analyte liquid includes applying a mathematical model of the composition or property to one or more of the plurality of non-equilibrium sensor responses.

In yet another aspect, a method for analyzing a volatile liquid mixture is described, including:
  injecting a volatile liquid mixture from outside a chamber to an injection port on a surface of an inside of the chamber;
  storing the analyte liquid in the chamber for a duration sufficient to achieve:
    (1) movement of at least some of the volatile liquid mixture away from the injection site, including spreading and wetting at one or more inside surfaces of the chamber from the source of the injection,
    (2) evaporation of at least a portion of the volatile liquid mixture into a vaporized analyte,
    (3) convection and diffusion of the vaporized analyte throughout the chamber to the photonic sensor, and
    (4) sorption of the vaporized analyte on the sensor material;

detecting, over time and by the sensor, a plurality of non-equilibrium sensor responses, each of the plurality of non-equilibrium sensor responses corresponding to at least one of the spreading and wetting, the evaporation, the diffusion, and the sorption; and determining a compositional change or property change in the analyte liquid based on the plurality of non-equilibrium sensor responses.

In any one or more of the embodiments described herein, the composition is a chemical composition.

In any one or more of the embodiments described herein, the property is a physical property.

In any one or more of the embodiments described herein, the physical property is selected from the group consisting of vapor pressure, boiling point, flash point, viscosity, water content, corrosivity, petroleum testing parameters and a combination thereof.

In any one or more of the embodiments described herein, the movement of at least some of the volatile liquid mixture away from the injection site, including the spreading and wetting at one or more inside surfaces of the chamber from the source of the injection, the evaporation of at least a portion of the volatile liquid mixture into a vaporized analyte, the convection and diffusion of the vaporized analyte throughout the chamber to the photonic sensor, the sorption of the vaporized analyte on the sensor material, and a combination thereof, of the volatile liquid mixture corresponds to the composition change, the property change, or a combination thereof.

In any one or more of the embodiments described herein, the sensor material includes a non-porous material that, upon sorption of the vaporized analyte onto the sensor material, undergoes at least one of a physical modification and a chemical modification.

In any one or more of the embodiments described herein, the physical or chemical modification includes at least one of a density change and a refractive index change.

In any one or more of the embodiments described herein, the sensor material includes a plurality of layers disposed on the substrate, the plurality of layers including at least a first layer and a second layer.

In any one or more of the embodiments described herein, the plurality of layers has a thickness of less than 1 μm.

In any one or more of the embodiments described herein, the plurality of layers includes 1 to 50 layers.

In any one or more of the embodiments described herein, the plurality of layers includes six layers.

In any one or more of the embodiments described herein, the first layer includes a plurality of first porogens and the second layer includes a plurality of second porogens, the first layer including a plurality of first pores defined by interstitial spaces between the first porogens and the second layer including a plurality of second pores defined by interstitial spaces between the second porogens.

In any one or more of the embodiments described herein, the first layer includes a plurality of first nanoparticles and the second layer includes a plurality of second nanoparticles, the first layer including a plurality of first pores defined by interstitial spaces between the first nanoparticles and the second layer including a plurality of second pores defined by interstitial spaces between the second nanoparticles.

In any one or more of the embodiments described herein, wherein the first nanoparticles include silica and the second nanoparticles include titania.

In any one or more of the embodiments described herein, the first pores and the second pores have a dimension between 0.1 nm and 500 nm.

In any one or more of the embodiments described herein, the sensor material is selected from the group consisting of a photonic crystal, a field effect transistor, a nanogenerator, and photomechatronic nanostructures.

In any one or more of the embodiments described herein, the sensor material includes a photonic crystal.

In any one or more of the embodiments described herein, the photonic crystal includes a porous photonic crystal.

In any one or more of the embodiments described herein, the porous photonic crystal is selected from the group consisting of a 1-dimensional porous photonic crystal, 2-dimensional porous photonic crystal, and a 3-dimensional porous photonic crystal.

In any one or more of the embodiments described herein, the porous photonic crystal includes a plurality of pores having at least one dimension between 0.1 nm and 500 nm.

In any one or more of the embodiments described herein, the sensor material includes photomechatronic nanostructures including at least one of surface-acoustic-wave-actuated piezo-electric nanogenerators or triboelectric photonic nanogenerators.

In any one or more of the embodiments described herein, the substrate includes glass.

In any one or more of the embodiments described herein, the sensor material is chemically functionalized.

In any one or more of the embodiments described herein, the first layer includes a first non-porous vapor-responsive material and the second layer includes a second non-porous vapor-responsive material.

In any one or more of the embodiments described herein, the one or more inside surfaces of the chamber has at least one of homogeneous and inhomogeneous chemical patterns on nanoscale and microscale.

In any one or more of the embodiments described herein, the one or more inside surfaces of the chamber has at least one of homogeneous and inhomogeneous topography patterns on nanoscale and microscale.

In any one or more of the embodiments described herein, one or more of the plurality of non-equilibrium sensor responses includes a spectral response.

In any one or more of the embodiments described herein, the spectral response includes a bandgap shift.

In any one or more of the embodiments described herein, the method further includes detecting, by a spectrophotometer, the spectral response.

In any one or more of the embodiments described herein, the one or more of the plurality of non-equilibrium sensor responses includes a color change.

In any one or more of the embodiments described herein, the method further includes detecting, by a camera, the color change.

In any one or more of the embodiments described herein, the method further includes running, by at least one processor, one or more machine learning algorithms on data representing the plurality of non-equilibrium sensor responses, where the machine learning algorithm determines or measures the composition change or the property change in the analyte liquid based on discriminating and independent features of the data representing the plurality of non-equilibrium sensor responses, wherein at least one of the one or more machine learning algorithms comprises at least one of pattern recognition, classification, regression, and segmented regression.

In any one or more of the embodiments described herein, the one or more machine learning algorithms are selected from the group consisting of LASSO, kernel ridge regression, decision trees, bagging classifiers, multiclass logistic regression, principle component analysis, linear discriminant analysis, supervised machine learning, semi-supervised machine learning, non-supervised machine learning, support vector machines, transfer learning neural networks, segmented regression, or a combination thereof.

In any one or more of the embodiments described herein, the one or more machine learning algorithms predicts physical or chemical properties of one or more components of the volatile liquid mixture, wherein the one or more components of the volatile liquid mixture are known or unknown to the machine learning algorithms.

In any one or more of the embodiments described herein, the sensor further detects one or more non-volatile contaminants in the volatile liquid mixture.

In any one or more of the embodiments described herein, the detecting the one or more non-volatile contaminants includes measuring the concentration of the contaminant, measuring one or more physical properties of the contaminant, or identifying the chemical composition of the contaminant, and changes thereof over time.

In any one or more of the embodiments described herein, the one or more non-volatile contaminants is water, hydrogen sulfide, metals, biological substances, agricultural substances, sediments, or a combination thereof.

In any one or more of the embodiments described herein, the one or more machine learning algorithms further predict the composition or the property, or change over time thereof, of the volatile liquid mixture that is known or unknown to the machine learning algorithms.

In any one or more of the embodiments described herein, the machine learning algorithms predict the one or more non-volatile contaminants in the volatile liquid mixture, or the change over time.

In any one or more of the embodiments described herein, the determining a composition change or property change in the analyte liquid includes comparing one or more of the plurality of non-equilibrium sensor responses to a library of non-equilibrium sensor responses.

In any one or more of the embodiments described herein, the determining a composition change or property change in the analyte liquid includes applying a mathematical model of the composition or property to one or more of the plurality of non-equilibrium sensor responses.

Any aspect or embodiment disclosed herein may be combined with another aspect or embodiment disclosed herein. The combination of one or more embodiments described herein with other one or more embodiments described herein is expressly contemplated.

Unless otherwise defined, used, or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein.

Although the terms, first, second, third, etc., may be used herein to describe various elements, these elements are not to be limited by these terms. These terms are simply used to distinguish one element from another. Thus, a first element, discussed below, may be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "linked to," "on," "connected to," "coupled to," "in contact with," etc., another element, it may be directly linked to, on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise.

BRIEF DESCRIPTION OF THE DRAWINGS

The invention is described with reference to the following figures, which are presented for the purpose of illustration only and are not intended to be limiting. In the Drawings:

FIG. 4A shows a two-dimensional time response map for pentane, according to one or more embodiments.

FIG. 4B shows a two-dimensional time response map for hexane, according to one or more embodiments.

FIG. 4C shows a two-dimensional time response map for heptane, according to one or more embodiments.

FIG. 4D shows a two-dimensional time response map for octane, according to one or more embodiments.

FIG. 4E shows a two-dimensional time response map for nonane, according to one or more embodiments.

FIG. 4F shows a two-dimensional time response map for decane, according to one or more embodiments.

FIG. 5D shows a series of open (non-sealed) chambers with photonic crystals positioned at heights $h_{max}$, $h_{mid}$, and $h_{min}$, according to one or more embodiments.

FIG. 5E shows a two-dimensional time response map showing response kinetics for the chambers of FIG. 5D, with the photonic crystal positioned at height $h_{max}$, according to one or more embodiments.

FIG. 5F shows a two-dimensional time response map showing response kinetics for the chambers of FIG. 5D, with the photonic crystal positioned at height $h_{mid}$, according to one or more embodiments.

FIG. 5G shows a two-dimensional time response map showing response kinetics for the chambers of FIG. 5D, with the photonic crystal positioned at height $h_{min}$, according to one or more embodiments.

FIG. 5H shows a series of open (non-sealed) chambers with volumes of hexane $V_1$, $V_2$, and $V_3$, according to one or more embodiments.

FIG. 5I shows a two-dimensional time response map showing response kinetics for the chambers of FIG. 5H, with the hexane volume $V_1$, according to one or more embodiments.

FIG. 5J shows a two-dimensional time response map showing response kinetics for the chambers of FIG. 5H, with the hexane volume $V_2$, according to one or more embodiments.

FIG. 5K shows a two-dimensional time response map showing response kinetics for the chambers of FIG. 5H, with the hexane volume $V_3$, according to one or more embodiments.

FIG. 9A shows a schematic illustration of a combinatorial approach for compositional analysis of volatile liquid mixtures using an array of photonic sensors, according to one or more embodiments.

FIG. 9B shows a photograph of a one-dimensional porous photonic crystal, according to one or more embodiments.

FIG. 9C shows a sub-image of the one-dimensional porous photonic crystal of FIG. 9B exposed to hexane at t=0 seconds and t=600 seconds, according to one or more embodiments.

FIG. 9D shows a sub-image of the one-dimensional porous photonic crystal of FIG. 9B exposed to decane at t=0 seconds and t=600 seconds, according to one or more embodiments.

FIG. 25B shows a confusion matrix of test data corresponding to the classification of the volatile liquids of FIG. 25A, according to one or more embodiments.

FIG. 31A shows the final spread width of various concentrations of water/ethanol mixtures on an air-aged silicon surface ("silicon"), a homogenous chemically functionalized surface of 13F functionalized silicon, and a single-component 13F diffusion gradient, according to one or more embodiments.

FIG. 31B shows the maximum spread area of the three surfaces of FIG. 31A as a fraction of the total area, according to one or more embodiments.

FIG. 32A shows the final spread area of various water/ethanol concentrations on the discrete multicomponent chemical gradient, according to one or more embodiments.

FIG. 32B shows the layout of the gradient in FIG. 32A, according to one or more embodiments.

FIG. 32C shows the calculated maximum spread area of the various water/ethanol concentrations of FIG. 32A, according to one or more embodiments.

FIG. 33A shows the final spread area of various water/ethanol concentrations on the continuous diffusion based single-component chemical gradient, according to one or more embodiments.

FIG. 33B shows the layout of the gradient in FIG. 33A, according to one or more embodiments.

FIG. 33C shows the calculated maximum spread area of the various water/ethanol concentrations of FIG. 33A, according to one or more embodiments.

FIG. 34A shows the final spread area of various water/ethanol concentrations on the discrete chemically patterned single-component chemical gradient, according to one or more embodiments.

FIG. 34B shows the layout of the gradient of FIG. 34A, according to one or more embodiments.

FIG. 34C shows the calculated maximum spread area of the various water/ethanol concentrations of FIG. 34A, according to one or more embodiments.

FIG. 35A shows the final spread area and puddle shape of various water/ethanol concentrations on a homogeneous physical micro-pillar surface, according to one or more embodiments.

FIG. 35B shows a scanning electron microscope image of the micro-pillar surface of FIG. 35A, according to one or more embodiments.

FIG. 40 shows the kinematic viscosity of a volatile analyte liquid over time, which can be used to model properties of the analyte, according to one or more embodiments.

DETAILED DESCRIPTION

Figure 1A:
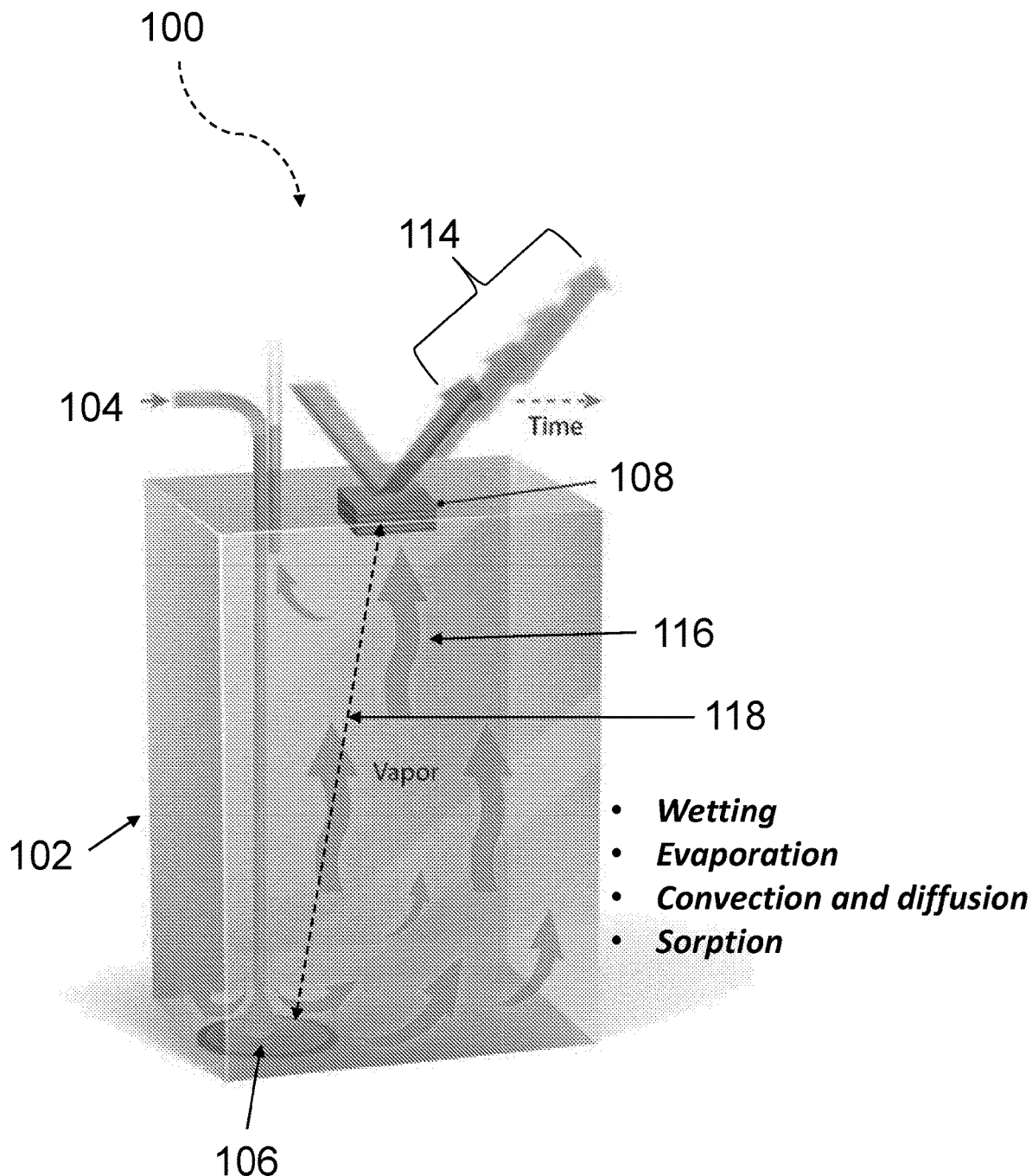
FIG. 1A shows a schematic illustration of a device for analyzing volatile liquid mixtures, according to one or more embodiments.

Single- and multicomponent volatile liquids play a role in various industries. For example, the presence of hazardous volatile chemicals in food and water, and their release into the atmosphere, are subjects of concern. One prominent example of a volatile liquid mixture is crude oil. Crude oils can have high variability in physical properties (e.g., flash point and boiling point), depending on, for example, the source, method of extraction, and handling. Such variability can make it difficult to estimate and characterize hazards (e.g., ignition, explosion, and release of toxic vapors) associated with crude oils that can, for example, impact processing logistics. For example, measuring the water content of crude oil, refined petroleum products, and fuels can be important for maintaining quality control, meeting trade specifications, and risk management (e.g., minimizing infrastructure damage from corrosion). Furthermore, the oil and gas industry can present distinctive challenges across the supply chain, from extraction to statutory inspection to transportation (e.g. of hydrocarbons), all of which can be governed by stringent regulations and standards.

Another example of volatile liquid mixture is biofuels, which can have high levels of volatile byproducts (e.g., methanol and acetic acid) that can act as air pollutants. Volatile organic compounds are important in medical diagnostics, including, for example, chemicals detectable in exhaled breath, blood, urine, feces, sweat, and other bodily fluids. Testing for volatile biomarkers in clinical samples can enable development of rapid and potentially inexpensive disease screening tools. Still other examples of volatile liquid mixtures include, but are not limited to, paints, solvents, lubricants, greases, polymers, plastics, rubbers, specialty chemicals, dyes, detergents, textiles, agrochemicals, pesticides, pharmaceuticals and pharmaceutical formulations/compositions, wastewater or otherwise contaminated water, cosmetics (e.g., perfumes), and food and beverages (e.g., food additives, flavors, fragrances, alcoholic beverages, juices, and milk).

The development of devices and methods for rapid, accurate, and reproducible characterization of, for example, the physical and chemical properties of mixtures of volatile liquids can be important for, for example, ensuring their safe production, transportation, refining, storage, handling, and distribution. Such physical and chemical properties include, but are not limited to, chemical composition, concentrations of volatile components, flash point, boiling point, and bulk or component stability. In certain embodiments, such physical and chemical properties can be dynamic, i.e., change over time, with or without environmental stimuli, such as temperature, pressure, shock, and contamination with volatile or nonvolatile components. Thus, devices and methods for characterizing volatile liquid mixtures are needed in a variety of industries.

Chemical sensors and other methods can be used to characterize volatile liquids in, for example, the industrial and home safety, environmental and process monitoring, medical diagnostics, food quality control, agriculture surveillance, homeland security, and waste transportation and handling industries. However, these sensors and methods can minimize or ignore non-equilibrium processes (i.e., the sensor response is recorded after the saturation pressure of a volatile liquid is reached). Devices and methods with the capacity to characterize volatile liquid mixtures in dynamic (i.e., non-equilibrium) fashion remains an unmet need.

The present disclosure, in one or more embodiments, provides devices and methods for the fast detection and characterization of complex volatile liquid mixtures, and components thereof, using spatiotemporal detection enabled by dynamic, non-equilibrium mass-transfer processes, and utilizing stimuli-responsive sensors based on porous materials, such as photonic crystals or field-effect-transistors (FETs). In one or more embodiments, in-depth analysis of a series of transient thermodynamic processes of the volatile liquid mixture (e.g., movement throughout the device via spreading and wetting of its surfaces, evaporation of at least a portion of volatile analytes from the liquid-gas interface, convection and diffusion of the vaporized analytes throughout the chamber and toward a sensor, and sorption of the vaporized analytes onto the sensor) differentiates the instant devices and methods. In some embodiments, the uniqueness of the chemical makeup of various volatile liquids, and mixtures thereof, that defines the liquid's equilibration kinetics, as governed by the above-mentioned mass transfer phenomena and subsequently affecting the time-dependent response of the sensor, can facilitate fine compositional discrimination of the analytes. In some embodiments, typical detection times for volatile liquid mixtures, and compounds and components thereof, can vary from about 2 to about 3 seconds to about several minutes (less than about 1 hour), depending on the nature of the liquid, compound, or component, the sorption properties of the porous material, the dimensions and shape of the measurement chamber, and the materials and topography of the inside surfaces (e.g., the bottom inside surface ("base")) of the device.

In terms of assessing the volatility of the analytes, approaches set forth in one or more embodiments herein provide several advantages when compared to other methods. For example, the use of photonic sensors, field effect transistor (FET) sensors, or nanogenerators allows for monitoring of the relative pressures of analytes of interest while minimizing errors associated with the influence of the gases present in the atmosphere of the test chamber prior to the beginning of the test procedure and the dissolved gasses in the analyzed liquid evolving during the test procedure. In these embodiments, the design of the architecture of, for example, photonic sensors or field effect transistor (FET) sensors allows for their unique gas sorption behavior to be exploited, and, thus, enable their application for a discriminative analysis of the relative vapor pressure variations of the volatile liquid mixtures. In some embodiments, the sensing mechanism of photonic sensors can be based on spectral changes induced by an alteration of the effective refractive index of their matrices or a change in a physical dimension induced by sorption of analyte vapor. In some embodiments, the vapor sorption properties of the sensing materials include the diffusion of the analyte vapors into and within the structure, absorption and adsorption of the vapors throughout, for example, the monolayers and multilayers of the sensor material, such as the walls of the pores therein, and capillary condensation of the vapor molecules into the textural and structural micropores and mesopores of the sensor materials.

In one or more embodiments, the modular design of the device allows for systematic optimization of many of its components to tune sensitivity and selectivity toward one or more volatile analytes. For example, in some embodiments, the affinity and capacity of the sensor, with respect to sorption, can be tuned through engineering the pore sizes and geometries or by modifying the chemical functional groups covering the surfaces of the pores. In some embodiments, the selectivity and the sensitivity of the sensor towards specific volatile analytes can be tuned by introducing surface functions with preferential affinity towards the target analytes and chemically-responsive surface functions.

Analyzing Volatile Liquid Mixtures

As shown in FIG. 1A, a device 100 includes, in some embodiments, a chamber 102 having an injection site inside the chamber, an injection port 104 to transport a volatile liquid mixture from outside the chamber to the injection site 106. In some embodiments, the device 100 includes a sensor 108 capable of detecting over time a plurality of non-equilibrium sensor responses when the volatile liquid mixture (1) accumulates at the injection site, (2) moves away from the injection site, where the movement spreads and wets one or more surfaces of the inside of the chamber, (3) evaporates into a plurality of vaporized analytes, where the plurality of vaporized analytes undergoes convection and diffusion throughout the inside of the chamber, and (4)

undergoes sorption onto the sensor material. In these embodiments, each of the plurality of non-equilibrium sensor responses corresponds to at least one of the evaporation, the convection, the diffusion, and the sorption of at least one of the plurality of vaporized analytes. In these embodiments, the plurality of non-equilibrium sensor responses is indicative of a composition change or property change of the volatile liquid mixture.

In some embodiments, the analyzing the volatile liquid mixture can include, for example, measuring the concentration of one or more volatile analytes in the liquid, identifying the chemical composition of one or more volatile analytes in the liquid, measuring the concentration of one or more non-volatile analytes in the liquid, identifying the chemical composition of one or more non-volatile analytes in the liquid, and the change over time thereof.

In some embodiments, a method for analyzing a volatile liquid mixture includes providing a sensor 108, where the sensor includes a substrate 110 and a sensor material 112. In some embodiments, the sensor is placed within the chamber 102. In some embodiments, an analyte liquid is injected into the chamber 102 and stored in the chamber 102 for a duration sufficient to achieve: (1) movement of the liquid analyte, including spreading and wetting at the surface at the bottom of the inside of the chamber 102 from the source of the injection, (2) evaporation of at least a portion of the analyte liquid into a vaporized analyte 116, (3) convection and diffusion of the vaporized analyte 116 through the chamber 102 to the sensor 108, and (4) sorption of the vaporized analyte 116 on the sensor material 112. In some embodiments, the method includes detecting over time and by the sensor 108, a plurality of non-equilibrium sensor responses 114, where each of the non-equilibrium sensor responses 114 corresponds to at least one of the evaporation, the diffusion, and the sorption. In some embodiments, the method includes determining a compositional change in the analyte liquid based on the plurality of non-equilibrium sensor responses.

In some embodiments, the movement of the analyte liquid away from the injection site 106, the spreading and wetting of an inside surface of the chamber 102, the evaporation of at least a portion of the analyte liquid into a vaporized analyte 116, the convection and diffusion of the vaporized analyte 116 throughout the chamber toward the sensor 108, the sorption of the vaporized analyte 116 on the sensor material 112, and one or more combinations thereof, generate a plurality of non-equilibrium sensor responses. In some embodiments, the movement of the analyte liquid away from the injection site 106, the spreading and wetting of an inside surface of the chamber 102, the evaporation of at least a portion of the analyte liquid into a vaporized analyte 116, the convection and diffusion of the vaporized analyte 116 throughout the chamber toward the sensor 108, the sorption of the vaporized analyte 116 on the sensor material 112, and one or more combinations thereof, are correlated with a property of the volatile liquid mixture (e.g., vapor pressure, boiling point, flash point, viscosity, and a combination thereof).

In some embodiments, the determining a composition, compositional change, property, or property change of a volatile or non-volatile analyte liquid includes comparing the plurality of non-equilibrium sensor responses 114 to a library or a database of non-equilibrium sensor responses. In some embodiments, an unknown composition, compositional change, property, or property change of the analyte liquid is assigned to a known composition, composition change, property, or property change by said comparison.

In some embodiments, the physical properties (e.g., vapor pressure, boiling point, flash point, viscosity, water content, corrosivity, and petroleum testing parameters) of one or more unknown volatile or non-volatile analytes can be attributed to a known composition, composition change, property, or property change directly from the plurality of sensor responses, i.e., without comparison to a library or database of non-equilibrium sensor responses, by applying an approximated physical model of the spreading and wetting, convection, diffusion, and sorption of the analyte and its vapors. In these embodiments, this is useful when a library of physical non-equilibrium sensor responses is small or not available. In these embodiments, this approach can also be useful for predicting the parameters for measurements performed at temperatures outside the range of the sensor, where the underlying evaporation, diffusion, and adsorption kinetics may not track with the sensor responses in the physical library.

Chamber

In some embodiments, the chamber can include glass, Teflon, or other solvent-resistant materials.

In some embodiments, one or more inside surfaces of the chamber 102 can have the same or different homogeneous or heterogeneous chemical patterns on the nanoscale and microscale.

In some embodiments, one or more inside surfaces of the chamber 102 can have the same or different homogeneous or heterogeneous topography patterns on the nanoscale and microscale.

In some embodiments, the surface at the bottom of the inside of the chamber can be a hierarchical surface containing surface features on multiple length scales. For example, in some embodiments, the surface can have a first topological feature having dimensions on the microscale and a second topological feature on the nanoscale. In these embodiments, the first topological feature supports the second smaller topological feature. In some embodiments, the second topological features are referred to as "primary structures" as they are meant to denote the smallest feature sizes of the hierarchical structure. In these embodiments, the primary structures can include structures, such as nanofibers, or nanodots. In these embodiments, such nanoscale "primary structures" can have at least one kind of feature sizes that are a few to tens or hundreds of nanometers in size, such as less than 5 nm to 200 nm. For example, in these embodiments, nanofibers can have diameters of approximate 5, 10, 25, 50, or 100 nm. In some embodiments, in such cases, when "primary structures" having feature sizes of about 100 nm diameter are utilized, "secondary structures" having feature sizes that are larger than 100 nm, such as 150 nm, 300 nm, 500 nm, or 1000 nm, and larger can be utilized. Additional higher order structures, such as "tertiary structures," each of which can have larger feature sizes than the lower order structures, are used in some embodiments.

In some embodiments, the chamber base has flat, round rectangular, square, triangular, or a geometrically complex shape with an area ranging from 1 mm$^2$ to 10000 mm$^2$. In some embodiments, the chamber has a height between about 1 cm to about 30 cm.

In these embodiments, the homogeneous or heterogeneous chemical or topography patterns of one or more inside surfaces of the chamber 102 can tune the selectivity and sensitivity of the device for analyzing volatile liquid mixtures. For example, inclusion of pores or channels of various sizes on one or more surfaces of the chamber 102 can alter properties (e.g., kinetics) of wetting, evaporation, diffusion, or convection based on some analytes being able to enter the pores/channels (e.g., due to molecular size) and some not. Similarly, in some embodiments, inclusion of chemical coatings on one or more surfaces of the chamber 102 can alter properties (e.g., kinetics) of wetting, evaporation, diffusion, or convection based on intermolecular interactions between some analytes and said chemical coatings, but not other analytes. Thus, in these embodiments, for a given volatile liquid mixture, the time it takes for certain analytes to reach the sensor 108 can be altered via these chemical and topological modifications, thereby selecting detection of one or more analytes over one or more other analytes.

For example, in some embodiments, the one or more inside surfaces can be functionalized with silyl groups. Non-limiting examples of such silyl groups include perfluorooctyltrichlorosilane, triethoxsilylbutyraldehyde, bis(2-hydroxyethyl)-3-aminopropyltriethoxysilane, 3-chloropropyltriethoxysilane, 3-(trihydroxysilyl)-1-propanesulfonic acid, n-(triethoxysilylpropyl)-alpha-poly-ethylene oxide urethane, n-(trimethoxysilylpropyl) ethylene diamine triacetic acid, n-octyltriethoxysilane, n-octadecyltriethoxysilane, (3-trimethoxysilylpropyl) diethylenetriamine, methyltriethoxysilane, hexyltrimethoxysilane, 3-aminopropyltriethoxysilane, hexadecyltriethoxysilane 3-mercaptopropyltrimethoxysilane, and dodecyltriethoxysilane, or chiral functionalities including N-(3-triethoxysilylpropyl) gluconamide or (R)—N-triethoxysilylpropyl-O-quinineurethane). In some embodiments, the one or more inside surfaces can be a roughened by including a porous material. In these embodiments, the roughened surface includes both the surface of a three-dimensionally porous material as well as solid surface having certain topographies, whether they have regular, quasi-regular, or random patterns. In some embodiments, the surface can be roughened by incorporation of micro textures. In other embodiments, the substrate can be roughened by incorporation of nano textures.

In some embodiments, microparticles or nanoparticles are applied to the surface to form a roughened, porous surface. In these embodiments, microparticles or nanoparticles can be applied to the surface using photolithography, projection lithography, electron-beam writing or lithography, depositing nanowire arrays, growing nanostructures on the surface of a substrate, soft lithography, replica molding, solution deposition, solution polymerization, electropolymerization, electrospinning, electroplating, vapor deposition, layered deposition, rotary jet spinning of polymer nanofibers, contact printing, etching, transfer patterning, microimprinting, self-assembly, boehmite formation, spray coating, and combinations thereof.

In some embodiments, the surface can include a fluoropolymer. Non-limiting examples of fluoropolymers can include polytetrafluoroethylene, polyvinylfluoride, polyvinylidene fluoride, and fluorinated ethylene propylene.

In some embodiments, the surface can include a plurality of holes, a three-dimensionally interconnected network of holes, or random array of fibrous materials.

In some embodiments, the roughened surface can be formed over a two-dimensionally flat surface by providing certain raised structures or protrusions. In other embodiments, the roughened surface can be formed by forming pores over a two-dimensionally flat surface to yield a porous material. In these embodiments, pores can have any geometry and can include pathways, columns, or random patterns. In yet other embodiments, a three-dimensionally interconnected network of regular or random pores is used, which can include open-cell bricks, post arrays, parallel grooves, open porosity PTFE (ePTFE), plasma-etched PTFE, and sand-blasted polypropylene (PP).

In certain embodiments, the roughened surface may have a periodic array of surface protrusions (e.g., posts or peaks) or any random patterns or roughness. In some embodiments, the size of the features producing the roughened surface can range from 10 nm to 100 µm, with geometries ranging from regular posts or open-grid structures to randomly oriented spiky structures. In some embodiments, the widths of the raised structures can be constant along their heights. In some embodiments, the widths of the raised structures can increase as they approach the basal surface from the distal ends. In some embodiments, the raised structures can be raised posts of a variety of cross-sections, including, but not limited to, circles, ellipses, or polygons (e.g., triangles, squares, pentagons, hexagons, octagons, and the like), forming cylindrical, pyramidal, conical, or prismatic columns. Although the exemplary substrates described in these embodiments illustrate raised posts having uniform shape and size, the shape, orientation or size of raised posts on a given substrate can vary.

In some embodiments, a range of surface structures with different feature sizes and porosities can be used. In these embodiments, feature sizes can be in the range of hundreds of nanometers to microns (e.g., 50 to 1000 nm), and have aspect ratios from 1:1 to 10:1, from 1:1 to 2:1, from 1:1 to 3:1, from 1:1 to 4:1, from 1:1 to 5:1, from 1:1 to 6:1, from 1:1 to 7:1, from 1:1 to 8:1, and from 1:1 to 9:1. In some embodiments, porous nano-fibrous structures can be generated in situ on the inner surfaces of metallic microfluidic devices using electrochemical deposition techniques.

Sensor

Figure 1B:
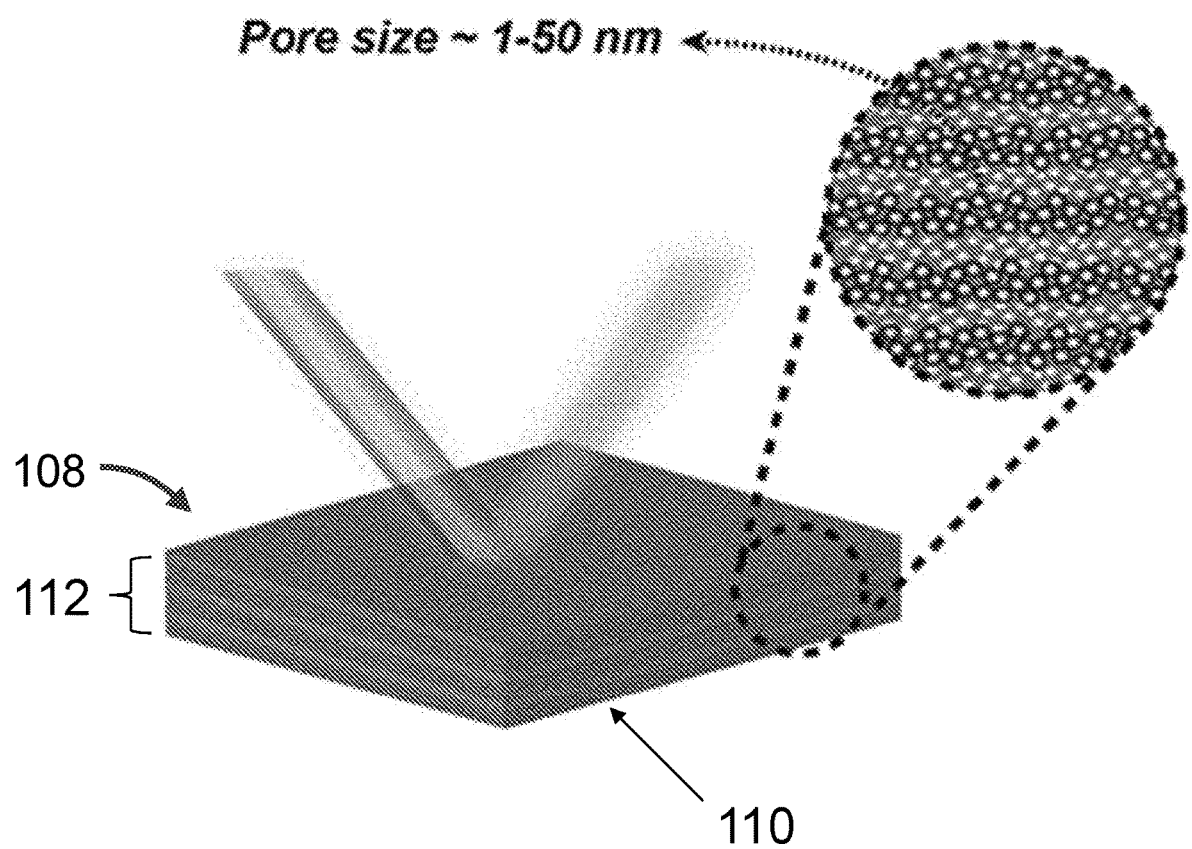
FIG. 1B shows a schematic illustration of a multilayer photonic crystal sensor for analyzing volatile liquid mixtures, according to one or more embodiments.
Figure 1C:
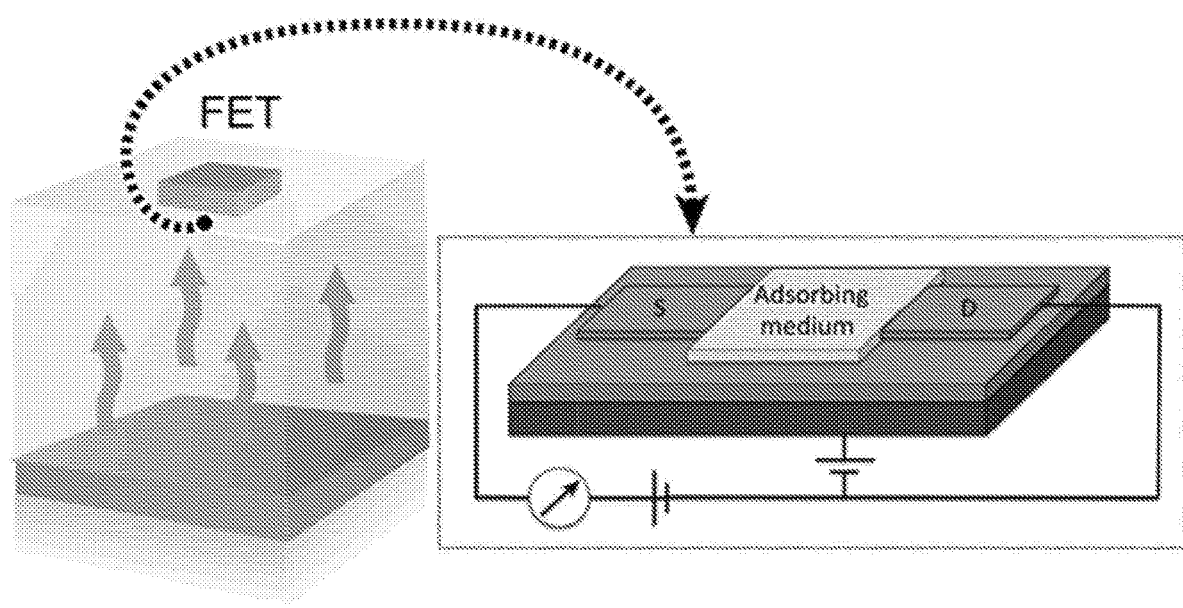
FIG. 1C shows a schematic illustration of a field-effect transistor (FET)-based sensing approach, according to one or more embodiments.

As shown in FIG. 1A and FIG. 1B, the sensor 108 includes, in some embodiments, a substrate 110 and a sensor material 112. In some embodiments, the sensor is capable of detecting over time a plurality of non-equilibrium sensor responses 114. In some embodiments, the plurality of non-equilibrium sensor responses 114 are detected when the volatile liquid mixture (i) accumulates at the injection site 106, (ii) moves away from the injection site 106 by spreading and wetting one or more surfaces of the inside of the chamber 102, (iii) evaporates into a plurality of vaporized analytes 116, which undergo convection and diffusion throughout the inside of the chamber, in some cases leading to changes in relative vapor pressure, and (iv) undergoes sorption onto the sensor material 112 and displaces analyte vapors therein. In some embodiments, sorb can be one or more of adsorb or absorb. In some embodiments, each of the plurality of non-equilibrium sensor responses 114 corresponds to at least one of the evaporation, convection, diffusion, and sorption of at least one of the plurality of vaporized analytes 116. In some embodiments, the plurality of non-equilibrium sensor responses is indicative of a composition or property of the volatile liquid mixture, or a change over time thereof.

In some embodiments, the sensor can be on the side or at the end of a microfluidic channel on or in one or more surfaces of the chamber.

In some embodiments, the sensor material 112 includes a non-porous material. In some embodiments, the non-porous material can be configured to, upon sorption of the vaporized analyte thereon, undergo at least one of a physical modification and chemical modification. Non-limiting examples of physical and chemical modifications include density, refractive index, swelling/contracting, or combinations thereof.

In some embodiments, the sensor material 112 includes a single layer, a bilayer, a plurality of single layers, or a plurality of bilayers, a stack of layers, or multilayers disposed on the substrate 110. In some embodiments, the plurality of layers includes at least a first layer and a second layer. In some embodiments, the plurality of layers includes about 1 to about 50 layers. In some embodiments, the plurality of layers includes 6 layers. In some embodiments, the number of single layers, bilayers, or other layer stacks can be varied to tune the sensitivity of the sensor 108 for detecting one or more volatile analytes (see, for example, U.S. Pat. Nos. 8,861,072 and 9,213,000, which are hereby incorporated by reference in their entirety).

In some embodiments, the plurality of layers can have a thickness between about 1 nm to about 10 µm. In some embodiments, the plurality of layers can have a thickness of between 5 nm and 25 nm, 25 nm and 100 nm, 100 and 500 nm, 500 and 1000 nm, or 1 µm and 10 µm.

In some embodiments, the substrate includes fused silica or a polymer material (e.g., PMMA or PET). In some embodiments, the substrate 110 includes glass. In some embodiments, the substrate 110 is glass.

In some embodiments, the substrate can be glass and the sensor material can be a Fabry-Perot cavity including a single layer or bilayer film or having an overall thickness of between 5 nm and 25 nm, 25 nm and 100 nm, 100 and 500 nm, 500 and 1000 nm, or 1 µm and 10 µm.

In some embodiments, the sensor material 112 is a porous material that can include a plurality of micro- and mesoporous layers. In some embodiments, the micro- and mesoporosity, when combined with the specific affinity of a vaporized analyte to the surface of the sensor, can facilitate the detection of very small concentrations of the vaporized analyte. In these embodiments, the plurality of micro- and mesoporous layers can enable adsorption of the vaporized analytes at low relative vapor pressures, $p/p_0$, where p is the partial vapor pressure and $p_0$ is the saturation vapor pressure, and high sensitivity and selectivity. In these embodiments, $p/p_0$ can be between 0 and about 100%.

In some embodiments, microporous sensing materials for photonic, field effect transistor (FET), or nanogenerator-based sensors can include metal-organic framework (MOF) materials. In these embodiments, metal-organic framework (MOF) materials can be crystalline compounds consisting of rigid organic molecules held together and organized by metal ions or clusters (e.g., ZIF-8, CAU, and HKUST). In some embodiments, the metal organic framework (MOF) materials can include surface-mounted metal-organic frameworks (SURMOFs), iso-reticular metal-organic frameworks (IRMOFs), covalent organic framework (COF), zeolitic inorganic framework (ZIF), or a combination thereof. In some embodiments, the metal-organic framework (MOF) material is a porous material. In some embodiments, the metal-organic framework (MOF) materials can be functionalized to bind and interact with various volatile analytes including, but not limited to, ammonia, carbon dioxide, carbon monoxide, hydrogen, amines, methane, oxygen, argon, nitrogen, argon, organic dyes, polycyclic organic molecules, and combinations thereof. In some embodiments, the metal organic framework (MOF) materials can include a chemically-sensitive resistor, where the metal organic framework (MOF) material is disposed in-between conductive leads and undergoes a change in resistance when the material sorbs a volatile analyte. In these embodiments, the change in electrical resistance between the leads can be correlated to the sorption of a volatile analyte to the sensor material. Additional examples of metal organic framework (MOF) materials and their use in sensors can be found in U.S. Pat. Nos. 8,735,161, 8,480,955, and International Application No. PCT/US2015/049402, which are hereby incorporated by reference in their entirety.

In some embodiments, the sensor material 112 includes a zeolitic framework including a plurality of transition metals. Non-limiting examples of transition metals include Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, Uub, and a combination thereof. In some embodiments, the zeolitic framework can include a plurality of linking groups. In some embodiments, the transition metal increases the cationic charge of the zeolitic framework compared an analogous framework lacking a transition metal, thereby increasing selectivity for a volatile analyte.

In some embodiments, the sensing materials for photonic, field effect transistor (FET), and nanogenerator-based sensors can include conducting and non-conducting polymeric networks. In some embodiments, the polymeric networks can be cross-linked (e.g., hydrogels and elastomers) and non-cross-linked. In some embodiments, these materials can undergo changes in optical properties (e.g., due to a refractive index change), electrical properties (e.g., conductance), and physical dimensions (e.g., upon swelling/contraction and a consequent change in refractive index or resistance) in response to sorption of one or more volatile analytes, and which can be analyzed to characterize the analyte. Non-limiting examples of polymers that can form the polymeric network according to some embodiments include polyaniline, polypyrrole, polythiophene, poly(phenylene sulphide-phenyleneamine), perylene tetracarboxylic diimide, polyurethane, polystyrene, poly(methyl methacrylate), polyacrylate, polyalkylacrylate, substituted polyalkylacrylate, polystyrene, poly(divinylbenzene), polyvinylpyrrolidone, poly(vinylalcohol), polyacrylamide, poly(ethylene oxide), polyvinylchloride, polyvinylidene fluoride, polytetrafluoroethylene, and other halogenated polymers, hydrogels, organogels, and combinations thereof. In some embodiments, the polymers can include random and block copolymers, branched, star and dendritic polymers, and supramolecular polymers. In some embodiments, the polymers can include one or more natural materials, such as cellulose, natural rubber (e.g., latex), wool, cotton, silk, linen, hemp, flax, feather fiber, and combinations thereof.

In some embodiments, the sensitivity (i.e., detection limit) of the sensor 108 can be less than 5 ppm, with detectable refractive index change of up to $~10^{-7}$.

In some embodiments, the first layer includes a first porogen and the second layer includes a second porogen. In some embodiments, the first layer and second layer include a plurality of first and second pores, respectively. In some embodiments, the plurality of first and second pores can be defined by interstitial spaces between the plurality of first and second porogens, respectively. In some embodiments, the porogens include nanoparticles.

In some embodiments, the first layer includes first nanoparticles and the second layer includes second nanoparticles. In some embodiments, the first layer and second layer include a plurality of first and second pores, respectively. In some embodiments, the plurality of first and second pores can be defined by interstitial spaces between the plurality of first and second nanoparticles, respectively. Non-limiting examples of nanoparticles include silica and titania. In some embodiments, the nanoparticles include metal nanoparticles. Non-limiting examples of metal nanoparticles, in accordance with some embodiments, include gold, silver, platinum, palladium, ruthenium, rhodium, cobalt, iron, nickel, osmium, iridium, rhenium, copper, chromium, tungsten, molybdenum, vanadium, niobium, tantalum, titanium, zirconium, hafnium, bimetals, metal alloys, and metal compounds, such as pnictides, hydroxides, binary and complex salts, including heteropolyacids and their derivatives, and a combination thereof.

In some embodiments, the mesoporous network of nanoparticle-based sensors can exhibit high sensitivity to relative vapor pressure variations in the chamber 102. Similarly, in some embodiments, the sol-gel precursors of the above metal oxides can be imprinted with sacrificial agents templating the porous structure (porogens, e.g., surfactant molecules, molecular or supramolecular aggregates, colloids, and polymers). Thereby, pre-designed structural (as opposed to textural) porosity can be achieved.

In some embodiments, each of the plurality of the first or second pores can be between about 1 to about 350 nm in diameter. In some embodiments, each of the plurality of the first or second pores can be between about 1 to about 50 nm in diameter. In some embodiments, each of the plurality of the first or second pores can be between about 30 to about 15 nm and about 15 to about 5 nm. In some embodiments, the diameter of each of the plurality of the first or second pores can be about 0.1, 0.5, 1, 5, 10, 12, 15, 20, 25, 30, 35, 40, 45, or 50, 100, 200, 300, 400, or 500 nm in diameter.

In some embodiments, the sensor 108 is selected from the group consisting of a photonic crystal. In some embodiments, the photonic crystal can be a porous photonic crystal (PPC). In some embodiments, the porous photonic crystal can be a 1-dimensional porous photonic crystal, 2-dimensional porous photonic crystal, or 3-dimensional porous photonic crystal.

In some embodiments, the sensor 108 is selected from the group consisting of a field effect transistor. For the electronic sensing according to these embodiments, the gate material for the field-effect transistor (FET) or the material of the nanogenerator electrodes can include one or more micro- and mesoporous layers that permit adsorption of the analyte of interest. In some embodiments, the porous layer can be chemically functionalized, and this functionalization, together with the pore geometry, can collectively affect the diffusion rates of vapor into or within the pores. In some embodiments, the pore geometry, layer thickness, porosity, and surface functionalization can be varied, individually or collectively, to obtain a desired sensitivity to an analyte of interest. Non-limiting examples of field-effect transistors and methods of tuning their sensitivity to a volatile analyte of interest can be found, for example, in International Patent Application No. PCT/IB2007/051764, which is hereby incorporated by reference in its entirety.

In some embodiments of the field effect transistor (FET) sensors, the ratio of the capacitance of the assembly comprising the gate electrode layer and the first dielectric layer to the capacitance of the second dielectric layer is from about 1:1 to about 1:1000. In some embodiments of the field effect transistor (FET) sensors, the relative dielectric constant K of the material of the first dielectric layer has a value of about 1 to about 100. In some embodiments of the field effect transistor (FET) sensors, the relative dielectric constant AT of the material of the second "high K" dielectric layer has a value of about 1,1 to about 100. In some embodiments of the field effect transistor (FET) sensors, the thickness of the first dielectric layer has a value of about 500 nm to about 2000 nm, or about 700 nm to about 1500 nm. In some embodiments of the field effect transistor (FET) sensors, the thickness of the second dielectric layer has a value of about 50 nm to about 1000 nm. In some embodiments of the field effect transistor (FET) sensors, the thickness of the semiconducting layer, as measured in the channel between the source and the drain, has a value of about 2 nm to about 500 nm.

In some embodiments, the sensor 108 is selected from the group consisting of a photomechatronic nanostructure.

In some embodiments, the sensor 108 is selected from the group consisting of a nanogenerators. Non-limiting examples of nanogenerators include surface-acoustic-wave-actuated piezo-electric nanogenerators or triboelectric photonic nanogenerators. Additional non-limiting examples of nanogenerator-based sensors can be found in U.S. Pat. No. 9,595,894, the contents of which are hereby incorporated by reference in their entirety.

In some embodiments, the field-effect transistor (FET) or nanogenerator sensing material can comprise non-porous materials, such as conducting polymers, which exhibit physical changes, e.g., a change of conductance, when exposed to different chemicals. In some embodiments, the gate electrode layer can comprise metals such as Ta, Fe, W, Ti, Co, Au, Ag, Cu, Al, or Ni, or organic materials such as PSS/PEDOT or polyaniline. In some embodiments, the gate electrode material is chosen such that it is a good conductor. In some embodiments, the first dielectric layer can comprise amorphous metal oxides such as $Al_2O_3$ and $Ta_2O_5$, transition metal oxides such as $HfO_2$, $ZrO_2$, $TiO_2$, $BaTiO_3$, $SrTiO_3$, $BaZrO_3$, $PbTiO_3$, and $LiTaO_3$, rare earth oxides such as $Pr_2O_3$, $Gd_2O_3$, and $Y_2O_3$, or silicon compounds such as $Si_3N_4$, $SiO_2$ and microporous layers of SiO and SiOC. In some embodiments, the first dielectric layer can comprise polymers such as SU-8, BCB, PTFE, or even air. In some embodiments, the source electrode and the drain electrode can be fabricated using metals such as aluminium, gold, silver or copper or, alternatively, conducting organic or inorganic materials. In some embodiments, the organic semiconductor can comprise materials selected from poly (acetylene)s, poly(pyrrole)s, poly(aniline)s, poly(arylamine) s, poly(fluorene)s, poly(naphthalene)s, poly(p-phenylene sulfide) s or poly(phenylene vinylene) s. In these embodiments, the semiconductor also may be n-doped or p-doped to enhance conductivity. In some embodiments, the second dielectric layer can include the same materials listed for the first dielectric layer. In some embodiments, the second dielectric layer also shields the layers below from outside conditions, therefore waterproof coatings such as PTFE or silicones may be used in these embodiments.

In some embodiments, the sensor 108 can include an organic semiconductor. Non-limiting examples of organic semiconductors according to one or more embodiments include pentacene, anthracene, rubrene, phthalocyanine, CC, CO-hexathiophene, α-dihexylquaterthiophene, α-dihexylquinquethiophene, α-dihexylhexathiophene, bis(dithienothiophene), dihexyl-anthradithiophene, n-decapentafluorophenylmethylnaphthalene-1-tetracarboxylic diimide, Ceo CeO infused organic polymers, poly(9,9-dioctylfluorene-alt-benzothiadiazole) (F8BT), poly(p-phenylene vinylene), poly(acetylene), poly(thiophene), poly(3-alkylthiophene), poly(3-hexylthiophene), poly(triarylamines), oligoarylamines, poly(thienylenevinylene), and combinations thereof.

In some embodiments, mesoporous sensing materials for photonic, field effect transistor (FET), and nanogenerator-based sensors can be fabricated by alternating spin-, dip-, or spray-coating of nanoparticle suspensions of materials with a high refractive index contrast. Non-limiting examples of materials with high refractive index contrast, in accordance with some embodiments, include silica, alumina, iron oxide, zinc oxide, tin oxide, alumina silicates, aluminum titanate, beryllia, noble metal oxide, platinum group metal oxide, titania, zirconia, hafnia, molybdenum oxide, tungsten oxide, rhenium oxide, tantalum oxide, niobium oxide, vanadium oxide, chromium oxide, scandium oxide, yttria, lanthanum oxide, ceria, thorium oxide, uranium oxide, and other rare earth oxides, and combinations thereof. In some embodiments, such colloidal nanoparticle suspensions can be synthesized by wet-chemistry methods, e.g., sol-gel hydrolysis.

In some embodiments, the sensor material 112 is chemically functionalized. In some embodiments, the chemical functionalization can include hydrophobic groups or hydrophilic groups to alter the adsorption of hydrophilic and hydrophobic vapors. In these embodiments, chemical functionalization, together with the pore geometry, can affect the diffusion rates of volatile analytes into or within the pores. In these embodiments, the pore geometry, layer thickness, porosity, and surface functionalization can be varied, individually or collectively, to obtain a desired sensitivity to an analyte of interest.

In some embodiments, the porous layers of the sensing element can have higher or lower porosity (a fraction of the volume of voids over the total volume) by using nanoparticles of smaller or larger size, respectively, or, alternatively, by using the template sacrificial particles, to tune the relative pressure at which various steps of adsorption happen: mono- and multilayer formation, and condensation. In some embodiments, the pore geometry can be modified by using nanoparticles with an elongated, rounded, rod-like, or star-like shape, with or without sharp corners and with or without hollow pores, to further to tune the relative condensation pressure. In these embodiments, the choice of pores can be aided by measuring the adsorption isotherms that can define the relationship between the pressure and amount of adsorption at a constant temperature. The classification of adsorption isotherms is defined by IUPAC and described in, for example, the IUPAC Technical Report (DOI 10.1515/pac-2014-1117), and can be characterized by the pore size, shape and surface character of the material. 1) In some embodiments, reversible type I isotherms are given by microporous solids having relatively small external surfaces (e.g., some activated carbons, molecular sieve zeolites, and certain porous oxides). 2) In some embodiments, reversible type II isotherms are given by the physisorption of gases on non-porous or macroporous adsorbents. 3) In some embodiments, type III isotherms have no identifiable monolayer formation; the adsorbent-adsorbate interactions are relatively weak and the adsorbed molecules are clustered around the most favorable sites on the surface of a nonporous or macroporous solid. 4) In some embodiments, type IV isotherms are given by mesoporous adsorbents. 5) In some embodiments, type V isotherms are for porous materials and materials that have the weak interaction between the adsorbate and adsorbent. 6) In some embodiments, type VI isotherms are representative of layer-by-layer adsorption on a highly uniform nonporous surface.

In some embodiments, changing the thickness of the crystal through the addition of more layers or the thickness of the layers themselves, the shape and intensity of the photonic bandgap and the diffusion path for the molecules that are adsorbed into the sensor can be tuned. In these embodiments, for example, the analytes take a longer time to reach steady state for a thicker sensor. In some embodiments, the sensing performance can be tuned through the alteration of the hydrophobicity or the hydrophilicity of the surface to enhance the affinity of the sensor to more hydrophobic hydrophilic vapors, respectively.

In some embodiments, the separation distance between the injection site 106 and the sensor 108 can be varied to tune the sensitivity of the device for analyzing volatile liquid mixtures. In these embodiments, the separation distance 118 between the injection site 106 and the sensor 108 can be less than about 1 mm to more than about 1 m. In these embodiments, the separation distance between the injection site 106 and the sensor 108 can be less than about 1 cm to more than about 1 m. In these embodiments, the separation distance between the injection site 106 and the sensor 108 can be about 3 to about 8 cm. In these embodiments, the separation distance 118 between the injection site 106 and the sensor 108 can be about 8 cm.

In some embodiments, the photonic crystals can be a thin film on a transparent substrate, e.g., glass, the shape of which can be, for example, flat, round, spherical, and the like.

Detection Time of the Sensor

In some embodiments, the detection time of the sensor 108 depends upon the configuration of the device 100, including, for example, the position of the sensor 108 on or in the chamber 102, the speed of the injection into the injection port 104, the volume of the volatile liquid mixture injected, the possibility of liquid or vapor leakage from the chamber 102, separation 118 between the sensor 108 and the injection site 106, the wettability of one or more inside surfaces of the chamber 102, and the porosity and surface chemistry of the sensor material 112.

In some embodiments, the detection time of the sensor 108 can be shortened by reducing the separation 118 between the sensor 108 and the injection site 106. In these embodiments, the separation 118 between the sensor 108 and the injection site 106 can be reduced by decreasing the height of the chamber 102 or by reducing the length of a non-straight flow channel in a chamber of complex shape. In some embodiments, the reduction of the detection time is proportional to the squared separation distance 118 between the sensor 108 and the injection site 106, as Fickian diffusion can dominate the transport process. However, in these embodiments, as the separation distance 118 is reduced, convective transport introduced by the injection of the volatile liquid mixture dominates and can shorten the injection time further by about 2 to about 20 times.

In some embodiments, the detection time can be adjusted by tuning the wettability of the injection surface, e.g., through surface chemical and topographic patterning of one or more inside surfaces of the chamber 102. In some embodiments, increasing the wettability of the injection site 106 or the one or more inside surfaces of the chamber 102, the area of evaporation of the volatile liquid mixture and, therefore, the evaporation speed increase. In some embodiments, this allows manipulation of boundary layer flows between more laminar to more turbulent, which further allows shortening of the detection time by 2 to 20 times.

Furthermore, in some embodiments, the kinetics discussed above can be tuned by the temperature of the device. In some embodiments, evaporation and diffusion are accelerated by elevating the temperature, while condensation is inhibited. In these embodiments, this can allow further tuning of the competition between evaporation and condensation in the sensor to specific applications. In some embodiments, the temperature can increase slowly or in steps to promote the evaporation of increasingly heavy compounds. In these embodiments, this may be useful for analysis of non-volatile components in crude oils. Non-limiting examples of liquids that can contain non-volatile compounds include heavy crude oils, machine oils, biological fluids (e.g., blood and urine).

In some embodiments, the detection time of the sensor 108 depends upon the porosity and surface chemistry of the sensor material 112. In some embodiments, the sensor material 112 has a pore size of about 1 to about 50 nm. In some embodiments, the sensor material 112 has a pore size of about 1, 5, 10, 15, 20, 25, 30, 35, 40, 45, 50 nm.

Sensor Response

In some embodiments, the plurality of non-equilibrium sensor responses can include a spectral response. In some embodiments, the spectral response can include a bandgap shift. In some embodiments, the plurality of non-equilibrium sensor responses (e.g., spectral responses or bandgap shift) can be detected using a spectrometer or a spectrophotometer.

In some embodiments, the plurality of non-equilibrium sensor responses can include a color change. In some embodiments, the color change can be detected using a camera. In some embodiments, the camera can be a smartphone camera. In these embodiments, the color change detected by the camera can be converted into a spectral response. For example, as shown in FIG. 9H according to one or more embodiments, one or more photographs or videos of the sensor can be recorded with a camera (e.g., smartphone camera) over time, resulting in a plurality of images that show a change in the color of the sensor in response to sorption of volatile analytes. In these embodiments, these images can be converted to an RGB color model, which can in turn be converted to a HSV color model. In these embodiments, the wavelength corresponding to each color present in the HSV color model can be estimated, which can provide the spectral shift.

In some embodiments, the plurality of non-equilibrium spectral responses can include contour plots, wavelength derivative plots, Fourier amplitude and phases, and their derivatives, histogram of gradients, wavelet transforms, and a combination thereof.

Injection Port

In some embodiments, the size and shape of the injection needle, as well as its height above the injection surface, can impact the introduction of convection into the chamber. In these embodiments, smaller injection ports that can produce smaller droplets can introduce less convection. In some embodiments, higher injection rates can increase the magnitude of convection up to a rate of, for example, about 6 mL/min leading to a reduction in the response time. In some embodiments, larger injection volumes can lead to a reduction in the response time up to around 1 mL of injected volume for (e.g., for an 8 cm tall, 56 mL volume injection port).

Injection Site

In some embodiments, the separation of the injection site and the sensor is important. In these embodiments, positioning of the injection site so as to, for example, inhibit or promote the convection or evaporation of the liquid (e.g., by using an inclined plane for injection, an adsorbent material to inject onto, or the like). In some embodiments, it can be possible to miniaturize the sensor design using, for example, microfabrication. In these embodiments, the injection site can be on top of a channel (e.g., a microfluidic channel) that leads to the sensor.

Non-Volatile Contaminants

In some embodiments, the device 100 is further capable of analyzing one or more non-volatile contaminants in the volatile liquid mixture in accordance with any one or more embodiments of the device described herein. In some embodiments, the analyzing the one or more non-volatile contaminants can include measuring the concentration of the contaminant and identifying the chemical composition of the contaminant, or the change over time thereof.

Non-limiting examples of non-volatile contaminants include water (e.g., phase-separated, emulsified, and dissolved), hydrogen sulfide, and sediments.

In some embodiments, the device 100 is capable of analyzing, for example, water (e.g., phase-separated, emulsified, and dissolved), hydrogen sulfide, and sediments in crude oil samples.

Analysis of Volatile Liquid Mixtures Using Machine Learning

In some embodiments, the disclosed methods and devices for analyzing volatile liquid mixtures via detecting the plurality of non-equilibrium sensor responses uses data acquisition and analysis routines. In these embodiments, the data acquisition and analysis routines can lead to a high dimensionality, i.e., the number of possible independent variables, of the sensing platform, which was not possible with other single-output and combinatorial steady-state sensors, and which can be implemented to perform the compositional analysis of volatile analytes that are not included in a data library (i.e., "unknowns") via supervised and unsupervised machine learning frameworks (MLFs).

In some embodiments, the machine learning frameworks facilitate the characterization and classification of single-component and volatile liquid mixtures, as well as the recognition of specific components, for example through the formation of a library of sensor responses 114. In some embodiments, the use of an array of photonic structures or field effect transistors (FETs) with the same or different porosities and surface functions can enhance the accuracy and precision of the machine learning methods. In some embodiments, various machine learning (or "self-learning") algorithms can be implemented to perform classification, regression, and clustering tasks. In some embodiments, various machine learning (or "self-learning") algorithms can, in part, enable analysis of the composition of the volatile liquid mixture and reveal contaminants (e.g., water) therein. Non-limiting examples of the machine learning algorithms include supervised machine learning algorithms, unsupervised machine learning algorithms, semi-supervised machine learning algorithms, support vector machines, transfer learning neural networks, and segmented regression algorithms.

In some embodiments, the experimentally obtained data can first be pre-processed to extract nuanced independent features from the plurality of non-equilibrium spectral responses 114 (e.g., via contour plots, Fourier transform amplitudes and phases and their derivatives, wavelength derivative plots, histogram of gradients, or wavelet transforms), and then imported into a classifier, e.g., a support vector machine or principal components analyzer, or a regressor (e.g., linear, radial basis function, LASSO, or ridge support vector regressors) with optimized performance, to perform pattern recognition and discrimination of the composition of the volatile liquid mixture. In some embodiments, monitoring the response of a photonic sensor can be performed using a spectrometer or a camera and converting the recorded data into color models. In some embodiments, monitoring the response of a field effect transistor (FET) sensor or nanogenerator can be performed through measuring the current-voltage signal or the time-dependent current change. In some embodiments, the obtained profiles can be further processed and combined into data vector for further classification.

In some embodiments, the choice of machine learning framework can vary as a function of the application. In some embodiments, where signal processing is performed, to obtain a list of features from the measured data, support vector machines are a useful first choice. In these embodiments, support vector machines can be used for classification of analytes into hazard classification, compound classes, or based on other features using support vector classifiers. In addition, in these embodiments, support vector regressors are suitable for analyses of concentration ranges and physical parameters. In some embodiments, more specialized classification and regression algorithms, such as bagging classifiers, can be useful to, for example, divide the dataset for further analysis or segment a range of mixtures into smaller regression ranges. In some embodiments the sensor data is used without post-processing. In these embodiments, advanced machine learning frameworks, such as neural networks, transfer learning, and deep neural networks, are useful. In these embodiments, transfer learning, in particular, can be applied to improve sensor accuracy with limited datasets.

EXAMPLES

Characterization of Volatile Liquid Mixtures

In some embodiments, volatile liquid mixtures can be characterized by their distillation curves ($\Delta$m(T)), which describe the changes of the weight ($\Delta$m) of the liquids due to evaporation in a series of equilibrium heating stages at temperatures $T_i$. In some embodiments, distillation curves of a volatile liquid mixture can be obtained experimentally, e.g., through performing physical distillation, or predicted based on a compositional analysis (e.g., using chromatographic methods) and simulations. In some embodiments, determination of the distillation curve allows for the classification of volatile liquids, for example, in appropriate "packing group." In some embodiments, the packing group ("PG") is assigned to dangerous goods according to the degree of hazard they present. In some embodiments, the packing group (PG) is defined based on the initial boiling point ("BP") and flashpoint of the mixture. In some embodiments, mixtures belonging to packing group I (PGI) have boiling points (BP)$\leq$35° C.; to packing group II (PGII) have boiling points (BP)>35° C. and flashpoint <23° C.; and to packing group III (PGIII) have boiling points (BP)>35° C. and flashpoint $\geq$23° C. In some embodiments, proper classification can help to ensure that the liquid is properly packaged and that any potential hazards are accurately communicated to emergency responders. In some embodiments, certain measurements of the physical properties of volatile liquid mixtures, in particular crude oils, such as the Reid vapor pressure, true vapor pressure, and density, do not result in reliable estimations of the composition of the mixture due to the fact that the same vapor pressure values as well as the same density values can be obtained using different combinations of various components of a particular mixture. Moreover, in these embodiments, pressure measurements are prone to variations due to the influence of dissolved gasses (such as air, methane, ethane, and others) and potential leaks in the test chamber. Therefore, more precise methods that are sensitive to the physical parameters as well as to the chemical composition of the test liquids are needed.

In some embodiments, theoretical modeling of the kinetic profile of an optical sensor or field-effect transistor (FET) sensor can be challenging. Furthermore, in some embodiments, aspects of the particular design of an experimental setup, for example, the position of the sensor, the speed of injection, the volume of the analyte liquid, and/or the possibility of vapor leakage from the test chamber, can further affect the experimental results and complicate the interpretation of the sensor response.

Detection Time of the Sensor

To quantify the balance between convective and diffusive transport in setting the detection time of the sensor, Schlieren experiments were performed to visualize slight differences in refractive indices between the evaporating liquid vapor and the analyte vapors filling the chamber. In some embodiments, the velocity strongly depends on the injection rate and volume, and continuously increases while liquid is being injected, then decreases after injection. In some embodiments, at certain injection rates and volumes, the velocity, $\upsilon$, was about 0.25 cm/s. In some embodiments, using the Peclet number (Pe=$\upsilon$L/D), the relative importance of advection and diffusion using the velocity determined in the Schlieren experiments can be quantified. In some embodiments, for certain volatile organic compounds the diffusion coefficient is less then D=0.1 cm$^2$/s in air (e.g., for pentane in air pentane, D=0.085 cm$^2$/s), thus the Peclet number for the instant device varied between 0.05 and 0.2, suggesting that the effect of convection was smaller than diffusive transport but not negligible. Additionally, because, in some embodiments, the velocity of the vaporized analytes decreases after injection, convective transport is more important in designs with smaller separations between the sensor and the injection site, where the overall detection takes less time.

Examples of Complex Liquid Analysis Using 1D Porous Crystals

Demonstrations of various features of the method for analyzing mixtures of volatile substances in accordance with some embodiments were performed using a one-dimensional porous photonic crystal. An examplary one-dimensional porous photonic crystal included 6 alternating bilayers of SiO$_2$ (silica) and TiO$_2$ (titania) nanoparticles deposited onto a glass substrate. Although several examples of 6-bilayer porous photonic crystals are shown and described herein, the device and methods described herein are not limited to 6-bilayer porous photonic crystals, and other configurations, including porous photonic crystals including 0.5-50 bilayers, are also contemplated. In addition, although multi-bilayer porous photonic crystals are described herein, by way of example, to include silica and titania layers, other layer compositions having similar functionality are also contemplated, including any combination of, for example, silica, titania, zirconia, yttria, ceria, iron oxide, tin oxide, and silver oxide.

Figures 2A, 2B:
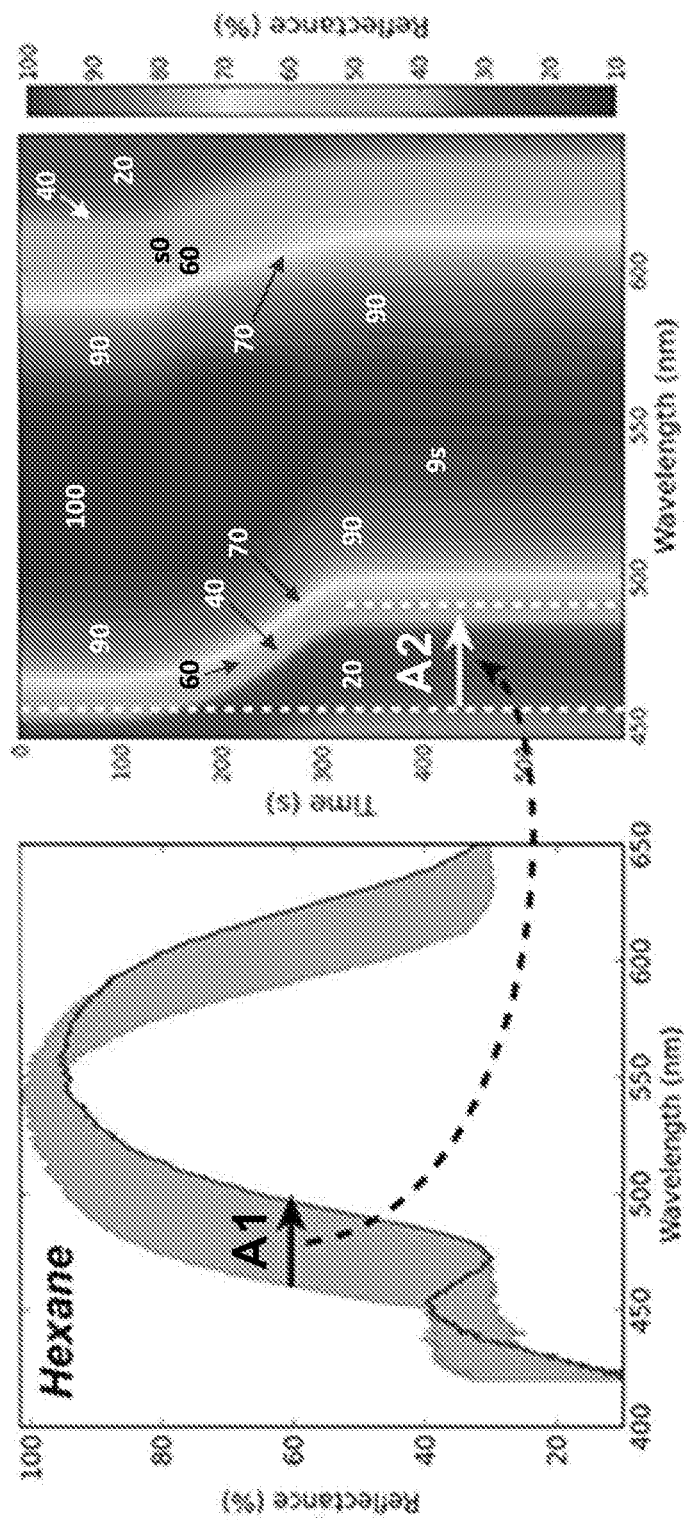
FIG. 2A shows the evolution of a reflection spectrum for a six-bilayer porous photonic crystal upon adsorption of evaporating hexane, according to one or more embodiments.
FIG. 2B shows a two-dimensional map of the collection of the reflection spectrum for the six-bilayer porous photonic crystal of FIG. 2A, according to one or more embodiments.

Diffusion and sorption of a vapor molecule within the 1D porous photonic crystal were observed to result in spectral changes that were monitored using a spectrophotometer in a reflection mode, in one or more embodiments. An example of changes, or "evolution," in the reflection spectrum (for normally-incident light) induced by an exposure of the 6 bilayer titania/silica 1D porous photonic crystal to hexane vapor is shown in FIG. 2A. As shown in FIG. 2A, a time-dependent red shift of ~40 nm (indicated by arrow "A1") of the spectrum upon adsorption of evaporating hexane occurred during a 600-second experiment in a non-sealed chamber connected to the outside atmosphere through a small opening. The spectral evolution shown in FIG. 2A was also represented as a two-dimensional map of the collection of the reflection spectra (FIG. 2B), in which the y-axis is time (e.g., in seconds), the x-axis is the wavelength (e.g., in nm), and the color (or brightness, as shown in grayscale) is the intensity of the reflected light. As shown in FIG. 2B, a dynamic shift in the position (indicated by arrow "A2") and reflection magnitude (indicated by a brightness gradient) of the spectrum before (at $t_0=0$ seconds) and after injection of 1 mL hexane and its subsequent evaporation, diffusion, and sorption into the photonic crystal (at $t_{final}=600$ seconds) was observed. Quasi-equilibrium in the semi-open chamber with hexane was reached within ~210 seconds (note that the first 60 seconds of the spectrum were acquired for a photonic crystal with empty pores prior to injecting the hexane liquid to serve as a baseline).

Figure 3B:
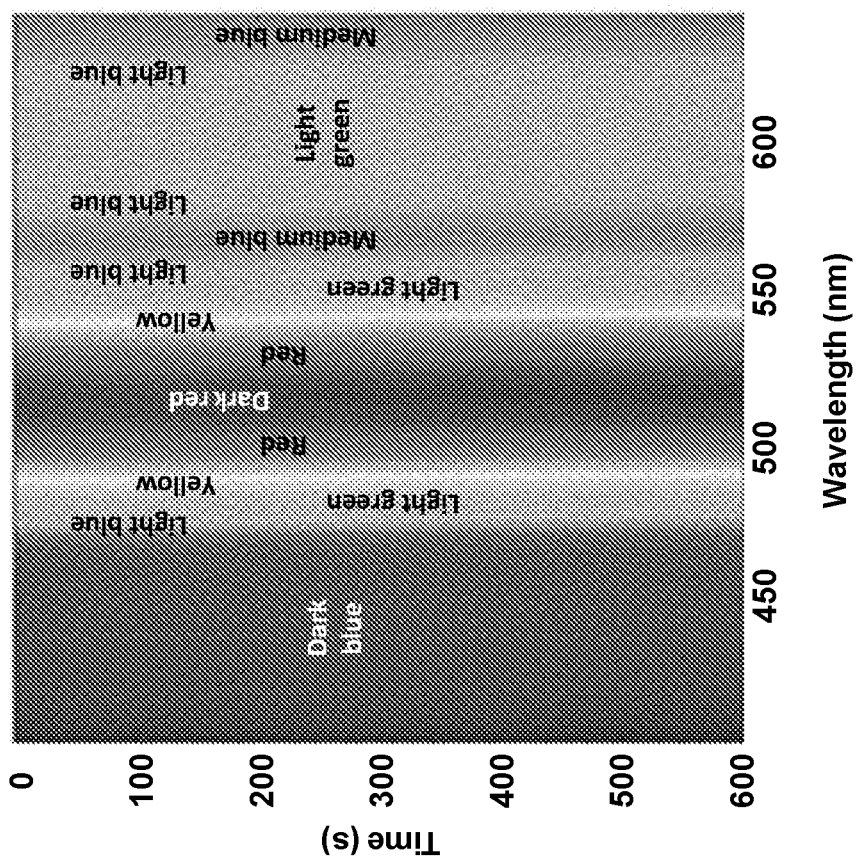
FIG. 3B shows a two-dimensional response map for the silica inverse opal of FIG. 3A upon exposure to hexane, according to one or more embodiments.
Figure 3A:
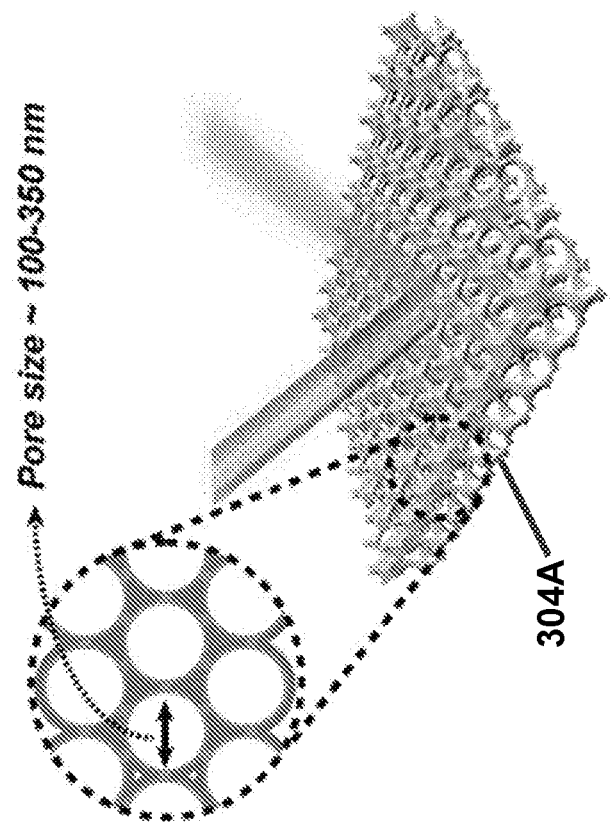
FIG. 3A shows a silica inverse opal, according to one or more embodiments.
Figure 3D:
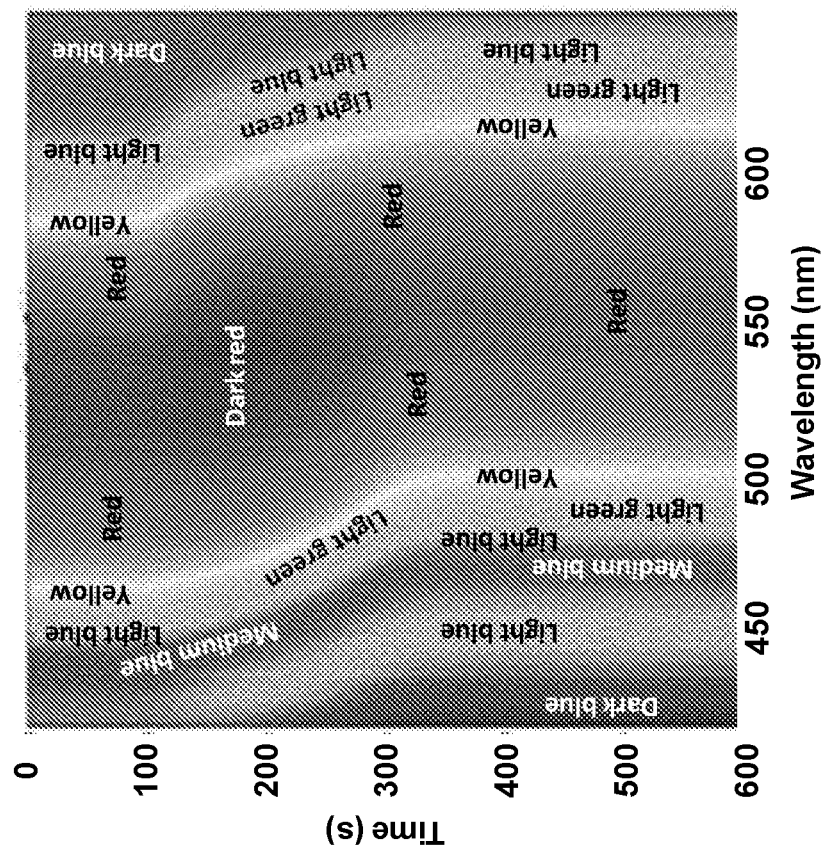
FIG. 3D shows a two-dimensional response map for the six-bilayer titania/silica porous photonic crystal of FIG. 3C, according to one or more embodiments.
Figure 3C:
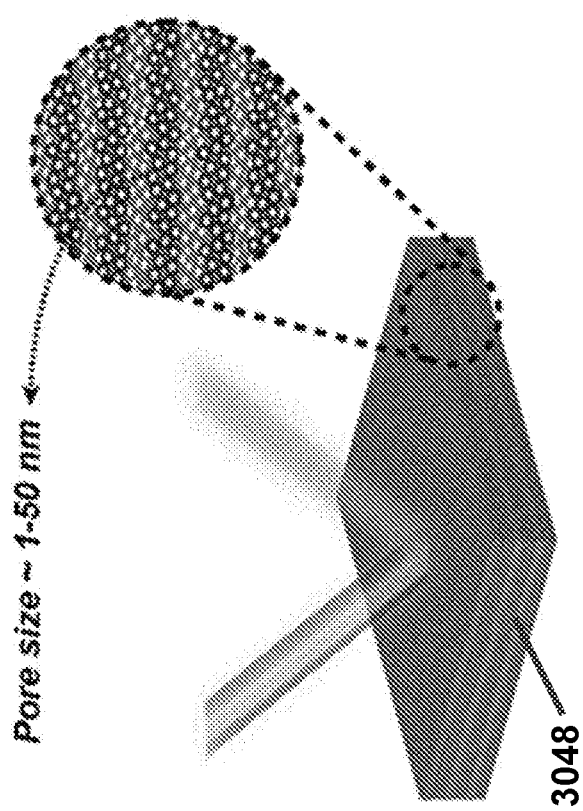
FIG. 3C shows a six-bilayer titania/silica porous photonic crystal, according to one or more embodiments.
Figure 3E:
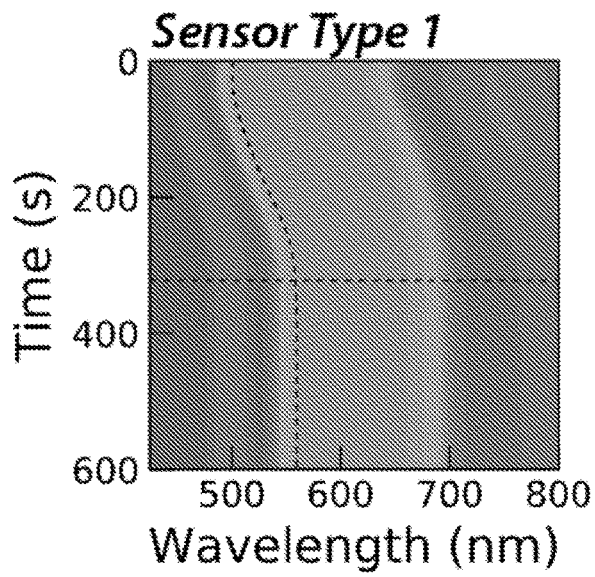
FIG. 3E shows a two-dimensional response map for the six-bilayer titania/silica porous photonic crystal of FIG. 3C, where the silica nanoparticles have an average diameter of 7 nm, according to one or more embodiments.

The choice of the one-dimensional porous photonic crystal, as opposed to a three-dimensional porous photonic crystal, such as an inverse opal, was made due to the characteristic pore sizes (1 nm-50 nm for micropores and mesopores of the one-dimensional porous photonic crystal versus 100 nm-1000 nm for the three-dimensional porous photonic crystal) that allowed efficient sorption and optical detection of vapors, in some embodiments. Schematic illustrations of the three-dimensional and one-dimensional porous photonic crystals, as well as the evolution of their spectral responses upon exposure to hexane vapors, are shown in FIGS. 3A-3B and FIGS. 3C-3D, respectively. FIG. 3A shows a schematic representation of a three-dimensional porous photonic crystal (silica inverse opal), which had an average pore size of ~100 nm-350 nm. FIG. 3B shows a two-dimensional response map obtained using an inverse opal with 290 nm pores exposed to hexane. No significant shift of the reflection spectrum was observed. By contrast, FIG. 3C shows a 6-bilayer titania/silica one-dimensional photonic crystal with textural porosity produced by the interstitial pores of neighboring 5-10 nm titania and 35 nm silica particles, and, in the corresponding response map of FIG. 3D, a significant red shift (~40 nm) of the photonic band gap of the photonic crystal of FIG. 3C was observed upon exposure to hexane. As shown in FIGS. 3A-3D, given the same thermodynamic conditions, the inverse opal (FIGS. 3A-3B) showed no response, whereas the spectrum of the one-dimensional porous photonic crystal (FIGS. 3C-3D, including a 6-bilayer titania ($TiO_2$)/silica ($SiO_2$) stack) red-shifted for ~40 nm. In other words, at the same relative vapor pressures of hexane, the large pores of the inverse opal remained unfilled, while the smaller pores of the nanoparticle-based one-dimensional photonic crystal were significantly filled. In some embodiments, the response of the three-dimensional porous photonic crystal can, however, be enhanced by templating the matrix of the inverse opal structure (bulk silica) with porogens (e.g., surfactant micelles) in order to add micro- and mesoporosity, or if replaced by inherently vapor-responsive materials (e.g., polymers).

Figure 3F:
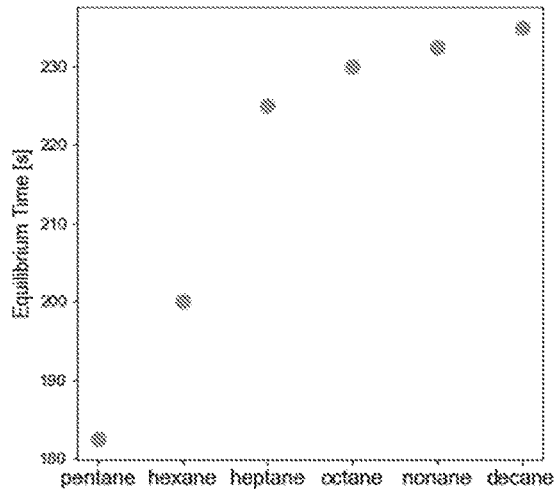
FIG. 3F shows the time to steady-state for the six-bilayer titania/silica porous photonic crystal of FIG. 3E, according to one or more embodiments.
Figure 3G:
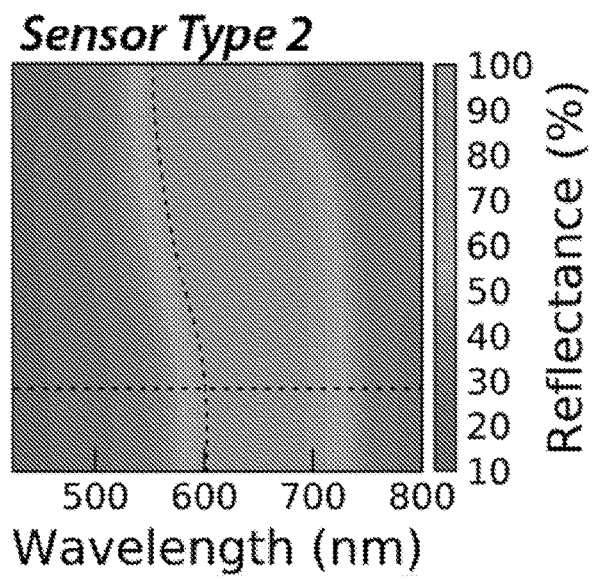
FIG. 3G shows a two-dimensional response map for the six-bilayer titania/silica porous photonic crystal of FIG. 3C, where the silica nanoparticles have an average diameter of 22 nm, according to one or more embodiments.
Figure 3H:
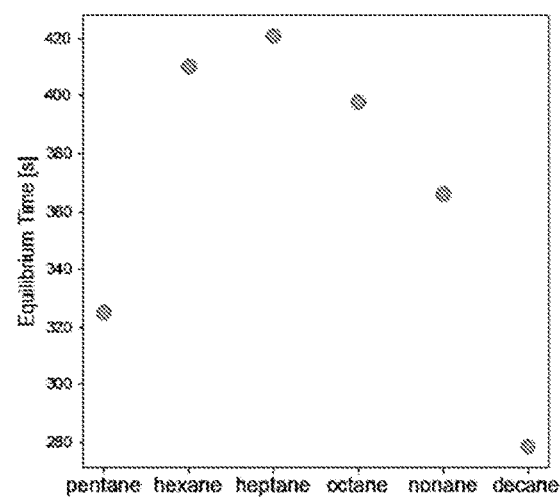
FIG. 3H shows the time to steady-state for the six-bilayer titania/silica porous photonic crystal of FIG. 3G, according to one or more embodiments.
Figure 3J:
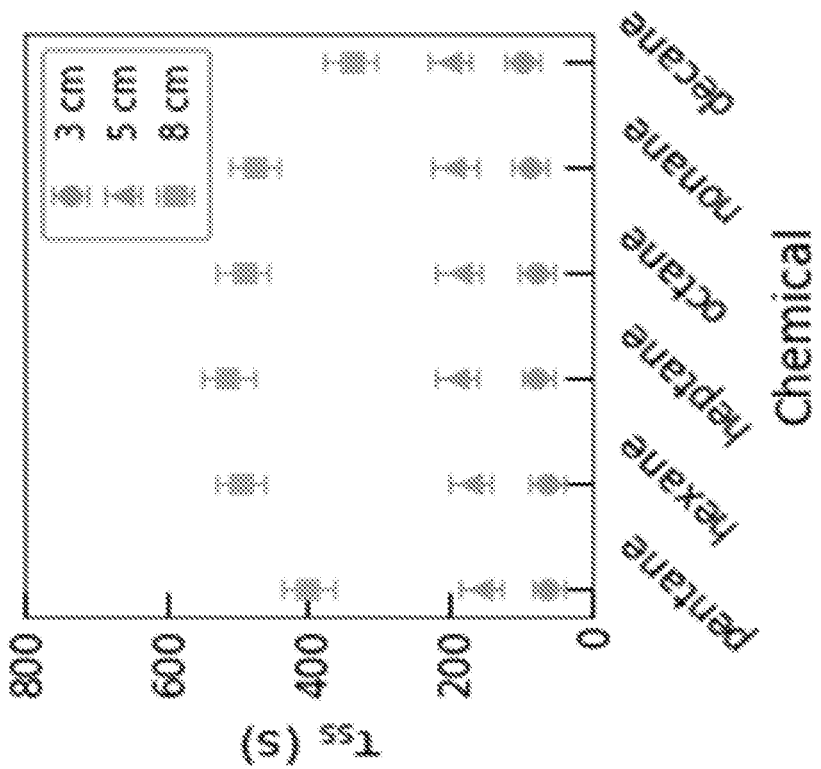
FIG. 3J shows an advection-diffusion regime for a silica/titania porous photonic crystal placed at different heights within the device, according to one or more embodiments.
Figure 3I:
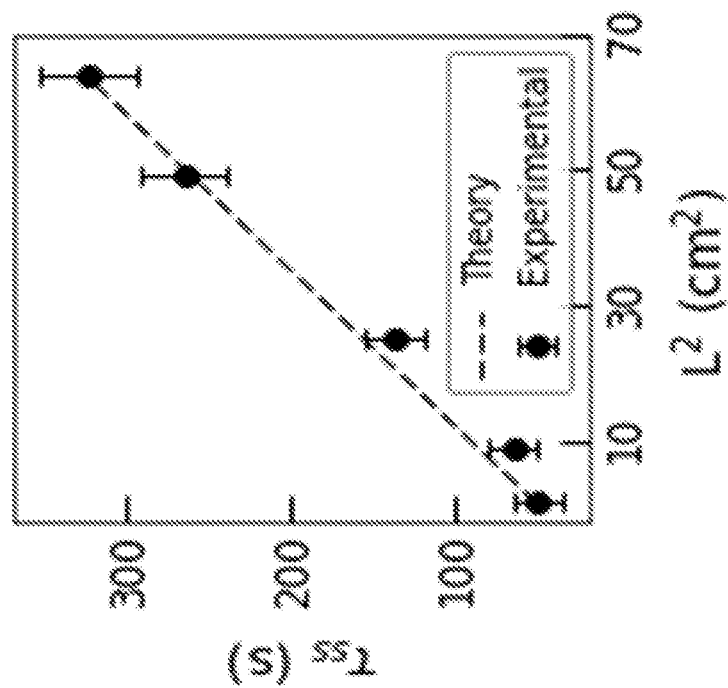
FIG. 3I shows that the time to steady state for a six-bilayer silica/titania porous photonic crystal placed at various heights above the injection site follows a Fickian diffusion equation, according to one or more embodiments.

FIGS. 3E-3K demonstrate the influence of changing the porosity of the sensor on the response time and the discrimination power (or the ability to discriminate among N types of analytes), according to some embodiments. In some embodiments, FIGS. 3E-3H show two-dimensional response maps for two types of six-bilayer porous photonic crystals composed of the same titania nanoparticles, yet different silica nanoparticles: sensor 1 (FIG. 3E) is based on the Ludox SM30 silica nanoparticles with an average diameter of 7 nm and a higher porosity (30% for the silica layer), whereas sensor 2 (FIG. 3G) is based on the Ludox TM40 silica nanoparticles with an average diameter of 22 nm and a lower porosity (10% for the silica layer). As shown in FIG. 3F and FIG. 3H, the time to a steady-state and the shape of the plot are significantly different for the sensors 1 and 2 for measuring linear hydrocarbons, and by tuning the composition of the crystal the non-linearity of the crystal steady-state time can be minimized, leading to response kinetics tuned for the chosen analytes. Thus, in these embodiments, sensor 1 with higher porosity, shows better performance in distinguishing C5-C10 hydrocarbons than sensor 2, with lower porosity.

Figure 3K:
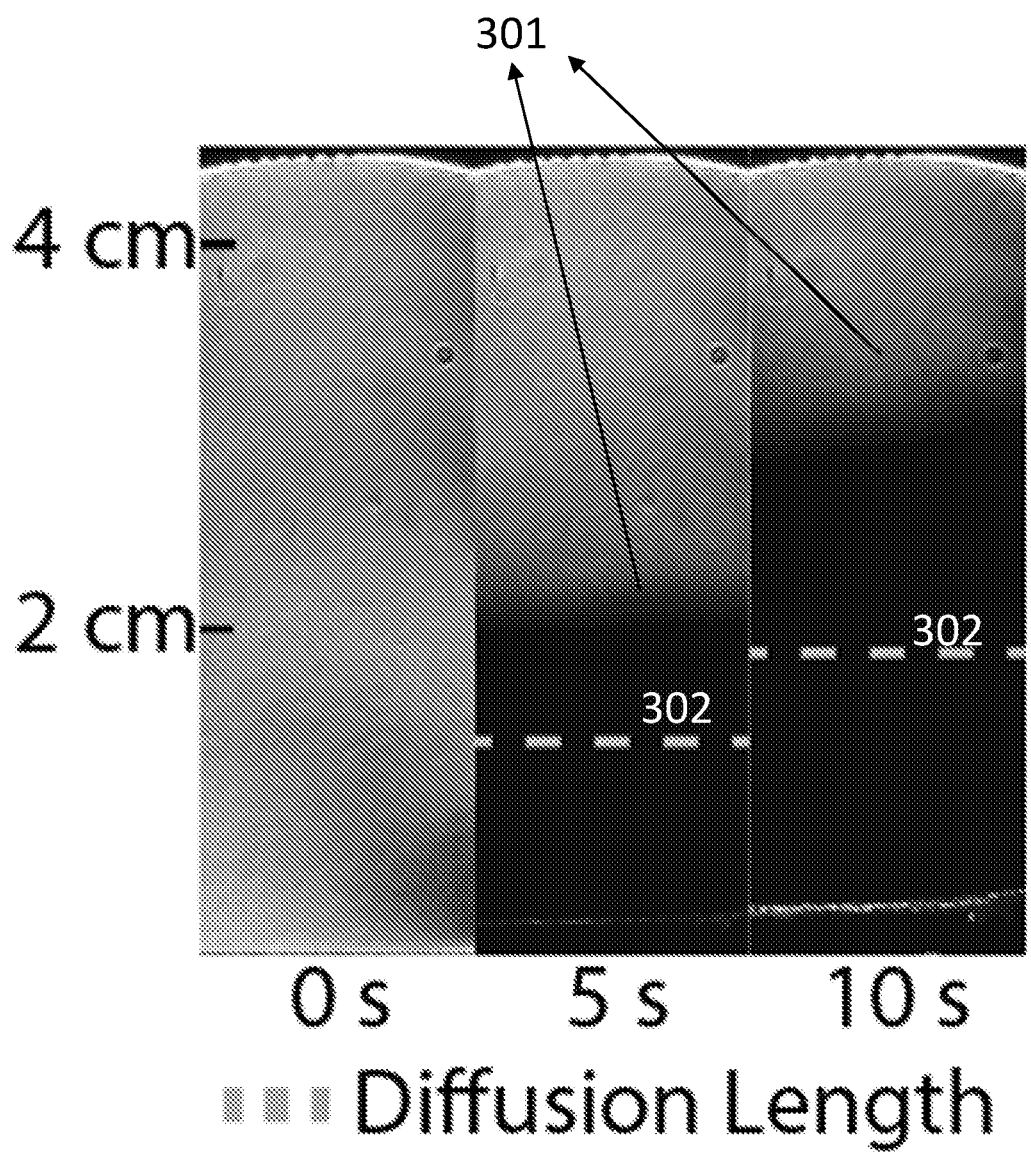
FIG. 3K shows Schlieren photographs of the pentane vapor captured at 0, 5 and 10 s after injection into the device, according to one or more embodiments.
Figure 4I:
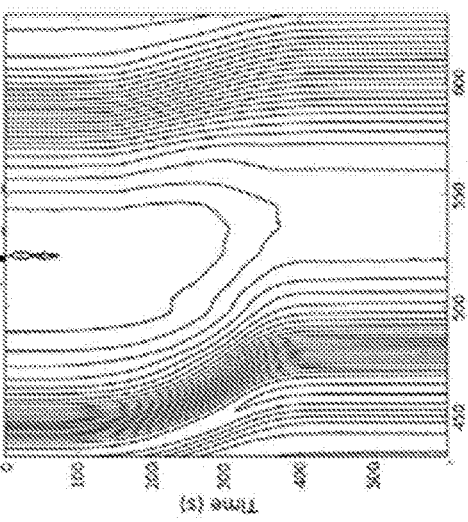
FIG. 4I shows a contour map corresponding to the two-dimensional time response map of FIG. 4C, according to one or more embodiments.
Figure 4L:
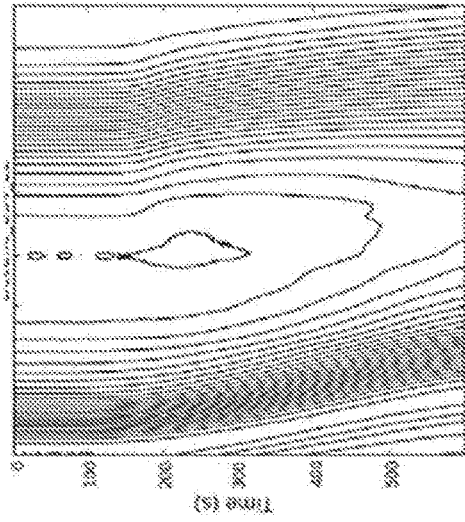
FIG. 4L shows a contour map corresponding to the two-dimensional time response map of FIG. 4F, according to one or more embodiments.
Figure 4H:
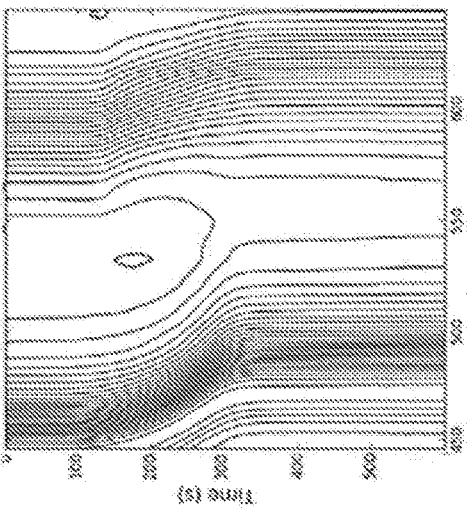
FIG. 4H shows a contour map corresponding to the two-dimensional time response map of FIG. 4B, according to one or more embodiments.
Figure 4K:
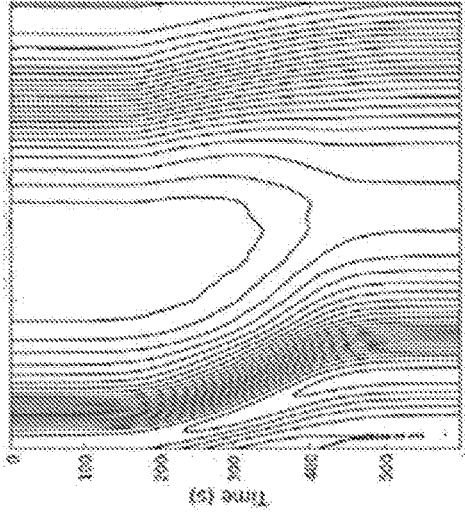
FIG. 4K shows a contour map corresponding to the two-dimensional time response map of FIG. 4E, according to one or more embodiments.
Figure 4G:
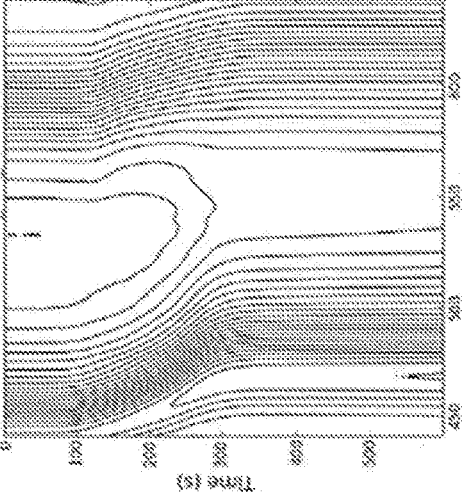
FIG. 4G shows a contour map corresponding to the two-dimensional time response map of FIG. 4A, according to one or more embodiments.
Figure 4J:
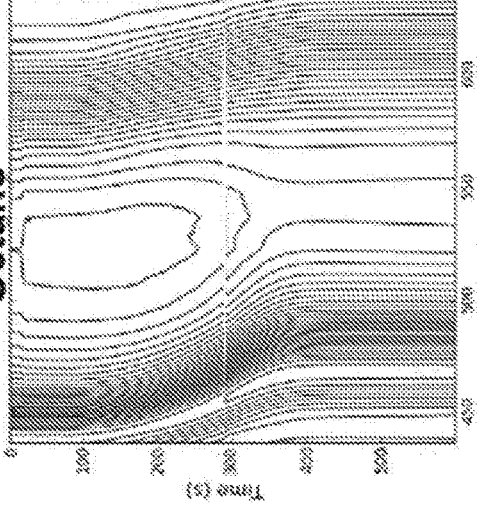
FIG. 4J shows a contour map corresponding to the two-dimensional time response map of FIG. 4D, according to one or more embodiments.

In some embodiments, FIG. 3F demonstrates that the time to a steady state ($\tau_{ss}$) for a six-bilayer silica/titania porous photonic crystal placed at various heights (L) above the injection site follows the Fickian diffusion equation ($\tau_{ss}\sim 1.2$) for the pentane vapor. In these embodiments, FIG. 3G shows that $\tau_{ss}$ for the silica/titania porous photonic crystals placed in various devices (with heights of 3, 5, and 8 cm) no longer follow the trends predicted by the Fickian diffusion equation for the hydrocarbons other than pentane (C6-C10), signifying an advection-diffusion regime. In these embodiments, FIG. 3K shows the Schlieren photographs of the pentane vapor captured at 0, 5 and 10 seconds after the injection of pentane into the 8 cm long cuvette. The images show, in these embodiments, that the vapor in the cuvette is governed by the advection-diffusion equation $$\frac{dC}{dt} = D\frac{d^2C}{dx^2} - v\frac{dC}{dx},$$

where C is the concentration, D is the diffusion coefficient, and v is the flow velocity), as opposed to diffusion-only regime. In these embodiment, the dark-shaded pentane vapor front 301 is well in advance of the calculated Fickian diffusion lengths 302 for the corresponding times (0, 5 and 10 s), as depicted with dashed lines. In these embodiments, selection of the flow regime allows for further tuning the response kinetics of the sensor, and allows for a reduction of the detection time for less volatile analytes from 60-90 min to <10 min, and, together with the selection of the sensor's architecture, e.g., porosity and thickness, can allow for a better discrimination of the analytes.

The same 6 bilayer titania/silica one-dimensional porous photonic crystal described in FIGS. 3A-3K was further used to detect linear hydrocarbons of varying chain length (e.g., C5 to C10). The corresponding two-dimensional time response maps of the spectral response are shown in FIGS. 4A-4F, for alkanes with increasing chain lengths: pentane, hexane, heptane, octane, nonane, and decane, respectively. In these embodiments, these maps demonstrate how the response time of the photonic crystal was prolonged with an increase in the boiling point of the solvent. The horizontal dashed lines spanning FIGS. 4A-4F were added for guiding the human eye to see the difference in the response kinetics for different organic compounds. For convenience, the same results shown in FIGS. 4A-4F are presented in the form of contour maps of constant reflection values in FIGS. 4G-4L (also corresponding to pentane, hexane, heptane, octane, nonane, and decane, respectively).

In one or more embodiments, the above examples represent how choosing the most optimal combination of the chamber design and sensor properties can lead to highly selective and sensitive sensing.

Simulation of Evaporation and Diffusion in the Experimental Chamber

Two-dimensional and three-dimensional simulations of the vapor evaporation and diffusion phenomena in the test chamber were carried out using COMSOL Multiphysics, "Transport of Concentrated Species" Module. The simulation was based on solving the Maxwell-Stefan multi-component diffusion equation that, in some embodiments, models the mass transfer of a desired liquid mixture. For concentrated solutions or vapor mixtures, where more than one chemical compound was present in significant mass fractions, the diffusion coefficient was composition-independent. The diffusion coefficient was a tensor and the equation for diffusion was altered to relate the mass flux of one chemical compound to the concentration gradients of all chemical species present. The following diffusion coefficients obtained from the literature were input into the program: $7.32 \times 10^{-6}$ $m^2/s$ for hexane in air, $8.42 \times 10^{-6}$ $m^2/s$ for pentane in air, $10^{-5}$ $m^2/s$ for pentane in hexane and vice versa. In Maxwell-Stefan diffusion, a practical choice of dependent variables are not the compound concentrations, but rather the mole or mass fractions. Therefore, the diffusive mass flux of each compound was expressed based on the gradients of the mole or mass fractions, using multicomponent diffusion coefficients. A "Laminar Fluid Flow" module was also added in COMSOL to allow for the consideration of vapor pressure gradients that form due to the initial evaporation of the sample by means of solving the Navier-Stokes equations. The source for the fluid flow was selected via the "Mass Inlet Flow" condition. The magnitude of the inlet was dynamically determined during the simulation by integrating the mass flux vector of the evaporating boundary calculated by the "Transport of Concentrated Species" module. The vapor in the system was allowed to be slightly compressible. The boundary conditions in the system were chosen so that the outlet is set to 1 atmosphere and the remaining boundaries were "wall" no-slip boundary conditions. Flow in the system due to pressure gradient was apparent in the first few seconds of the simulation. This transient pressure gradient drastically accelerated the kinetics of the system.

Figure 15A:
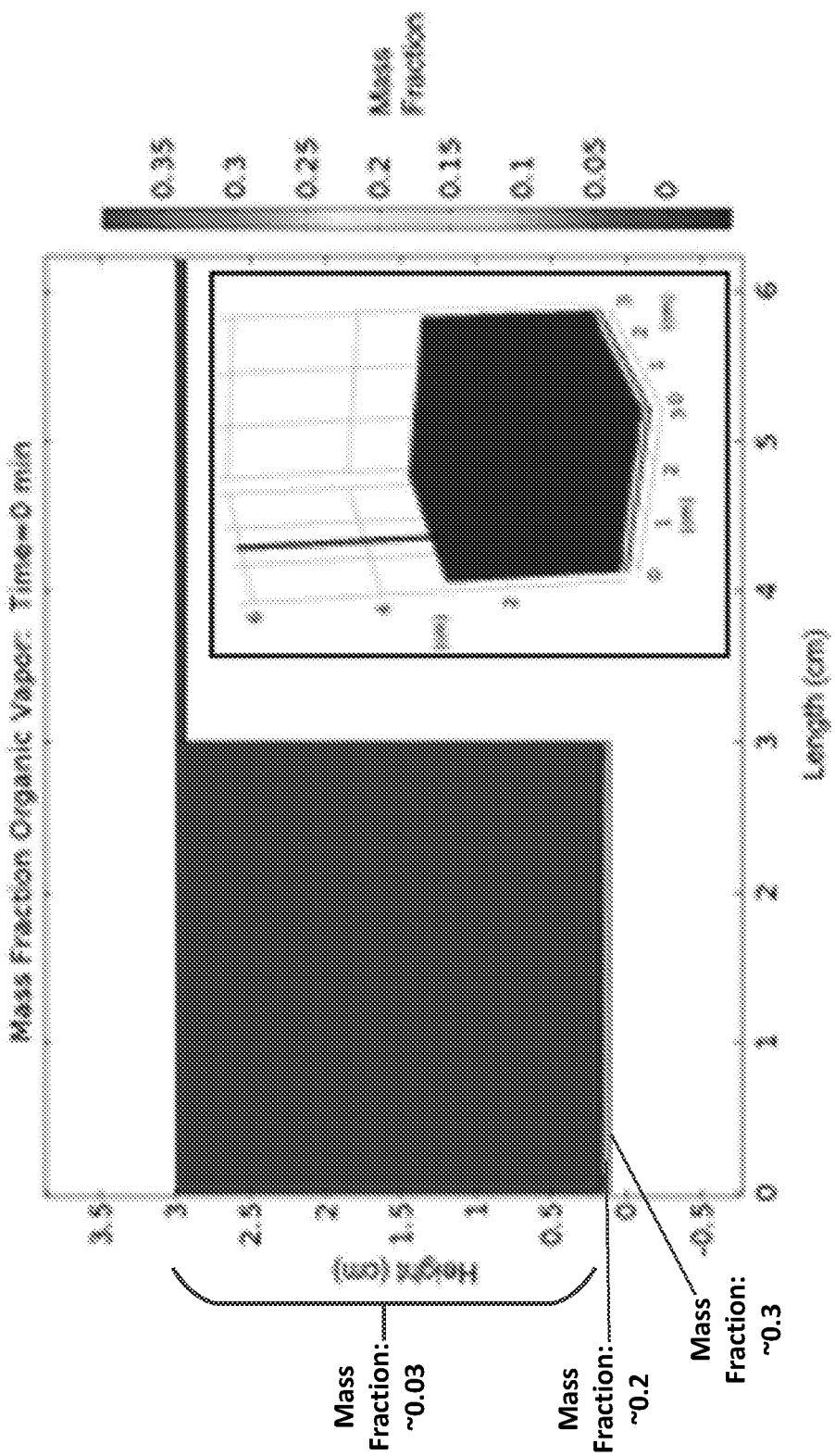
FIG. 15A shows two-dimensional and three-dimensional COMSOL simulations of evaporation and diffusion of an equimolar mixture of pentane and hexane inside a 3 cm$^3$ cuvette with an open tubing at injection, according to one or more embodiments.
Figure 15B:
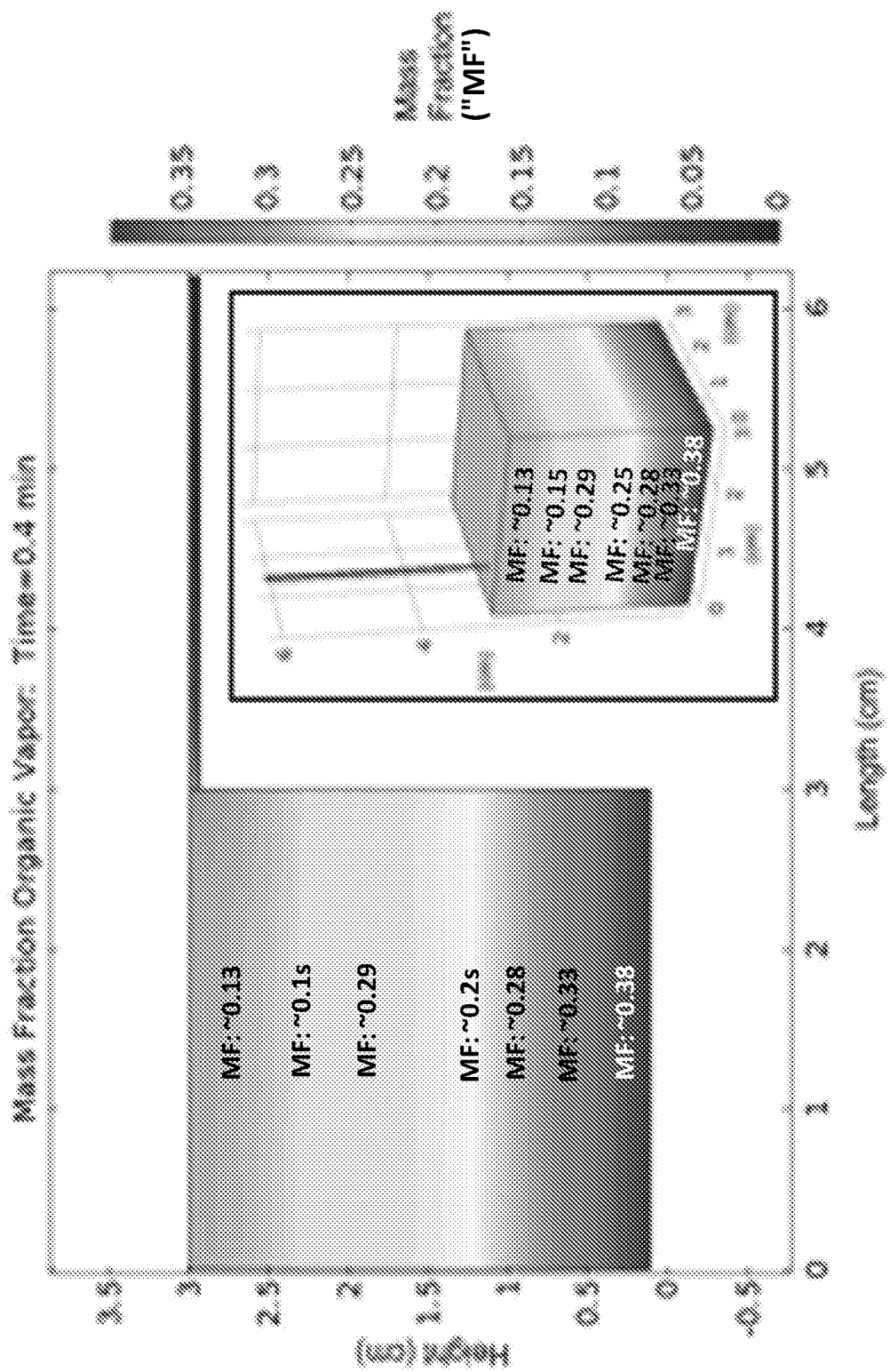
FIG. 15B shows two-dimensional and three-dimensional COMSOL simulations of evaporation and diffusion of an equimolar mixture of pentane and hexane inside a 3 cm$^3$ cuvette with an open tubing at 0.4 minutes after injection, according to one or more embodiments.
Figure 15C:
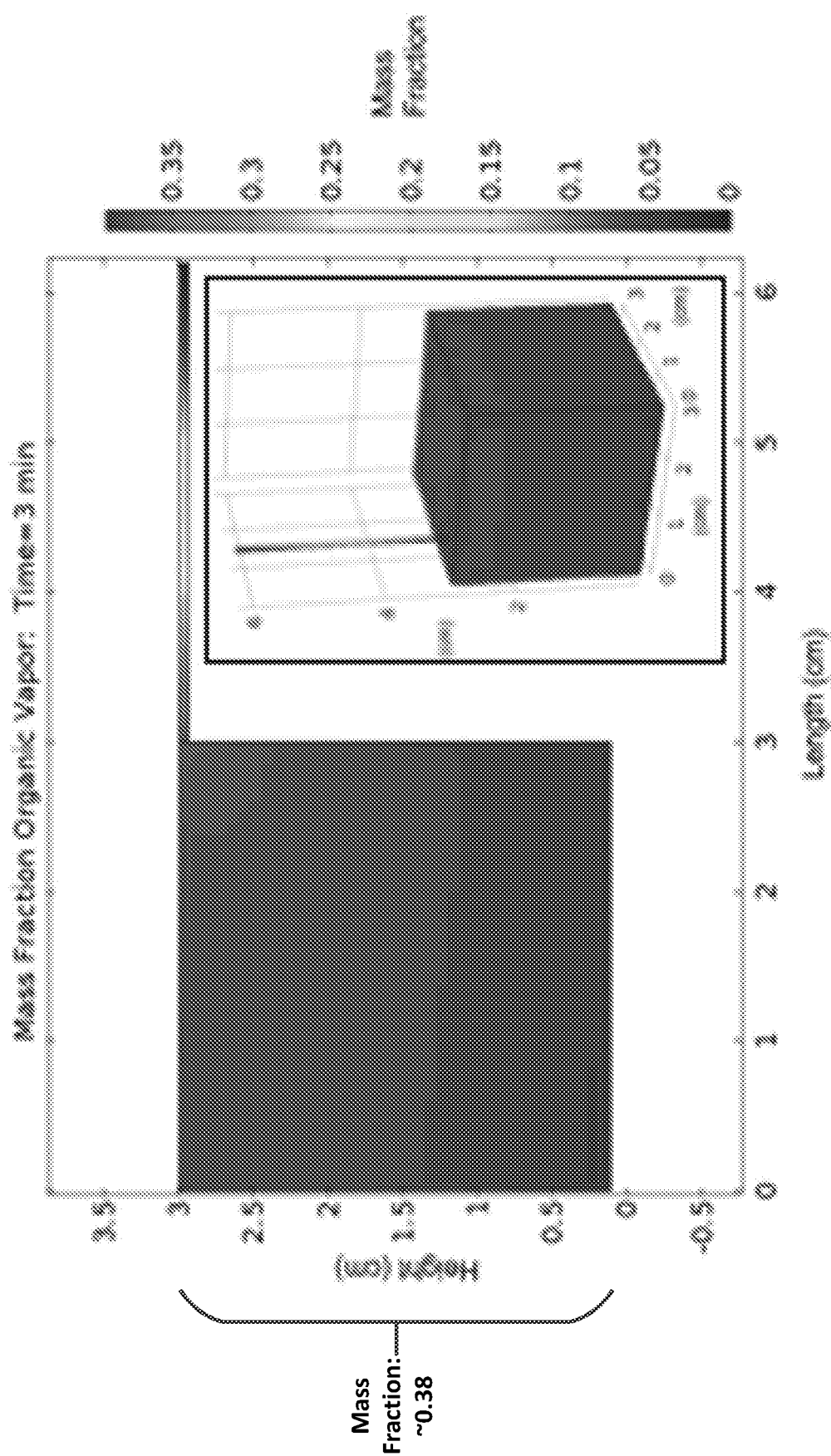
FIG. 15C shows two-dimensional and three-dimensional COMSOL simulations of evaporation and diffusion of an equimolar mixture of pentane and hexane inside a 3 cm$^3$ cuvette with an open tubing at 3 minutes after injection, according to one or more embodiments.

In some embodiments, the two-dimensional geometry of the simulation is shown in FIG. 15A; the chamber volume, $3 \times 3$ $cm^2$, was chosen to be in accordance with the dimensions of the physical cuvette used for the measurements. All simulations were carried out at a temperature, T, of 21° C. In the beginning of simulation (t=0 min), a thin layer of liquid (height of the liquid layer was chosen to be 1.1 mm in accordance with the experimentally injected volume of the analyte) was injected into the chamber (at a position of 0 cm; see FIG. 15A). The remaining volume of the chamber was occupied by air. Subsequently, the liquid evaporated and the vapor diffused upwards toward the porous photonic crystal that was located at the top of the cuvette at a position of 3 cm. As shown in FIG. 15B, an intermediate stage of the described diffusion process was captured at t=0.4 min. Ultimately, as shown in FIG. 15C, a steady-state was established inside the cuvette after ~3 min. Note that a concentration gradient was present in a thin needle inserted into the chamber exhibiting a directed flow of the vapor towards the atmosphere (see FIG. 15C). The concentration of vapor measured at the location of the photonic crystal in the cuvette (at a height of 3 cm) was recorded as a function of time and plotted in FIGS. 16, 17A-17B, and 18. In addition, three-dimensional simulations in order to compare the obtained kinetic behavior with the that in the two-dimensional model were performed. The inset images in FIGS. 15A-15C show a three-dimensional configuration of the setup (square cuvette with the dimensions of $3 \times 3 \times 3$ $cm^3$ with a vertically inserted needle) in accordance with certain embodiments. Due to a cubic symmetry of the chosen cuvette, the three-dimensional simulations demonstrated a similar behavior of the analyte diffusion as the two-dimensional simulations.

Figure 16:
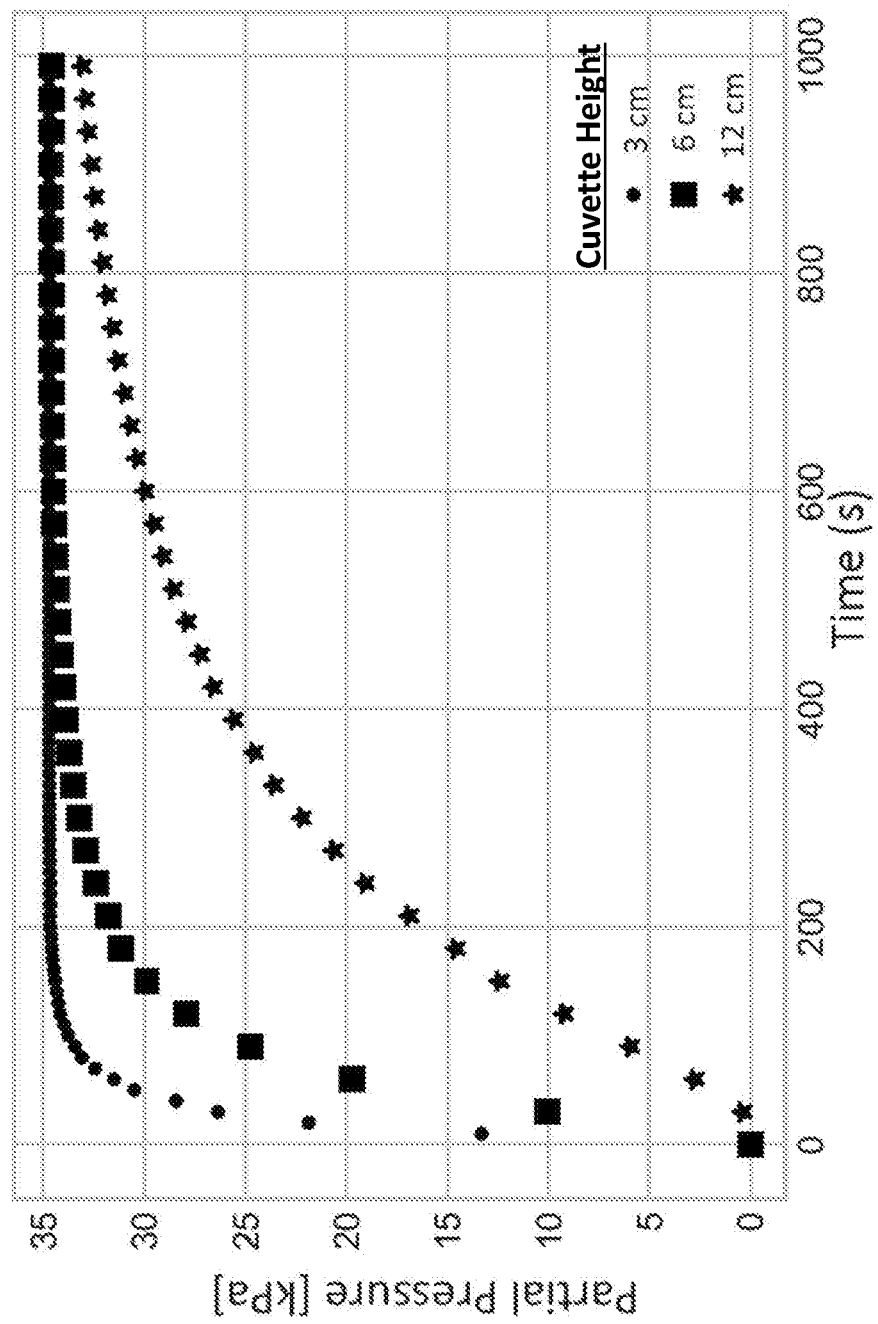
FIG. 16 shows a COMSOL simulation demonstrating the influence of the cuvette height on the diffusion kinetics of a volatile analyte, according to one or more embodiments.
Figure 17A:
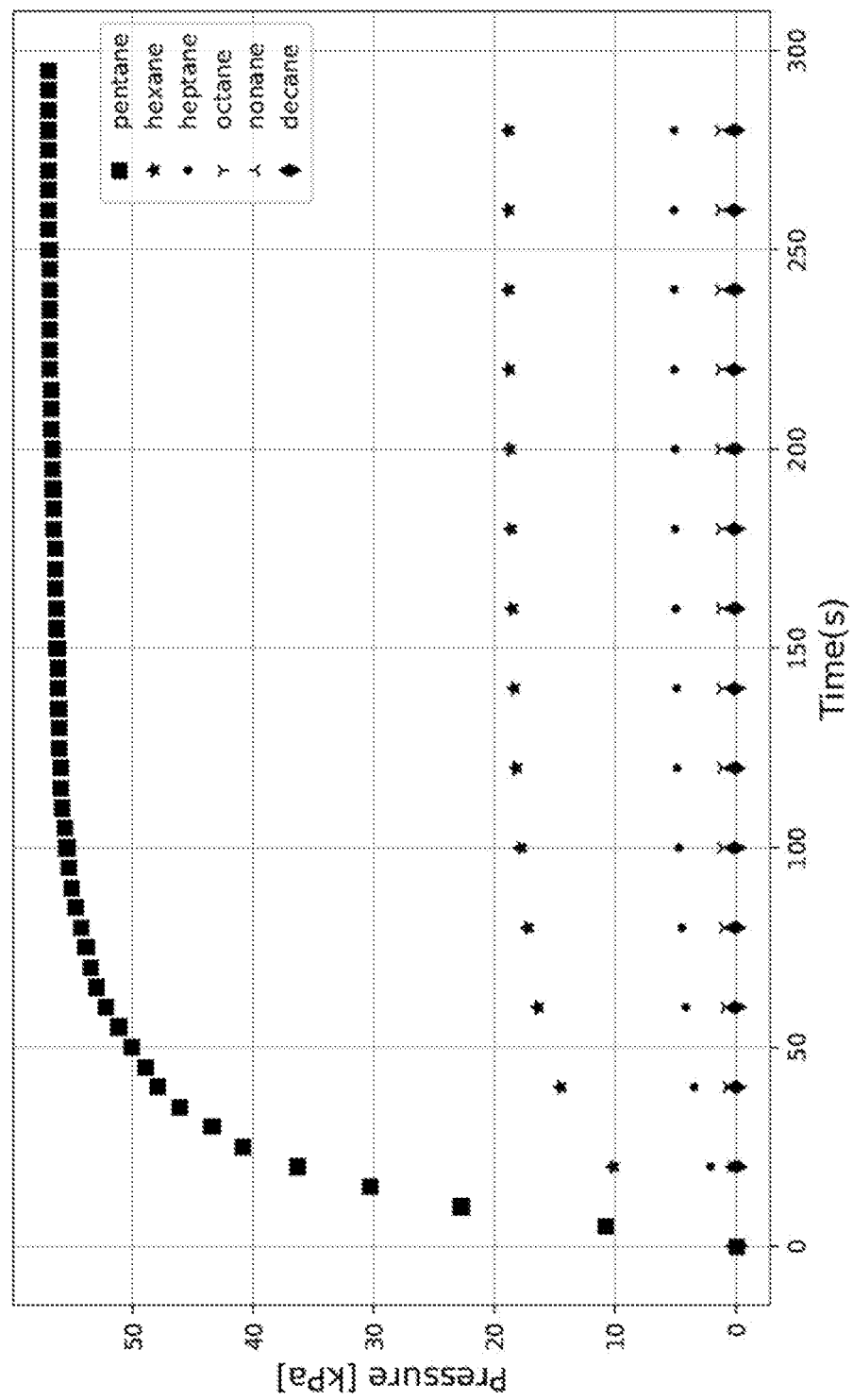
FIG. 17A shows a two-dimensional COMSOL simulation demonstrating the evolution of the pressure of various linear alkanes (pentane, hexane, heptane, octane, nonane, and decane) in time in a 3 cm$^2$ cuvette at 21° C., according to one or more embodiments.
Figure 17B:
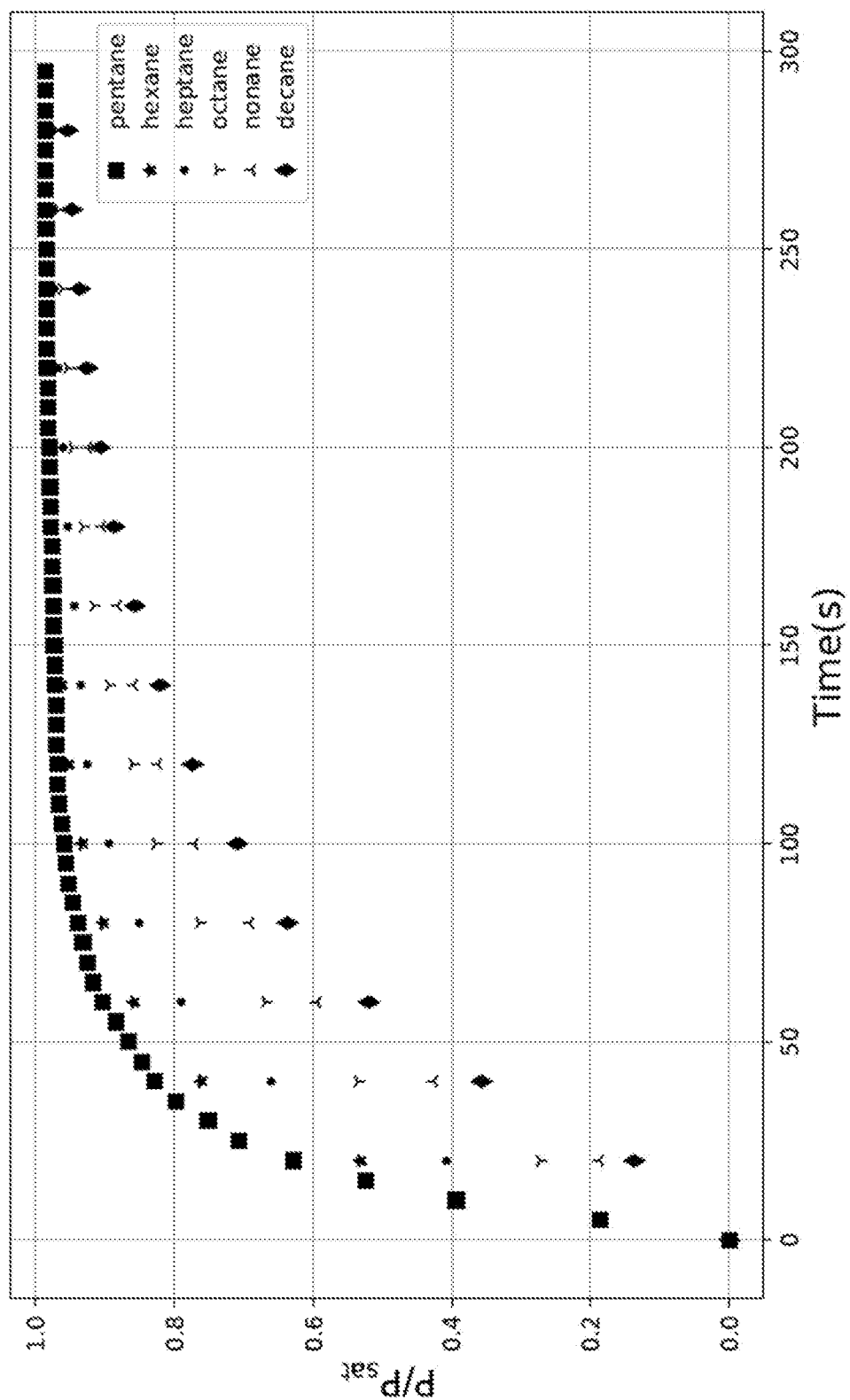
FIG. 17B shows a time-dependent change in relative pressure for the alkanes of FIG. 17A demonstrating that shorter compounds reach higher relative pressures faster than longer ones, according to one or more embodiments.
Figure 18:
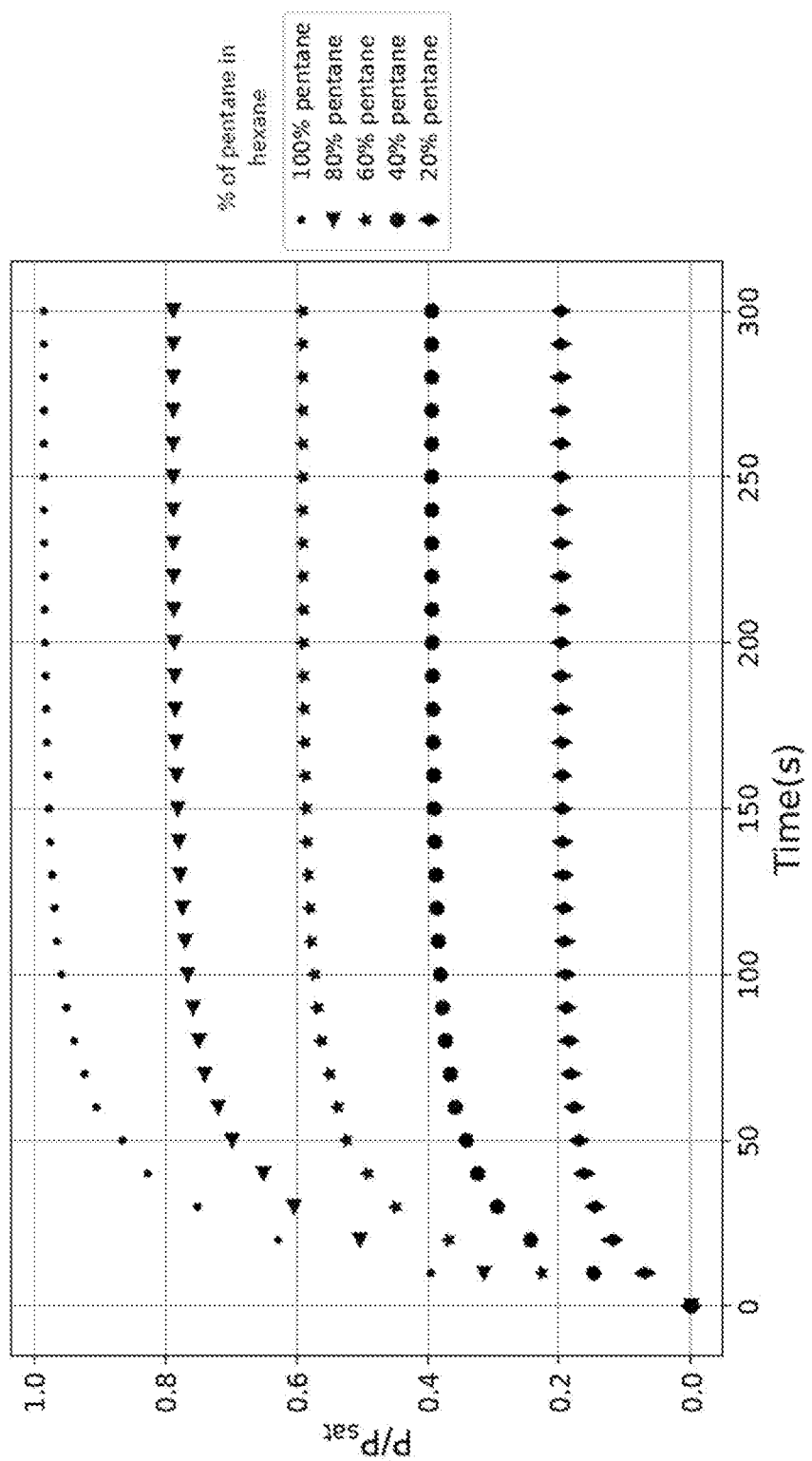
FIG. 18 shows a two-dimensional COMSOL simulation demonstrating the comparison of the relative pressure evolution recorded at 3 cm from the bottom of a 3 cm$^2$ cuvette of pentane in binary mixtures of pentane and hexane in a 3 cm$^2$ cuvette at 21° C. according to one or more embodiments.

FIG. 16 shows the influence of the cuvette height on the hexane diffusion kinetics, according to one or more embodiments. As shown in FIG. 16, a taller cuvette allowed for a slower diffusion rate of the analyte. Experimental studies into varying the distance between the injection site and sensor, as shown, for example, in FIG. 17A and FIG. 17B, which, in turn, enabled sensitivity tuning of the sensor toward linear hydrocarbons. The kinetics of evaporation and diffusion for linear alkanes—pentane, hexane, heptane, octane, nonane, and decane (FIGS. 17A-17B)—and a binary mixture of pentane and hexane (FIG. 18), were also characterized. These simulations allowed for prediction of the trends in the diffusion kinetics of compound of interest under relevant experimental conditions. Noticeably, alkanes with shorter chains diffused faster than alkanes with longer chains. For example, in some embodiments, reaching a relative pressure of 0.8 kPa at the very top of the $3 \times 3$ $cm^2$ cuvette would take 36 seconds for pentane, 48 seconds for hexane, 64 seconds for heptane, 90 seconds for octane, 112 seconds for nonane, and 130 seconds for decane.

In some embodiments, despite there being one or more assumptions inherent to COMSOL simulations (e.g., based on ideal gas equations, constant injection volume, isothermic evaporation process, absence of convective airflow outside the chamber, and zero mass fraction of the vapor at the tip of the needle open to the atmosphere) predictions performed using these simulation results correlated strongly with analogous experimental observations.

Figure 5C:
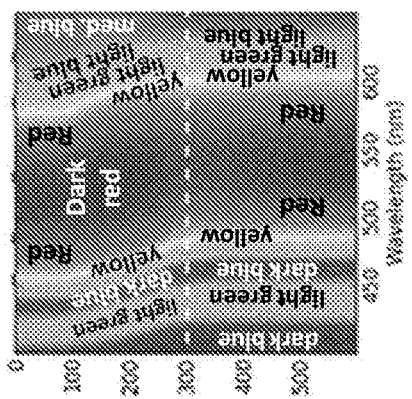
FIG. 5C shows a two-dimensional time response map showing kinetics for the open (non-sealed) chamber of FIG. 5A, according to one or more embodiments.

The mass-transfer-related, or diffusion-driven, nature of the devices and methods disclosed herein is highlighted, in some embodiments, in FIGS. 5A-5K, in which the transient responses of one-dimensional porous photonic crystals were recorded for a volatile component injected into sealed vs. leaking test chambers (FIG. 5A), for the one-dimensional porous photonic crystals positioned at different heights within a test chamber (FIG. 5D), and for different volumes of hexane injected into the test chamber (FIG. 5H).

Figure 5B:
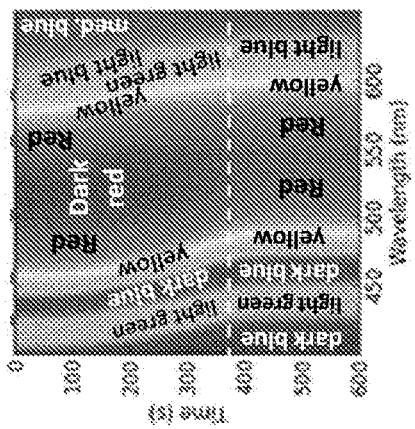
FIG. 5B shows a two-dimensional time response map showing kinetics for the closed (sealed) chamber of FIG. 5A, according to one or more embodiments.
Figure 5A:
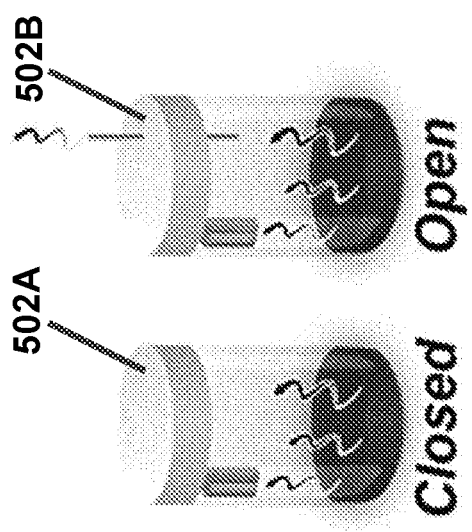
FIG. 5A shows closed (sealed) and open (non-sealed) chambers containing hexane, according to one or more embodiments.

FIG. 5A shows a closed chamber 502A containing a volume of hexane and one-dimensional porous photonic crystals, as well as an open chamber 502B containing a volume of hexane and one-dimensional porous photonic crystals, according to one or more embodiments. The response maps of FIG. 5A corresponding to closed chamber 502A and open chamber 502B are shown in FIGS. 5B and 5C, respectively, and demonstrated slower response kinetics for hexane in a sealed system.

FIG. 5D, in some embodiments, shows a series of thermodynamically open chambers 502B1, 502B2, and 502B3, each containing a volume of hexane and a one-dimensional porous photonic crystal, each one-dimensional porous photonic crystal being positioned at a different height within its respective test chamber. In these embodiments, "thermodynamically open" refers to the fact that the chamber configuration allowed for molecular exchange with the environment (e.g., through a thin tubing). The chambers were used to investigate the influence of the positioning of the photonic crystal within the test chamber on equilibration. In some embodiments, the response maps of FIG. 5D corresponding to open chambers 502B1, 502B2, and 502B3 shown in FIGS. 5E-5G, respectively, with time along the vertical axis, demonstrate that the photonic crystal reached equilibrium faster the closer it was located with respect to the liquid surface.

FIG. 5H shows a series of open chambers 502C1, 502C2 and 502C3, each having a total volume capacity of 20 mL, and each containing a different volume/level of injected liquid hexane ($V_1$=1 mL, $V_2$=2 mL, and $V_3$=8 mL), according to one or more embodiments. In these embodiments, the response maps of FIG. 5H corresponding to open chambers 502C1, 502C2 and 502C3 are shown in FIGS. 5I-5K, respectively, with time along the vertical axis, demonstrate that the photonic crystal reached equilibrium faster the closer it was located with respect to the liquid surface.

Figure 6A:
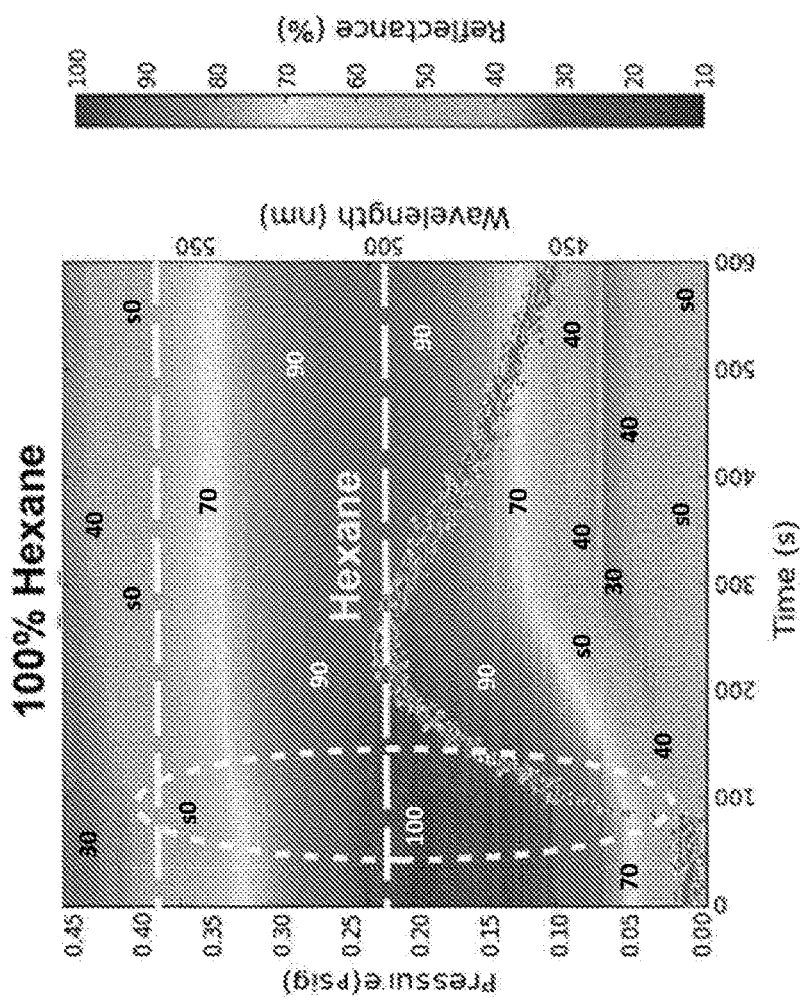
FIG. 6A shows a time-dependent vapor pressure curve for a binary mixture of pentane and hexane, according to one or more embodiments.
Figure 6B:
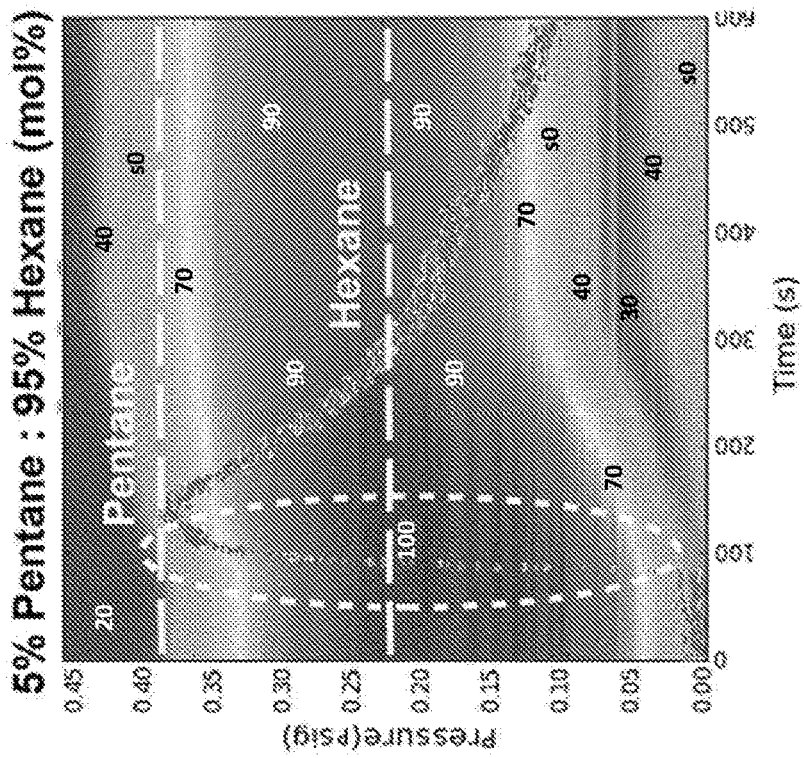
FIG. 6B shows a time-dependent vapor pressure curve for pure hexane, according to one or more embodiments.

The correlation between the photonic reflectance response of the one-dimensional porous photonic crystal and the absolute vapor pressure developed within the test chamber is shown in FIGS. 6A-6B (for 5% pentane: 95% hexane and for 100% hexane, respectively), according to one or more embodiments. The measurements of FIGS. 6A-6B were taken at 40° C. using equal volumes of a binary mixture of volatile hydrocarbons consisting of 5 mol % pentane and 95 mol % hexane, and pure hexane, respectively. The measured time-dependent pressure curves demonstrate a higher vapor pressure for the mixture of pentane/hexane as compared with pure hexane, as predicted by Raoult's law for ideal gases.

In certain embodiments, the examples of FIGS. 6A-6B highlight that the responsiveness of the one-dimensional porous photonic crystal can be related to the relative pressure of the analyte liquid. In addition, small compositional differences (e.g., about 0.01% to about 100%) between the analyte liquids can be detected in some embodiments.

Figure 19A:
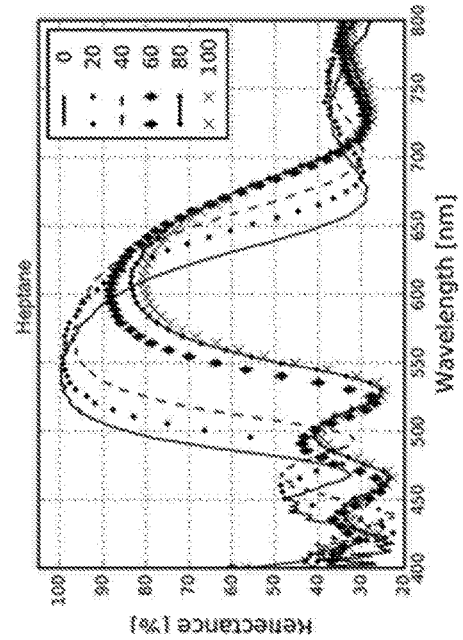
FIG. 19A shows reflectance spectra of a TiO$_2$/SiO$_2$ one-dimensional photonic crystal at normal incidence upon infiltration with hexane vapors, according to one or more embodiments.
Figure 19B:
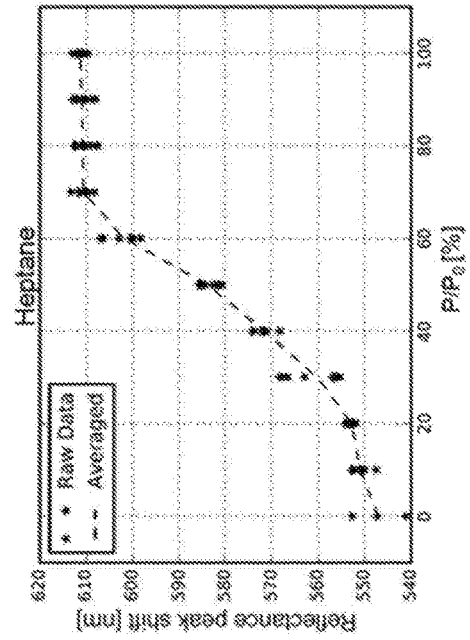
FIG. 19B shows reflectance spectra of a TiO$_2$/SiO$_2$ one-dimensional photonic crystal at normal incidence upon infiltration with heptane vapors, according to one or more embodiments.
Figure 19C:
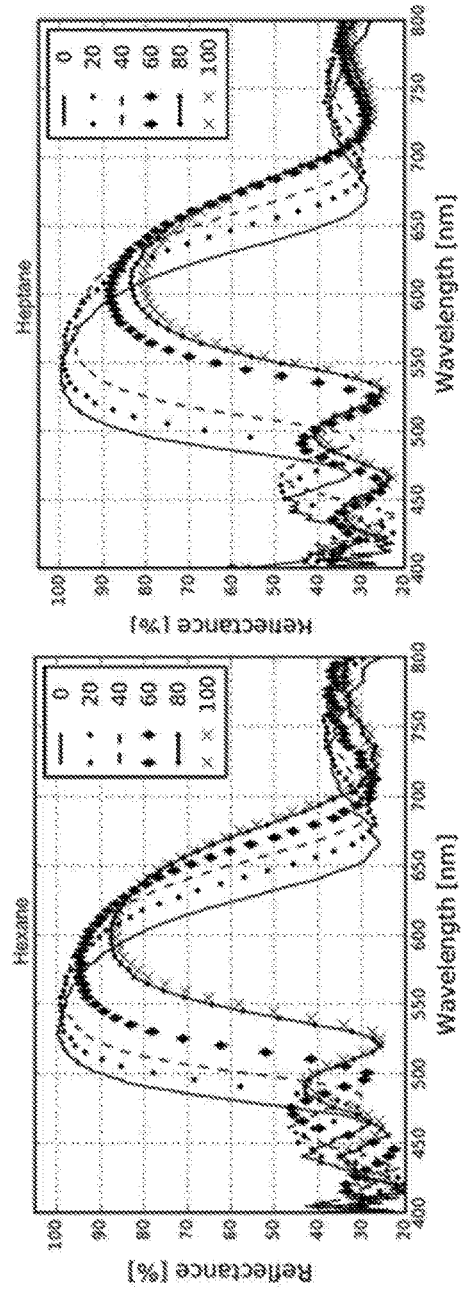
FIG. 19C shows optical isotherms for the adsorption branch of the hexane vapors of FIG. 19A based on the reflectance peak shift, according to one or more embodiments.
Figure 19D:
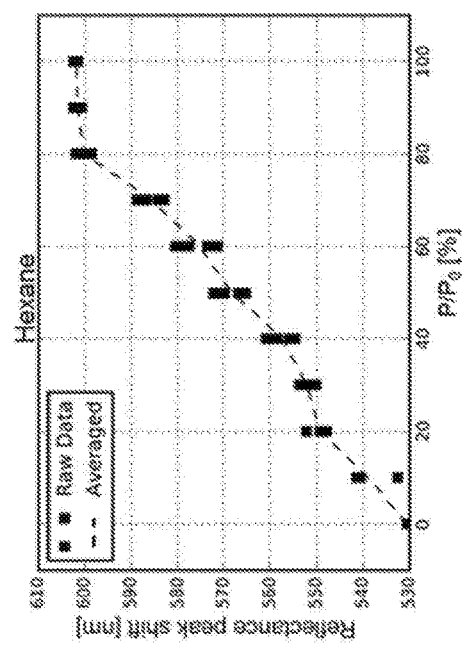
FIG. 19D shows optical isotherms for the adsorption branch of the heptane vapors of FIG. 19A based on the reflectance peak shift, according to one or more embodiments.
Figure 20A:
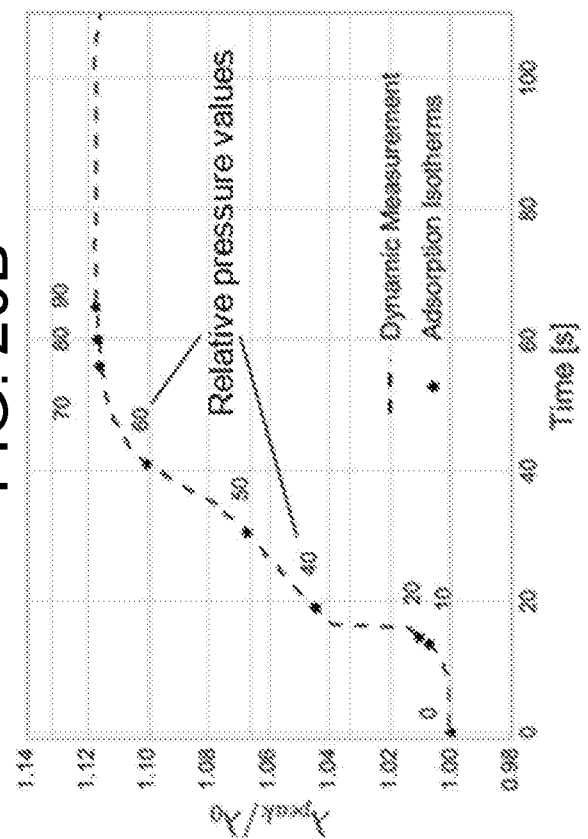
FIG. 20A shows the time-dependent evolution of the position of the normalized reflectance peak extracted from a dynamic measurement superimposed with the normalized reflectance peak shift values of FIG. 19C, according to one or more embodiments.
Figure 20B:
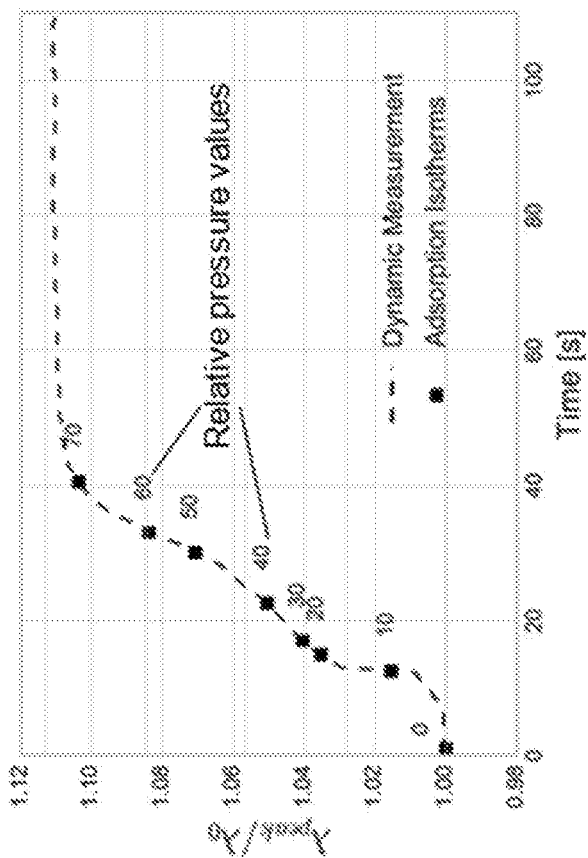
FIG. 20B shows the time-dependent evolution of the position of the normalized reflectance peak extracted from a dynamic measurement superimposed with the normalized reflectance peak shift values of FIG. 19D, according to one or more embodiments.
Figure 40:
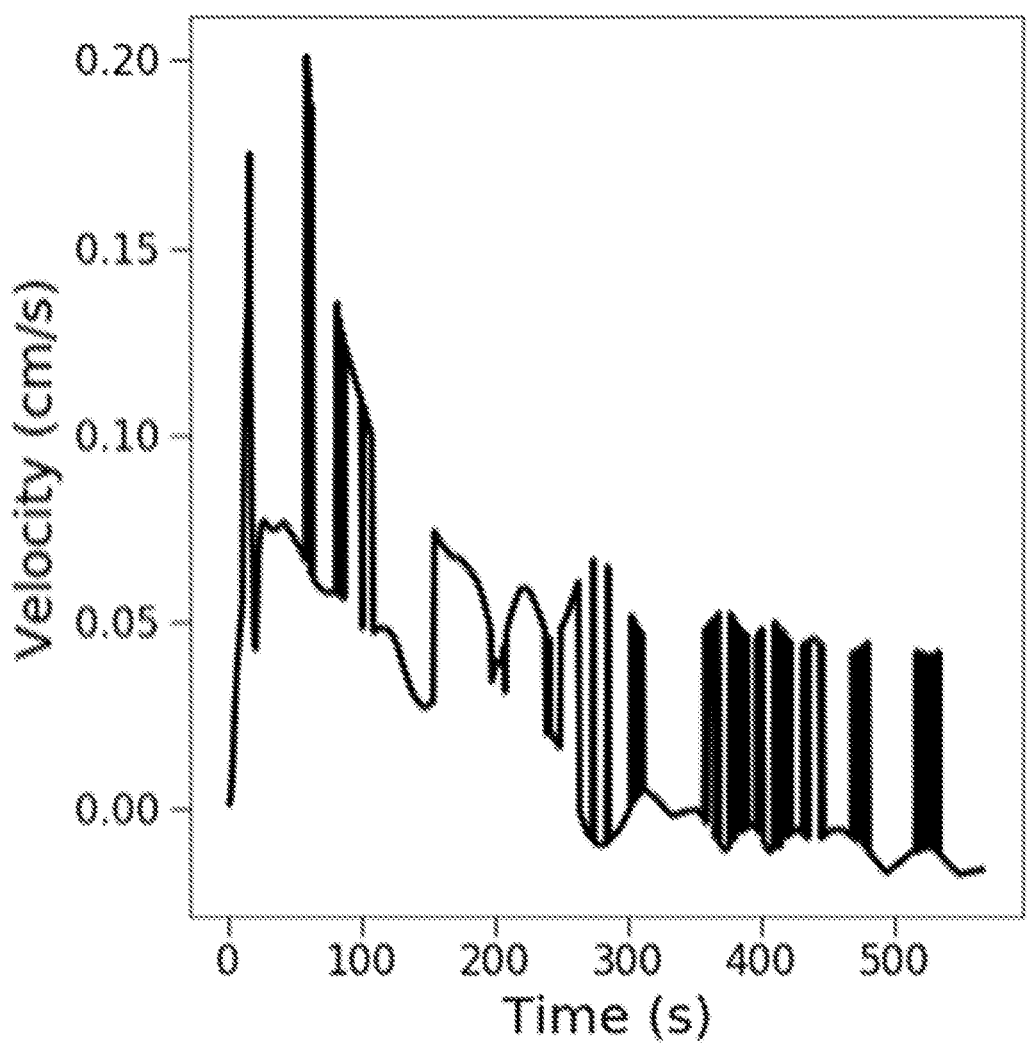

Characterization of the Optical Isotherms for Photonic Sensors as a Tool for Calibration of a Dynamic Response In some embodiments, optical vapor sorption isotherms represent an isothermal change of the reflectance spectra of the photonic crystals at various relative pressures in a steady state measured by means of a spectrophotometer. To obtain the optical isotherms, first the reflectance spectra of a 6 bilayer $TiO_2/SiO_2$ one-dimensional photonic crystal at normal incidence at relative vapor pressures from 0 to 100% were captured as shown in FIGS. 19A and 19B for hexane and heptane, respectively. The corresponding optical adsorption isotherms, shown in FIGS. 19C and 19D, were extracted by tracking the position of the central wavelength of the reflectance peak. As shown in FIGS. 19C and 19D, the isotherms followed a shape of the adsorption isotherms of mesoporous materials. Hexane filled in the pores of the photonic crystal due to capillary condensation at a relative pressure of ~80%, whereas heptane filled in the pores of the photonic crystal at ~70%. In these embodiments, this measurement allowed for calibrating the wavelength shift of the photonic band gap peak against the relative pressure of the analyte as shown in FIGS. 20A-20B for hexane and heptane, respectively. Namely, the time-dependent evolution of the position of the normalized reflectance peak obtained from a dynamic measurement, according to some embodiments, was superimposed with the normalized reflectance peak shift values corresponding to various relative pressures acquired from the optical isotherms in FIGS. 19C and 19D for hexane and heptane, respectively. Consequently, the times in a dynamic measurement, which were characterized by the formation of a plateau region in the response curve due to capillary condensation (see FIGS. 19C and 19D, ~40 s for hexane and ~50 s for heptane) were correlated with the superimposed isothermic relative pressures (~70% for hexane and ~65% for heptane). In some embodiments, this superimposition technique can, therefore, serve as a calibration tool for response times and relative pressures. In some embodiments, this can be done assuming that the dynamic response passes through equilibrium states that are shown in the optical isotherm plots in FIGS. 19C and 19D.

Figures 7A, 7B, 7C:
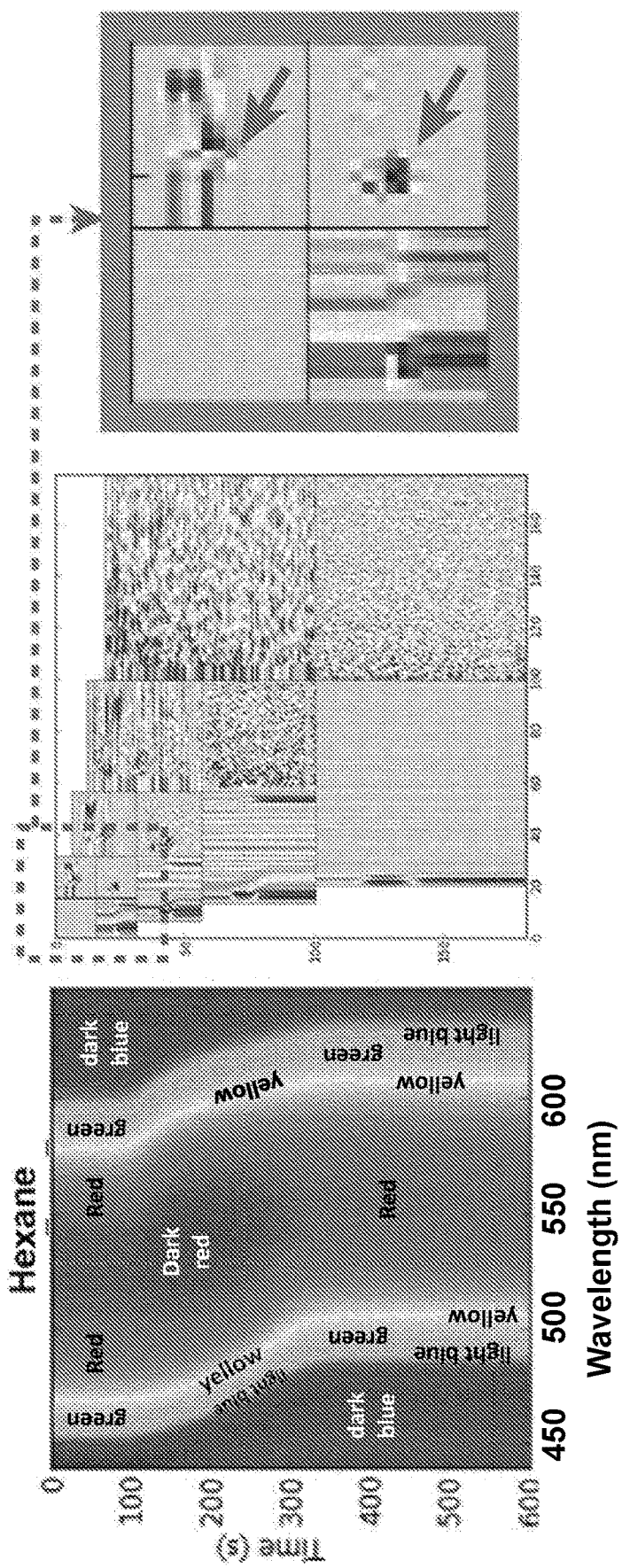
FIG. 7A shows a two-dimensional time response map for pure hexane, according to one or more embodiments.
FIG. 7B shows a two-dimensional multilevel discrete wavelet transform decomposing the two-dimensional time response map of FIG. 7A, according to one or more embodiments.
FIG. 7C shows a zoomed-in image of the sixth decomposition level of FIG. 7B, according to one or more embodiments.
Figures 7D, 7E, 7F:
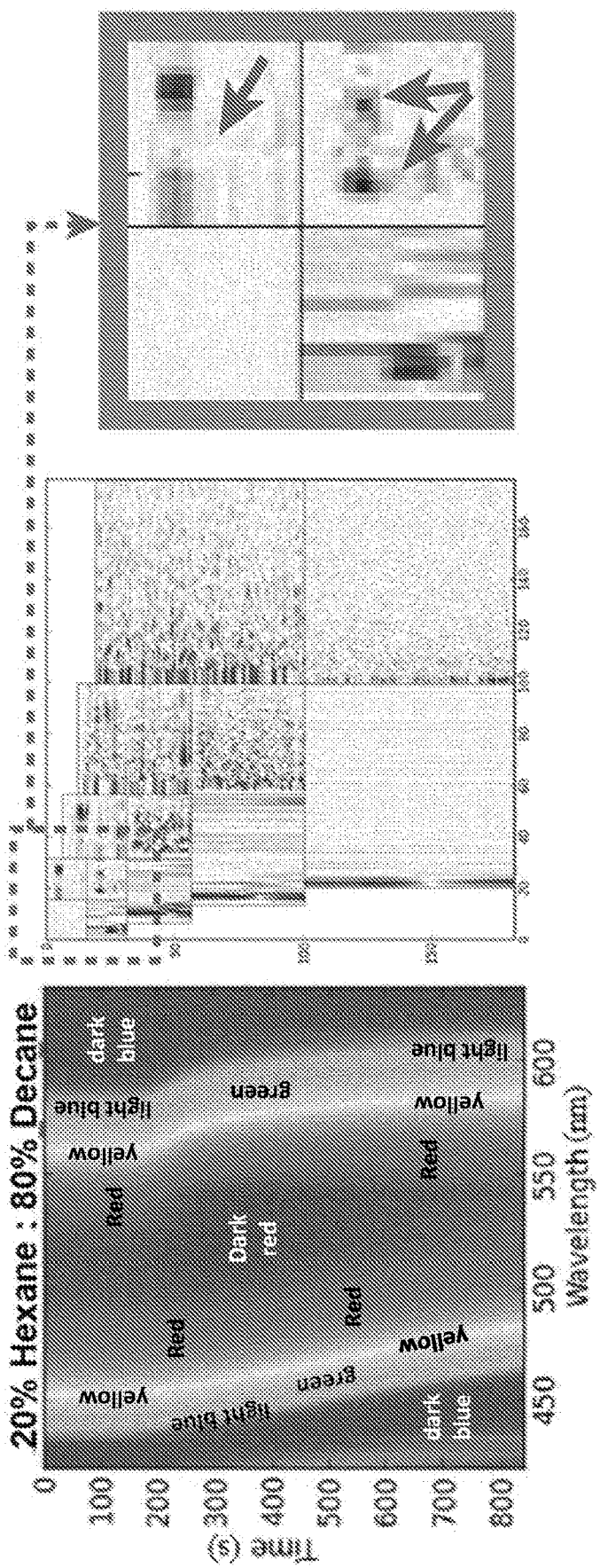
FIG. 7D shows a two-dimensional time response map for a binary mixture of hexane and decane, according to one or more embodiments.
FIG. 7E is a corresponding two-dimensional multilevel discrete wavelet transform decomposing the two-dimensional time response map of FIG. 7D, according to one or more embodiments.
FIG. 7F is a zoomed-in image of the sixth decomposition level of FIG. 7E, according to one or more embodiments.

The results in the form of two-dimensional time-wavelength maps were further quantitatively compared using digital signal-processing techniques, for example a discrete wavelet transform method that captures both frequency and location information. In some embodiments, this is shown in FIGS. 7A-7F, which compare a two-dimensional time response map for pure hexane (FIG. 7A) with a 2D time response map for a mixture of 20 mol % hexane in 80 mol % decane (FIG. 7D). In some embodiments, FIGS. 7B and 7E show the two-dimensional six-level discrete wavelet transform, utilizing the Daubechies Wavelet #4 as a basis function, implemented for the decomposition of the time response maps of FIGS. 7A and 7D, respectively, in order to discriminate fine differences in the kinetics of the spectral responses. See I. Daubechies, Ten Lectures on Wavelets, SIAM, Philadelphia, PA, 1992; S. Mallat, A Wavelet Tour of Signal Processing, 2nd ed., Academic Press, 1999. FIGS. 7C and 7F show zoomed-in images of the sixth decomposition level demonstrating distinct response features of the two investigated analytes.

Figure 8:
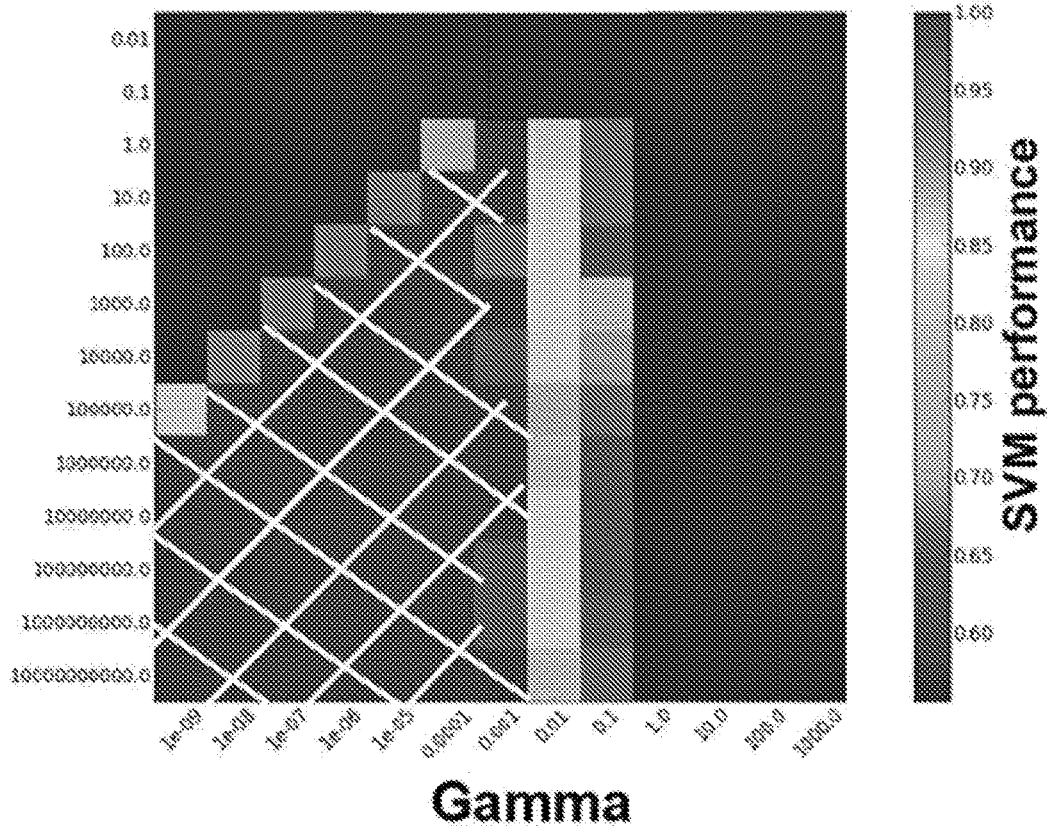
FIG. 8 shows a plot of a support vector machine (SVM) model performance for the discrimination of the hexane and decane analytes of FIG. 7A and FIG. 7D, according to one or more embodiments.

In some embodiments, processed information described herein can subsequently be implemented into a discriminative classifier, such as a support vector machine, for categorization of the given set of measured data. Demonstration of the performance of an exemplary "trained" support vector machine model used for discriminating the two analytes of FIGS. 7A-7F is shown in FIG. 8, according to one or more embodiments. As shown in the righthand plot of FIG. 8, the implemented model possessed a broad range (i.e., a large array) of optimized support vector machine kernel parameters (C and Gamma values, emphasized with the grid pattern), representing support vector machine optimization parameters, and facilitated enhanced, clean discrimination of the analytes of interest.

Multivariate Analysis of Sensing Capability of the Photonic Crystal Sensors

Figure 21:
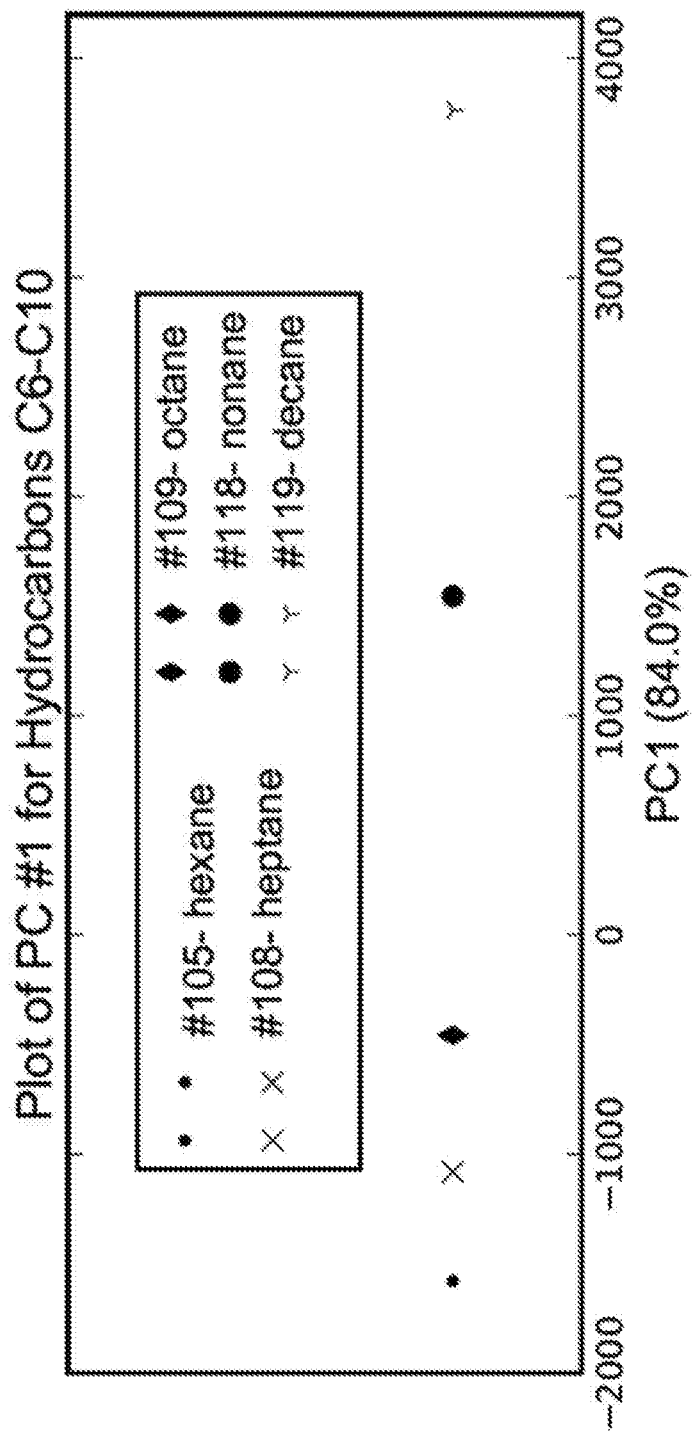
FIG. 21 shows principal component ("PC") #1 plotted for C6-C10 linear alkanes, and discrimination between the same, according to one or more embodiments.
Figure 22:
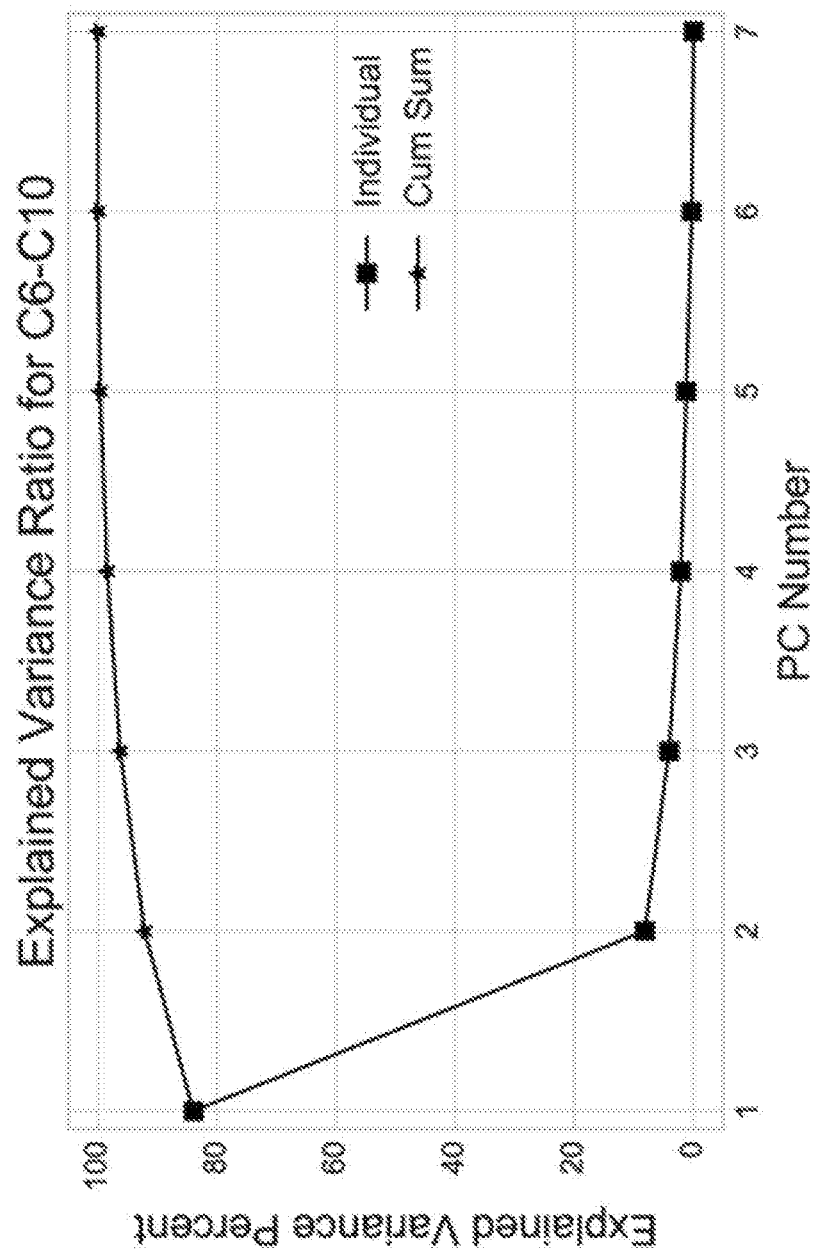
FIG. 22 shows the proportion of the explained variance of the photonic sensor and its corresponding cumulative proportion of the explained variance for discrimination of C6-C10 linear alkanes, demonstrating that the major variance is explained by principle component ("PC") #1, according to one or more embodiments.
Figure 23:
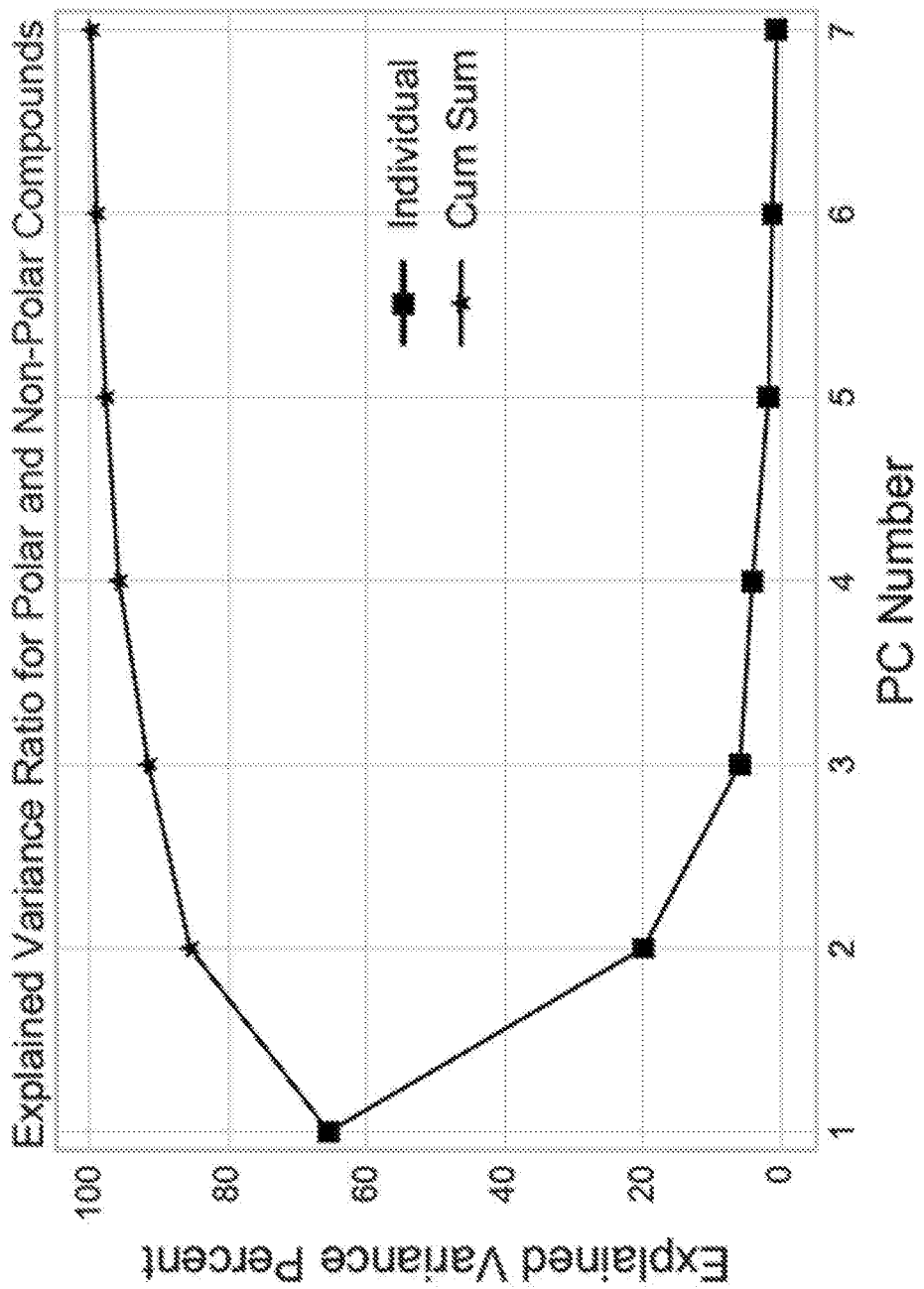
FIG. 23 shows the proportion of the explained variance of the photonic sensor and its corresponding cumulative proportion of the explained variance for discrimination of both non-polar and polar molecules, demonstrating that the cumulative variance plateaus after a principle component ("PC") of about 4 and that the sensor has up to 3-4 independent dimensions for distinguishing analytes of varying polarity, according to one or more embodiments.

Principal components analysis (PCA) was used to evaluate the number of independent reduced dimensions that the sensing method, according to some embodiments, can generate. As shown in FIG. 21, the principal components analysis (PCA) was first applied to the response maps of the porous photonic indicator for various non-polar alkanes—hexane, heptane, octane, nonane and decane—measured in a 3×3×3 $cm^3$ cuvette. In these embodiments, the major principle component (#1) contains information about 84% of the variance in the responses of the sensor. FIG. 22 shows the proportion of the explained variance and its corresponding cumulative proportion, which can be obtained by adding the successive proportions of variance explained to obtain the running total, according to one or more embodiments. As shown in FIG. 22, the sensor allowed for discrimination of linear alkanes by using just one or two principal components. However, as shown in FIG. 23, to identify both non-polar and polar compounds, e.g., hexane, heptane, octane, acetone, methanol, ethanol, and water, the sensor has a capability, in some embodiments, to demonstrate a higher (three- or four-level) dimensionality for discrimination. Thus, the devices and methods according to one or more embodiments enables a multivariable analysis of compounds with three-to-four-dimensional dispersion, which is provided by the number of independent outputs generated by the sensor.

Figure 9E:
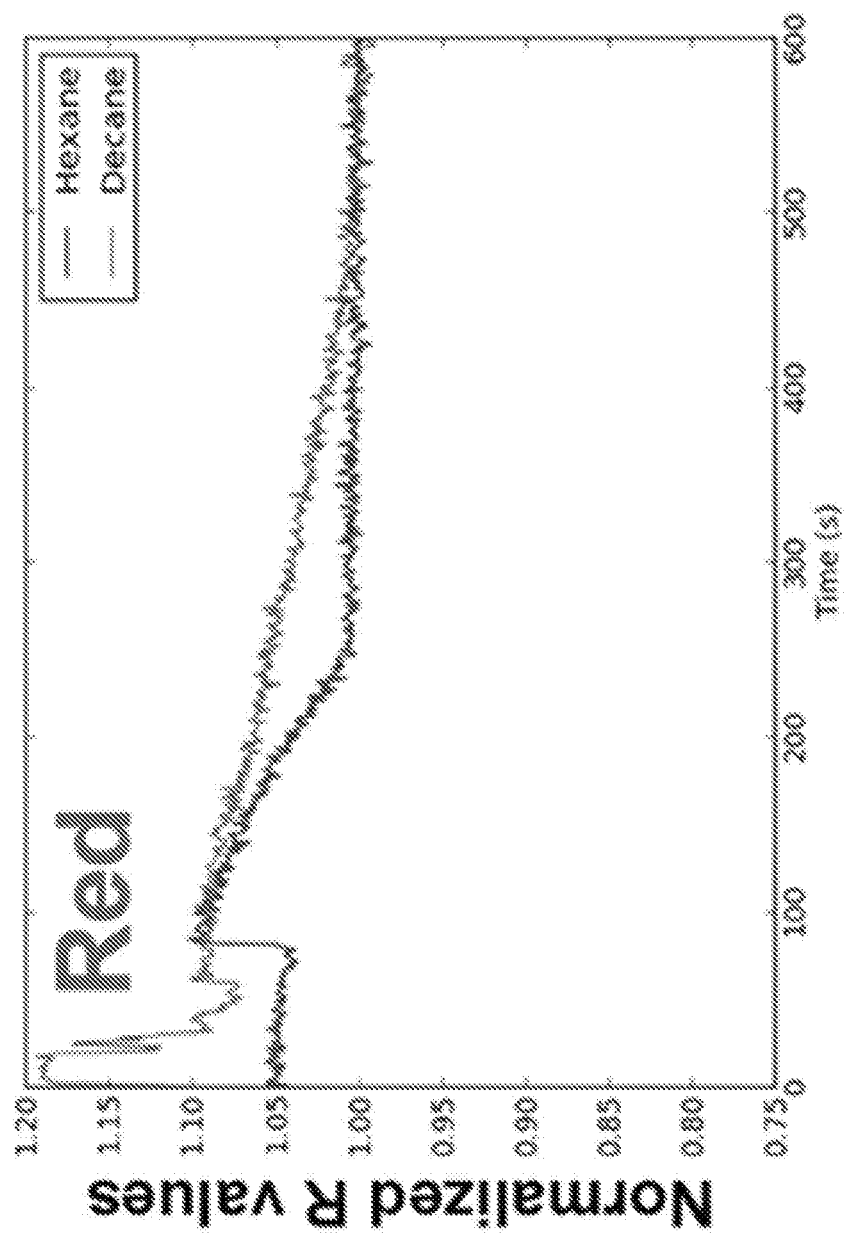
FIG. 9E shows kinetic changes in the red (R) values of FIG. 9C and FIG. 9D, according to one or more embodiments.
Figure 9F:
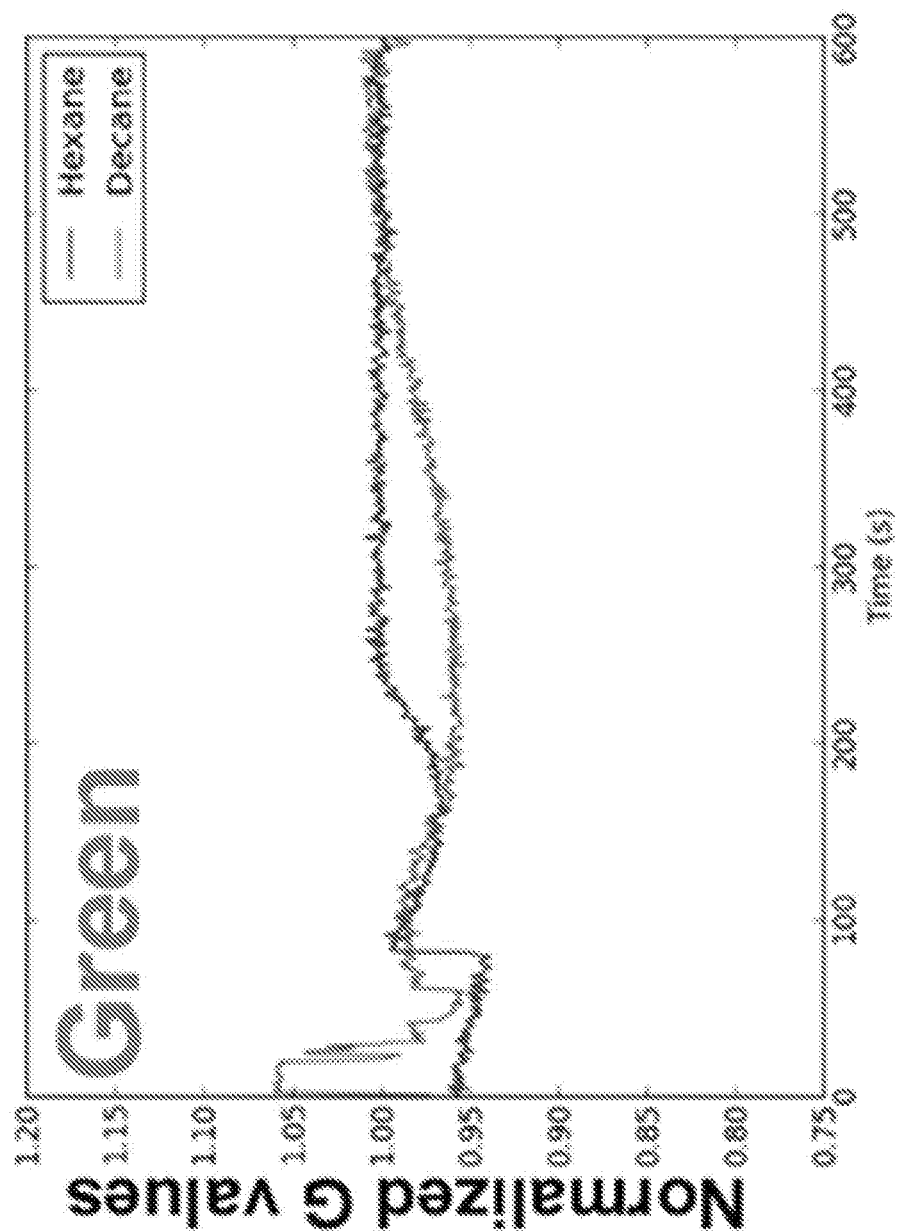
FIG. 9F shows kinetic changes in the green (G) values of FIG. 9C and FIG. 9D, according to one or more embodiments.
Figure 9G:
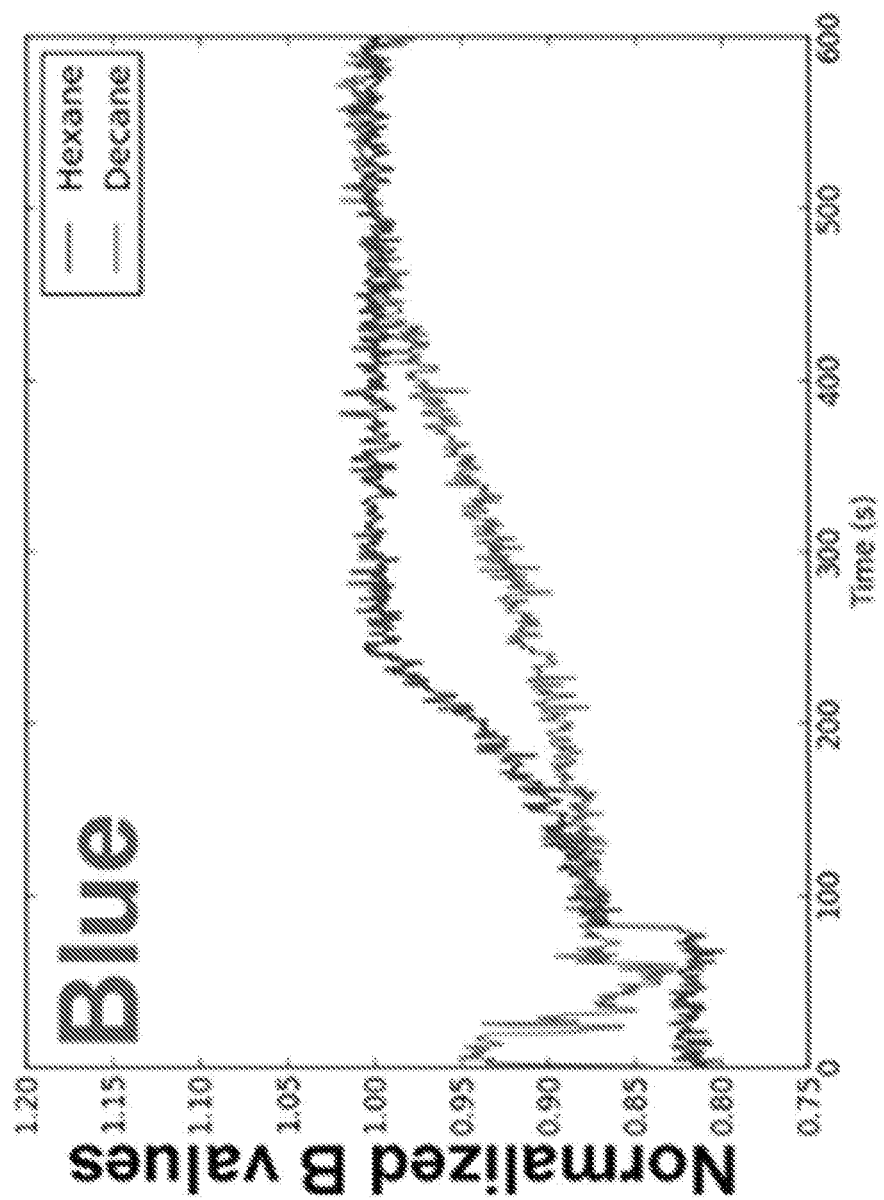
FIG. 9G shows kinetic changes in the blue (B) values of a photonic sensor FIG. 9C and FIG. 9D, according to one or more embodiments.
Figure 9H:
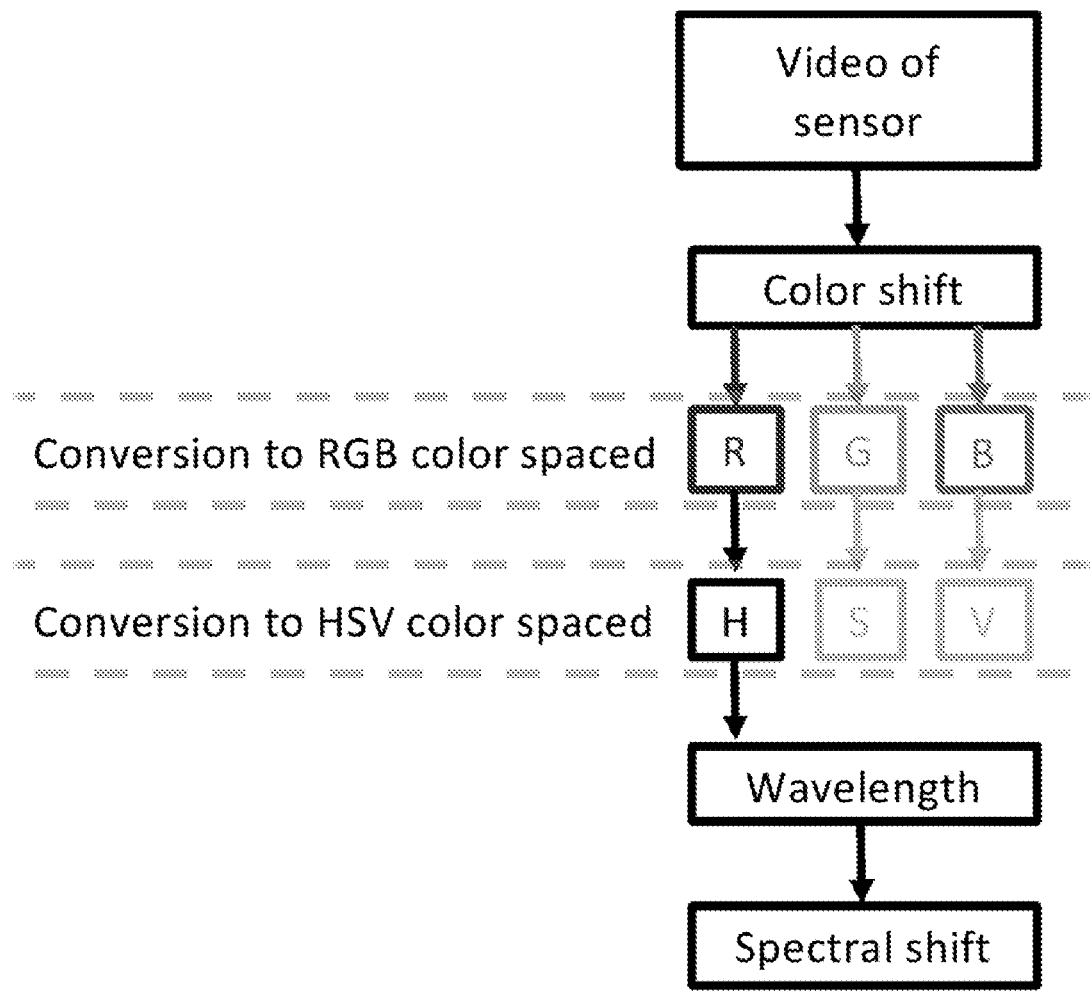
FIG. 9H shows a process for the conversion of the color change of a porous photonic crystal measured by a camera or similar device into the spectral shift, according to one or more embodiments.
Figure 9J:
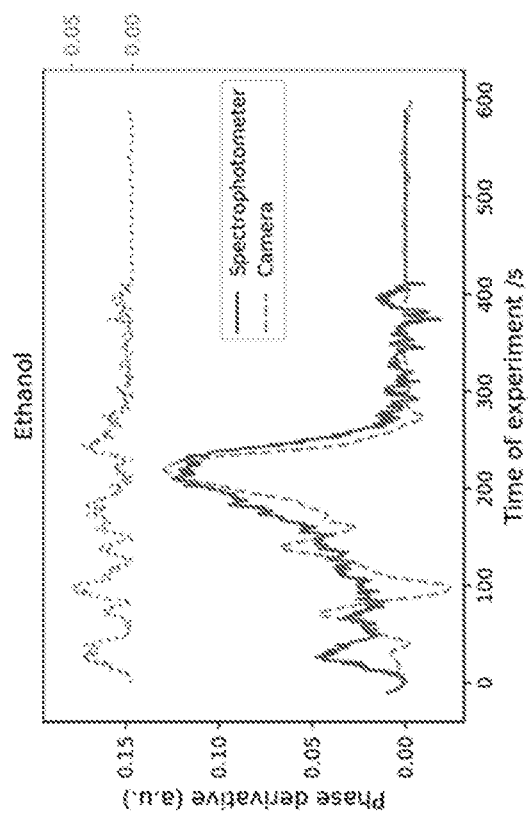
FIG. 9J shows the responses of a porous photonic crystal measured by a spectrophotometer and by a camera for ethanol, according to one or more embodiments.
Figure 9I:
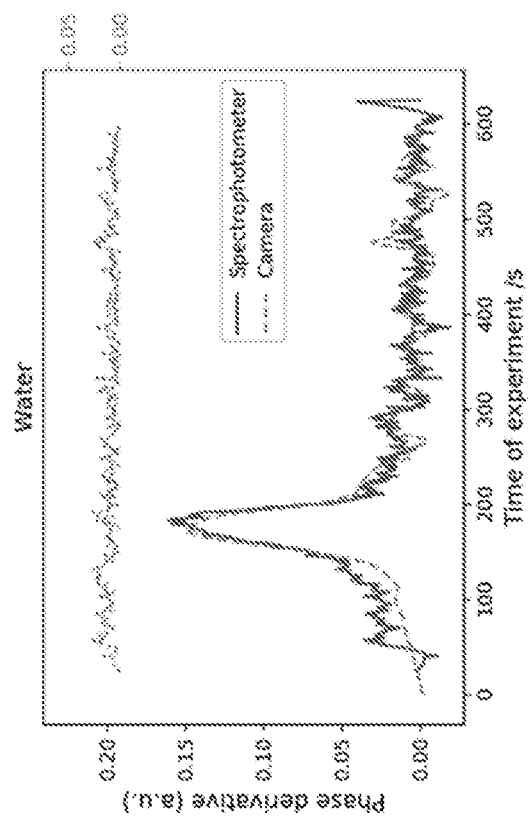
FIG. 9I shows the responses of a porous photonic crystal measured by a spectrophotometer and by a camera for water, according to one or more embodiments.

As shown in FIGS. 9A-9D, the kinetic optical response of a photonic sensor to hexane and decane can be monitored using a conventional smartphone camera, according to one or more embodiments. In accordance with certain embodiments, FIG. 9A shows a schematic illustration of a combinatorial approach for compositional analysis using an array of photonic sensors, which allowed for an enhanced selectivity of the sensor platform, and FIG. 9B shows an optical image of a one-dimensional porous photonic crystal sensor that can be used within such an array. In some embodiments, the evolution of the color of an individual sensor exposed to a volatile analyte can be monitored by a smartphone camera, and the obtained visual data can be translated into a series of tree sub-images (see FIGS. 9C-9D, which include temporal data at, for example, 0 seconds and 600 seconds, respectively), each having corresponding red (R), green (G), and blue (B) values. For FIG. 9C corresponding to the hexane measurement, the change in red (R), green (G), and blue (B) values was 151, 109, and 96 at 0 s to 156, 125, and 130 at 600 s, respectively. For the decane images (FIG. 9D), the change was (176, 119, 105) at 0 s to (187, 139, 147) at 600 s. The kinetic changes of these red/green/blue (RGB) values (shown in FIGS. 9E, 9F, and 9G, respectively) allowed for a precise discrimination of the analytes by using, for example, support vector algorithms. FIGS. 9E-9G show that the decomposition of the recorded imaging data into time-dependent red/green/blue (RGB) values provides a promising technique for a fine discrimination of the analytes (note the separation between the hexane and decane plots), according to one or more embodiments. As shown in FIG. 9H, the response signals of spectrometers and a simple camera are comparable. FIG. 9I and FIG. 9J show conversion of the color data from the camera image data, according to one or more embodiments. In some embodiments, this can be accomplished by converting the red/green/blue (RGB)-color data to HSV-color space and approximating the wavelength of the color to create and artificial data of the spectral shift.

Figure 10B:
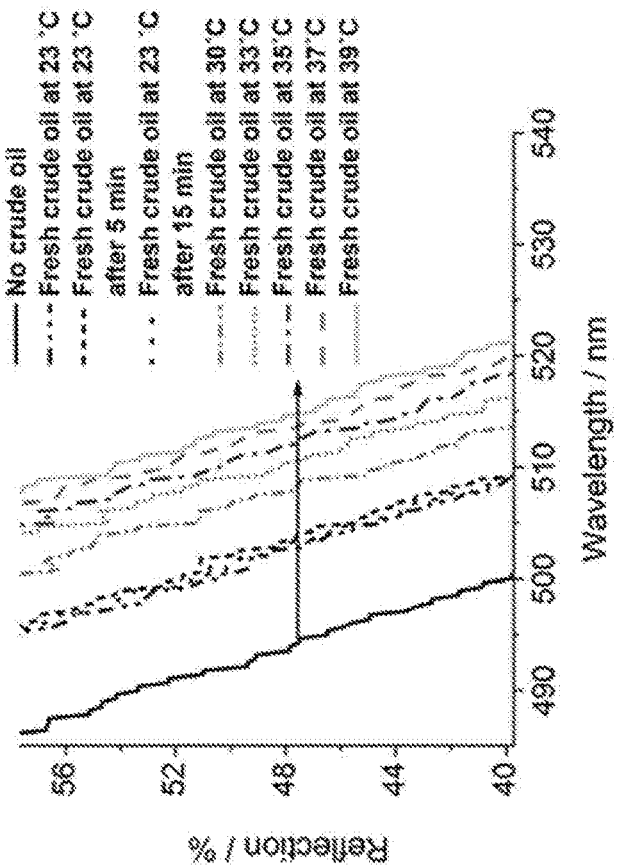
FIG. 10B shows a zoomed-in view of a portion of the spectra of FIG. 10A, according to one or more embodiments.
Figure 10A:
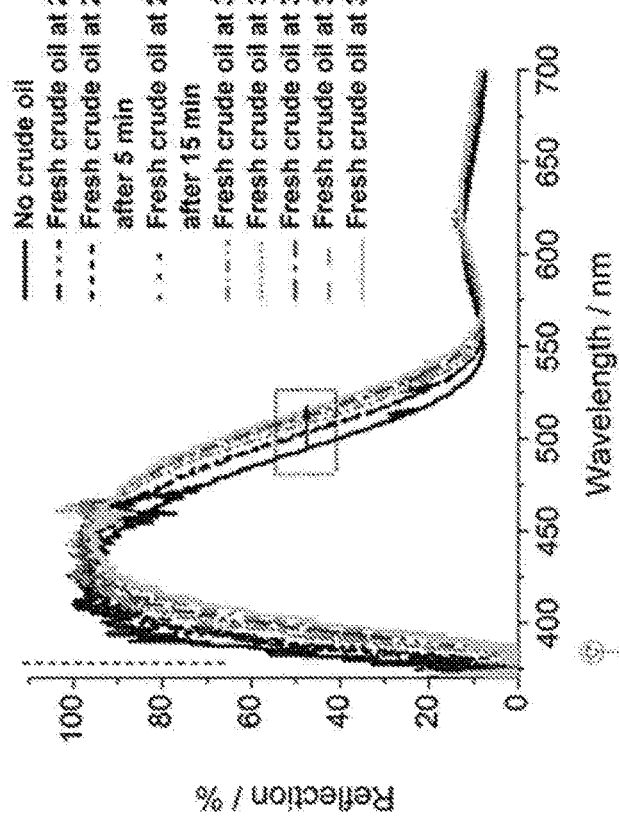
FIG. 10A shows the reflection spectra of a titania/silica one-dimensional photonic crystal for crude oil equilibrated at temperatures between 23° C. and 39° C., according to one or more embodiments.

In some embodiments, a volatility profile for a volatile liquid mixture can be obtained by monitoring the spectral response of a one-dimensional photonic crystal as a function of temperature ($\Delta R(T)$). FIG. 10A shows a plot of reflection spectra for a titania/silica one-dimensional photonic crystal, for normally-incident light, showing the shifting behavior ("red shift") of the photonic band gap (left to right) in response to an increase of the crude oil temperature (i.e., equilibrated at temperatures between 23° C. and 39° C.), according to one or more embodiments. Each temperature set point was equilibrated for at least 3 minutes. By fixing the wavelength at a certain position, e.g., at 500 nm, as shown by the vertical dashed line in FIG. 10A, the change in the reflection was followed. As shown in FIG. 10B (a zoomed-in view of the rectangular region indicated in FIG. 10A), the position of the band gap of the photonic crystal shifted more than 20 nm towards longer wavelengths in the temperature range between 23° C. and 39° C.

Figure 11:
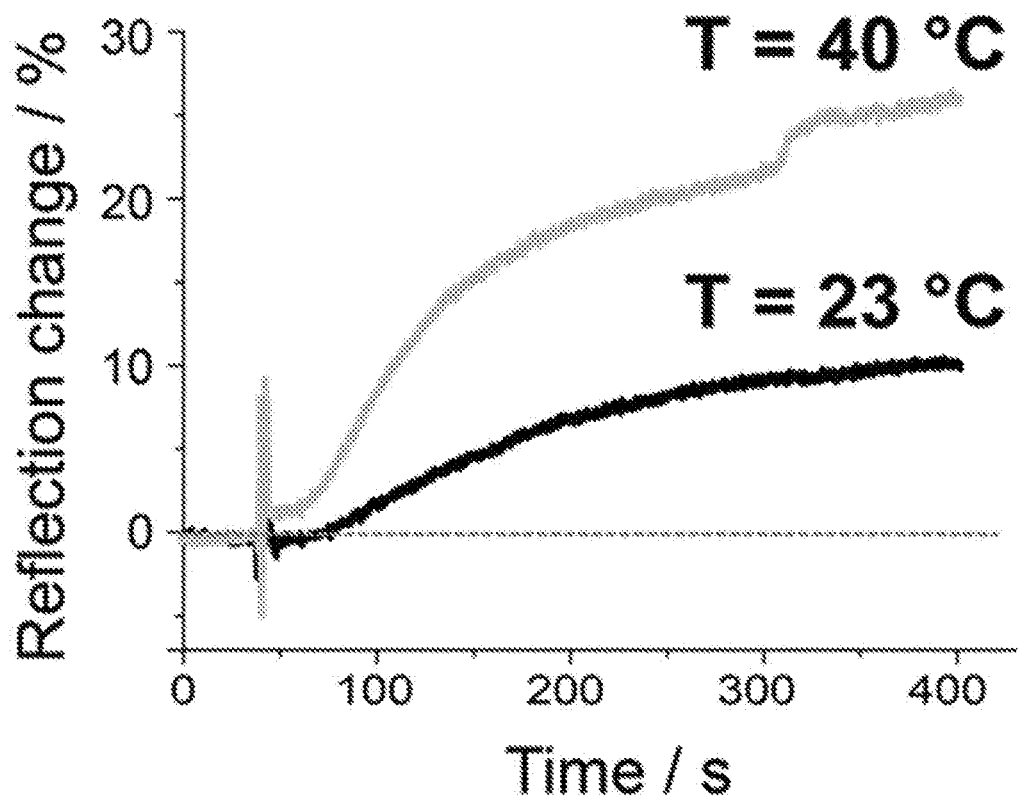
FIG. 11 shows dynamic response curves of a titania/silica one-dimensional nanoparticle-based photonic sensor when exposed to vapors of crude oils at different temperatures, according to one or more embodiments.

FIG. 11 shows dynamic response curves of the kinetic spectral response $\Delta R(T, t)$ of the photonic crystal for crude oil at 23° C. and at 40° C., representing the titania/silica one-dimensional nanoparticle-based photonic sensor exposed to vapors of crude oils at these two different temperatures, according to one or more embodiments. The rate of change in the reflectance $\Delta R(T, t)$ for the crude oil at 40° C. was significantly higher than the rate of change in the reflectance for the crude oil at 23° C., suggesting that a larger amount of volatile species was present in the analysis chamber at 40° C. In some embodiments, shapes of the spectra provide an additional means for a comparative analysis of the curves obtained at various temperatures, and can be relevant for the composition recognition. In these embodiments, this is useful for compounds that vaporize quickly or slowly at room temperature, such as short alkanes between methane and butane, or long-chain alkanes in crude oil, respectively. In these embodiments, decreasing or increasing the operating temperature to inhibit or promote the vaporization of compounds can extend the signal and improve analysis.

Figure 12A:
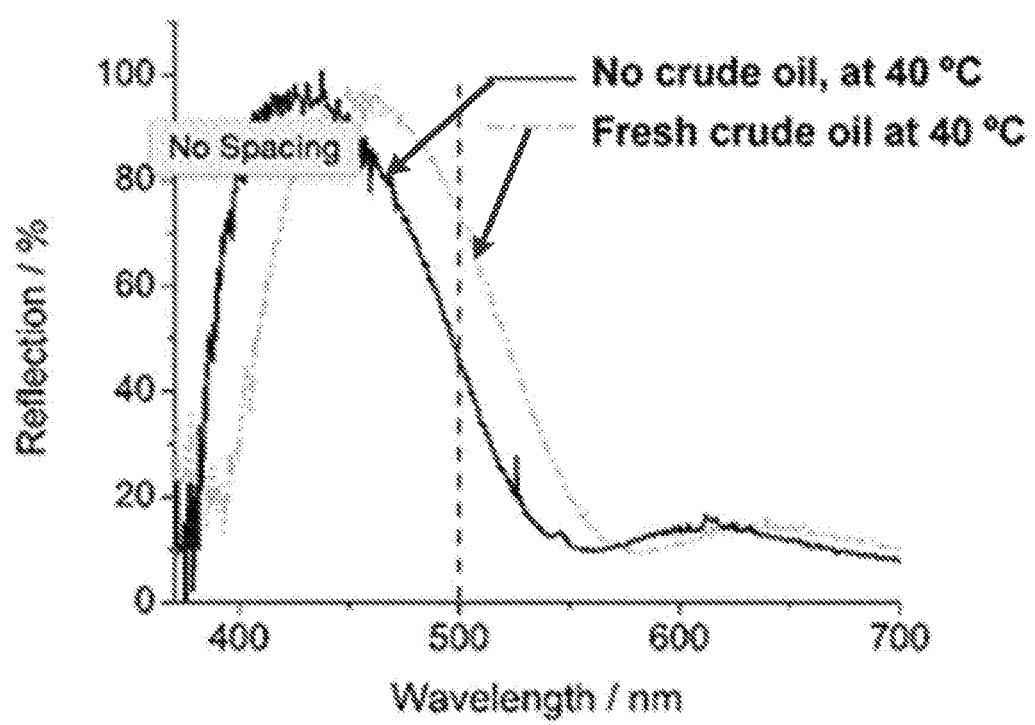
FIG. 12A shows a plot comparing a reflectance spectrum of a photonic crystal having empty pores with a photonic crystal having pores filled with fresh crude oil at 40° C., according to one or more embodiments.
Figure 12B:
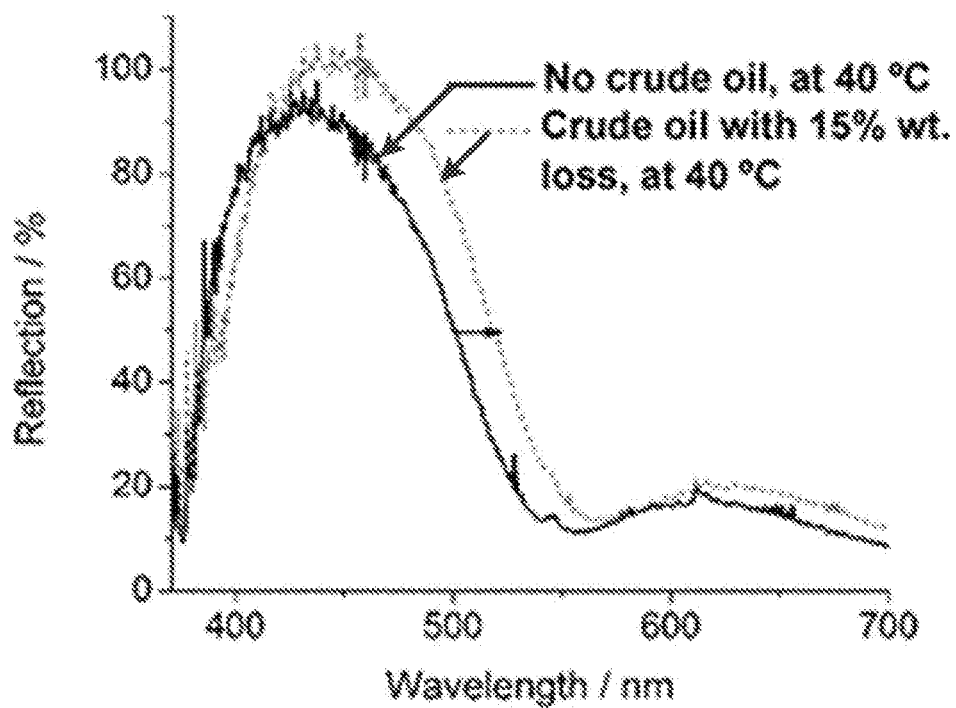
FIG. 12B shows a plot comparing a reflectance spectrum of a photonic crystal having empty pores with a photonic crystal having pores filled with crude oil with a 15 wt % loss at 40° C., according to one or more embodiments.
Figure 12C:
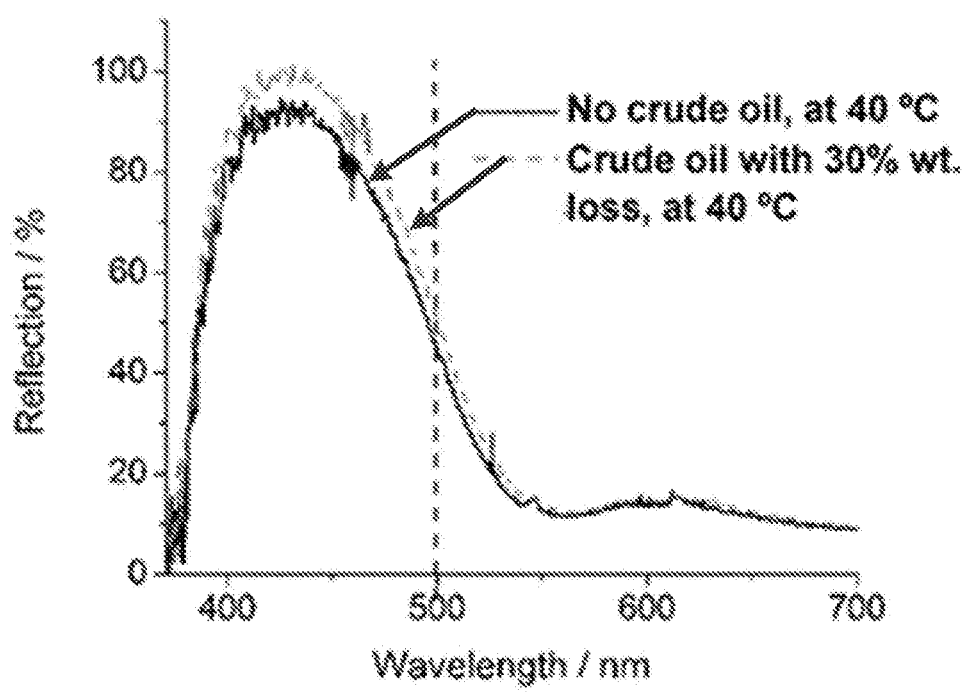
FIG. 12C shows a plot comparing a reflectance spectrum of a photonic crystal having empty pores with a photonic crystal having pores filled with crude oil with a 30 wt % loss at 40° C., according to one or more embodiments.

In some embodiments, volatility profile read-outs can also be performed isothermally for crude oil samples with different amounts of dissolved volatile components. In FIGS. 12A-12C, for example, the reflection spectra are shown for a one-dimensional photonic crystal at 40° C. with empty pores (black lines) and pores that are filled (gray lines) with a fresh crude oil sample (FIG. 12A), crude oil that lost 15% of its initial weight due to the evaporation of volatile components (FIG. 12B), and crude oil that lost 30% of its initial weight due to the evaporation of volatile components (FIG. 12C). As can be seen by comparing FIGS. 12A-12C with one another, the magnitude of the wavelength shift was smallest for the sample of FIG. 12C, which has the smallest amount of volatile gases remaining (i.e., the greatest volatile weight loss).

Figure 13:
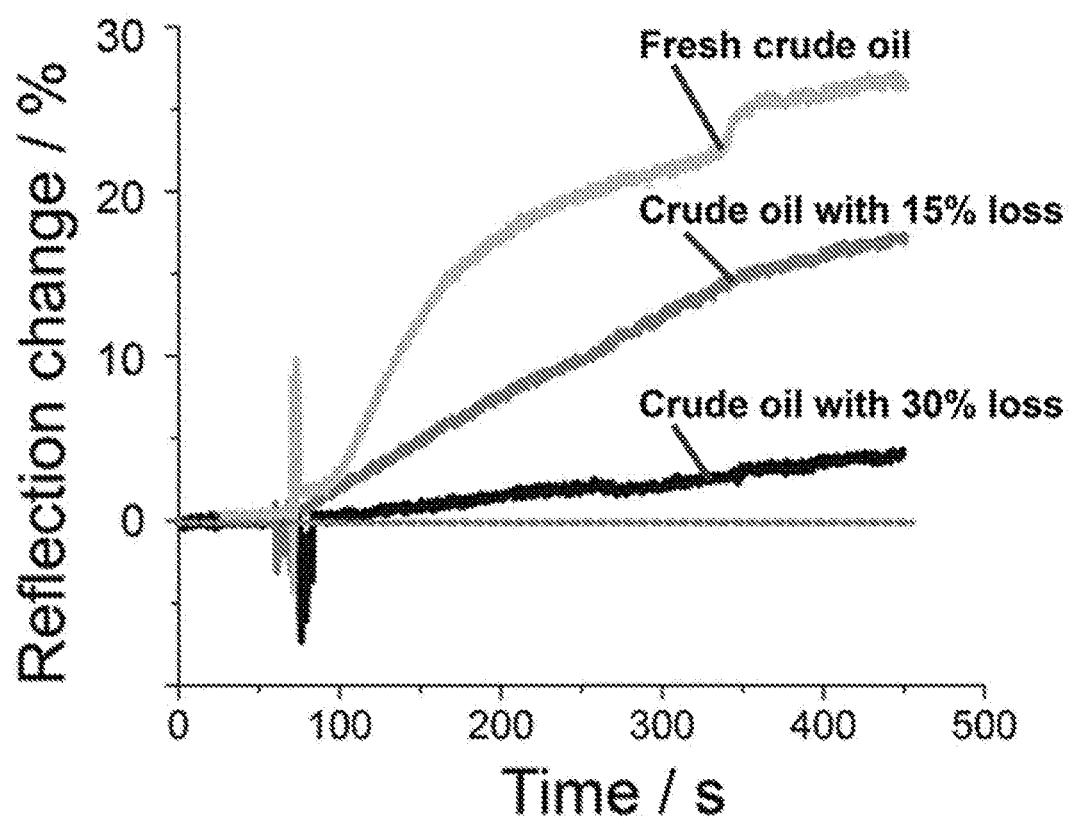
FIG. 13 shows time-response curves for a one-dimensional photonic crystal exposed to crude oil samples of different packaging groups at a constant temperature of 40° C., according to one or more embodiments.

FIG. 13 shows the kinetic time-response curves monitored at a wavelength of 500 nm for the samples of FIGS. 12A-12C, according to one or more embodiments. In FIG. 13, the rapid reflection change at about 75 seconds can result from injection of the volatile liquid mixture. Specifically, the injection of liquid caused vibration of the chamber which led to a short misalignment of the crystal and the spectrophotometer, causing the sharp signal at 75 seconds. In these embodiments, the time-response curves for the various crude oil samples showed a drastic change in the slope of the % reflectance change versus time curves. The lowest rate of change (i.e., the shallowest slope) was observed for the sample of FIG. 12C (30% weight loss, which corresponds to packaging group III), whereas the highest rate of change (i.e., the steepest slope) was observed for the sample of FIG. 12A (the fresh crude oil sample, which corresponds to packing group I). As such, in these embodiments, the observed kinetics were indicative of the crude oil composition being analyzed, and allowed for a facile determination of the packing group.

Figure 14:
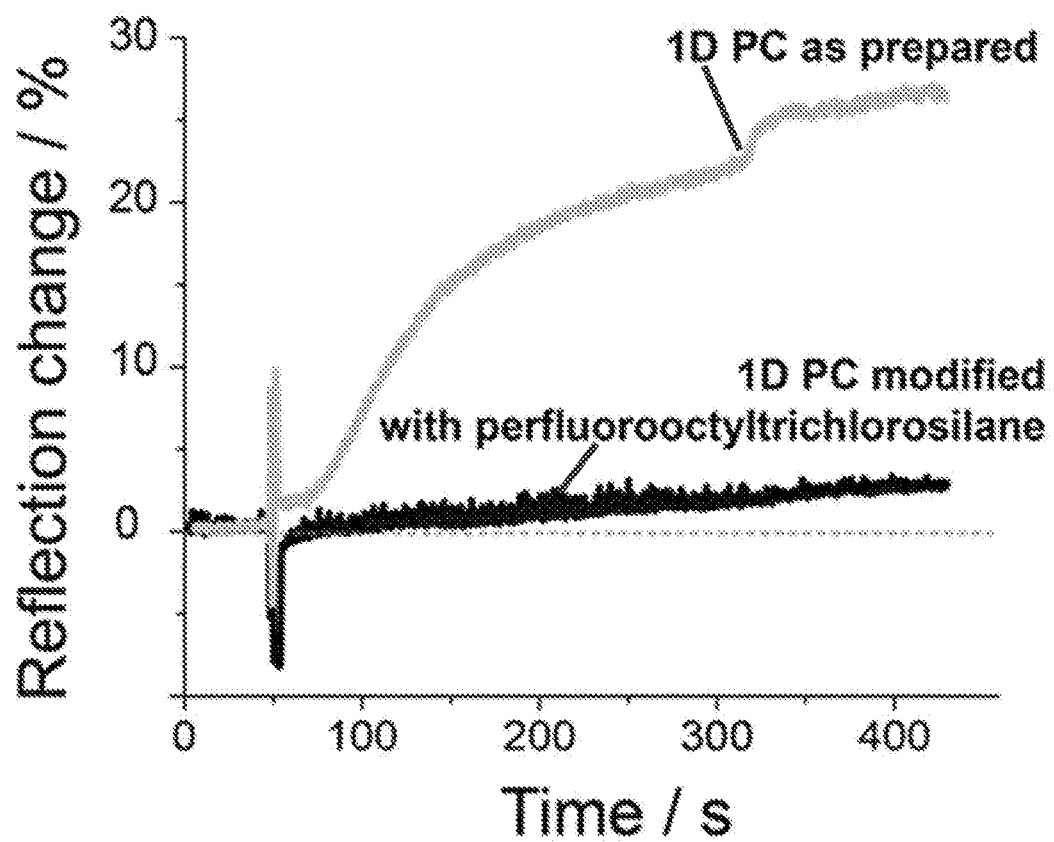
FIG. 14 shows a plot comparing response curves for as-prepared photonic crystals and fluorinated photonic crystals exposed to a fresh crude oil sample at a constant temperature of 40° C., according to one or more embodiments.

In some embodiments, further enhancement of the selectivity of the photonic crystal response for classification of the packing groups and estimation of the distillation curves can be achieved by using photonic crystals comprising materials with tailored surface functionalities. Non-limiting examples of such materials include perfluorooctyltrichlorosilane, triethoxysilylbutyraldehyde, bis(2-hydroxyethyl)-3-aminopropyltriethoxysilane, 3-chloropropyltriethoxysilane, 3-(trihydroxysilyl)-1-propanesulfonic acid, n-(triethoxysilylpropyl)-alpha-poly-ethylene oxide urethane, n-(trimethoxysilylpropyl) ethylene diamine triacetic acid, n-octyltriethoxysilane, n-octadecyltriethoxysilane, (3-trimethoxysilylpropyl) diethylenetriamine, methyltriethoxysilane, hexyltrimethoxysilane, 3-aminopropyltriethoxysilane, hexadecyltriethoxysilane 3-mercaptopropyltrimethoxysilane, and dodecyltriethoxysilane, or chiral functionalities including N-(3-triethoxysilylpropyl) glucoamide or (R)—N-triethoxysilylpropyl-O-quinineurethane). FIG. 14 shows the case of perfluorooctyltrichlorosilane according to one or more embodiments, comparing the response curves of as-prepared (grey) and fluorinated (black) photonic crystals when exposed to a fresh crude oil sample at a constant temperature of 40° C. In this example, crude oil condensation in the sensor was inhibited by the fluorination of the photonic crystal. Similarly, in these embodiments, the functionality of the sensor can be used to inhibit or promote the condensation of certain analytes, thereby reducing their response time. For example, in some embodiments, a hydrophilic functionalization (e.g., 2-[methoxy (polyethyleneoxy) 9-12propyl]trimethoxysilane) can be used to promote detection of water contamination in petroleum products. In some embodiments, the functionality of the sensor will promote adsorption of similar analytes and inhibit adsorption of dissimilar analytes.

Although the volatile liquid mixture crude oil is exemplified in some embodiments in describing the methods and devices and methods disclosed herein, their use in analyzing other volatile liquid mixtures (e.g., fuels, wastewater, solvents, cosmetics, drugs, food, and beverages, or any other multi-component fluid that includes at least one volatile component) is also contemplated.

Machine Learning Frameworks for Classification and Regression

In some embodiments, machine learning frameworks constitute a useful analysis tool for the non-equilibrium sensing method according to one or more embodiments described herein. In some embodiments, the machine learning framework includes a series of sensor signal-preprocessing methods (e.g., transform and normalization), followed by extraction and selection of the sensor features from the initial multidimensional fingerprints, and followed by classification, regression, clustering, and cross-validation. In some embodiments, if the analyte is not from the training data set and the supervised classification/regression is not possible, the machine learning framework can establish an unsupervised model for mapping the unknown fingerprint with the target physico-chemical properties. Examples of the machine learning frameworks according to some embodiments include LASSO, kernel ridge regression, support vector machine, neural networks (including transfer learning neural networks), GANs, decision trees, bagging classifiers, multiclass logistic regression, principal component analysis, and linear discriminant analysis.

Figure 24A:
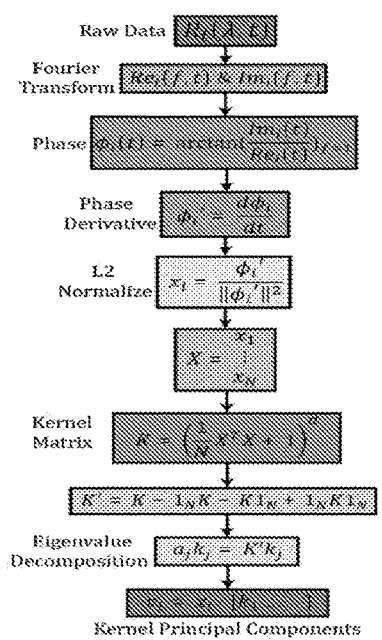
FIG. 24A shows a schematic illustration of a data processing pipeline used to perform the kernel-based principal component analysis of the library of responses, according to one or more embodiments.
Figure 24B:
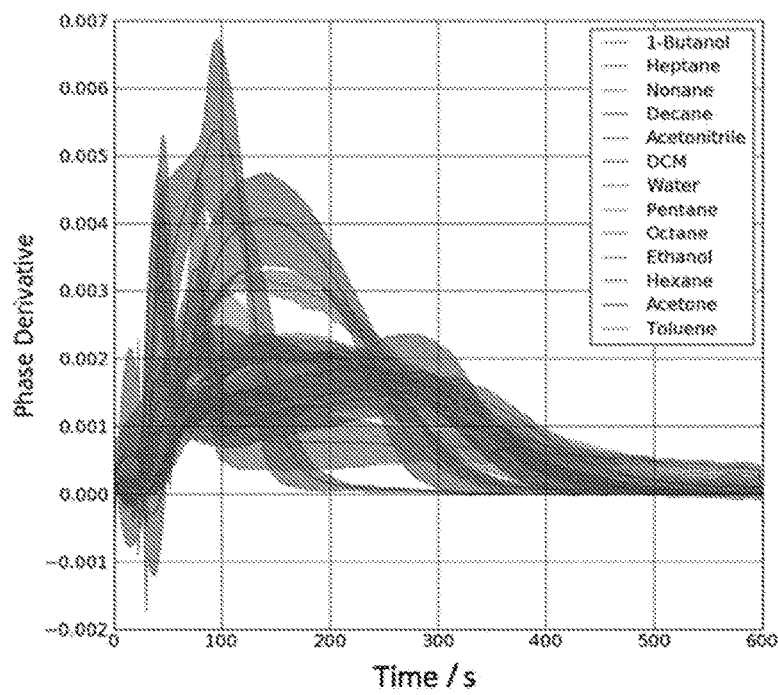
FIG. 24B shows the diversity of the shapes of phase derivatives of the spectral shifts of the photonic crystal in response to volatile analytes, according to one or more embodiments.
Figure 25A:
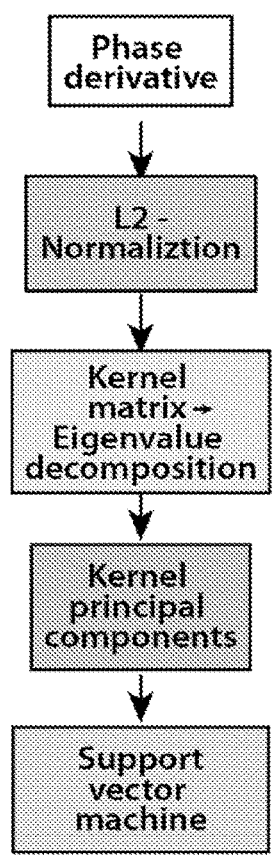
FIG. 25A shows support vector machine-based classification of volatile liquids of varying polarity based on the non-linear, kernel principal component analysis of the spectral shift responses of the stimuli-responsive photonic sensor, according to one or more embodiments.
Figure 25A:
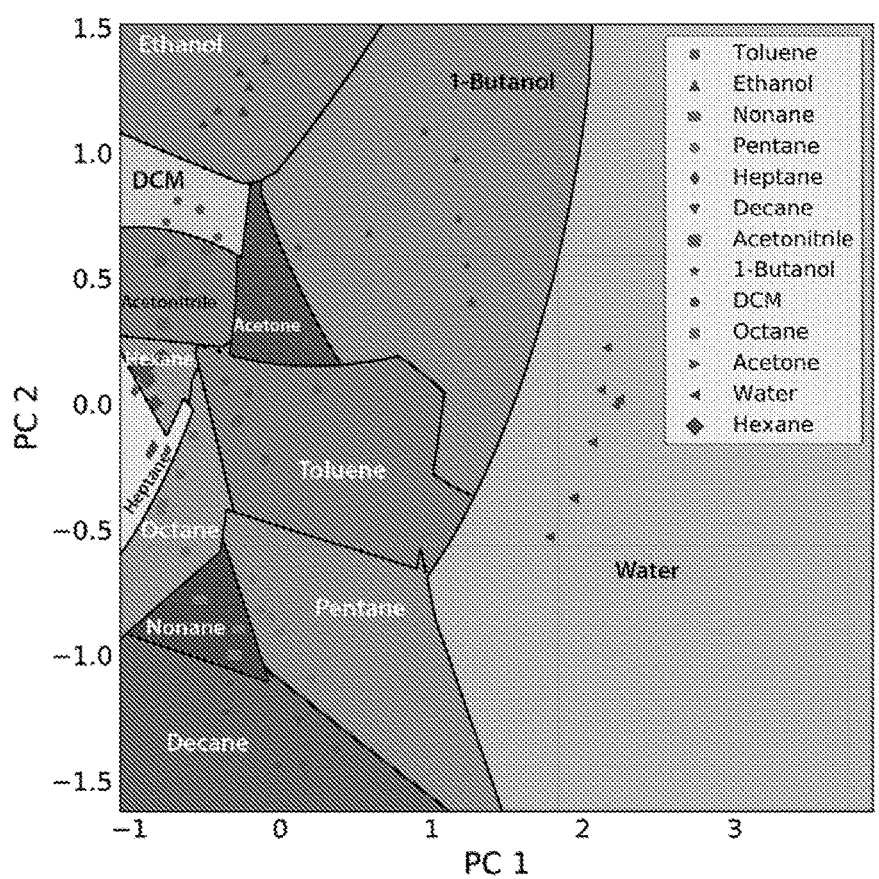
Figure 25B:
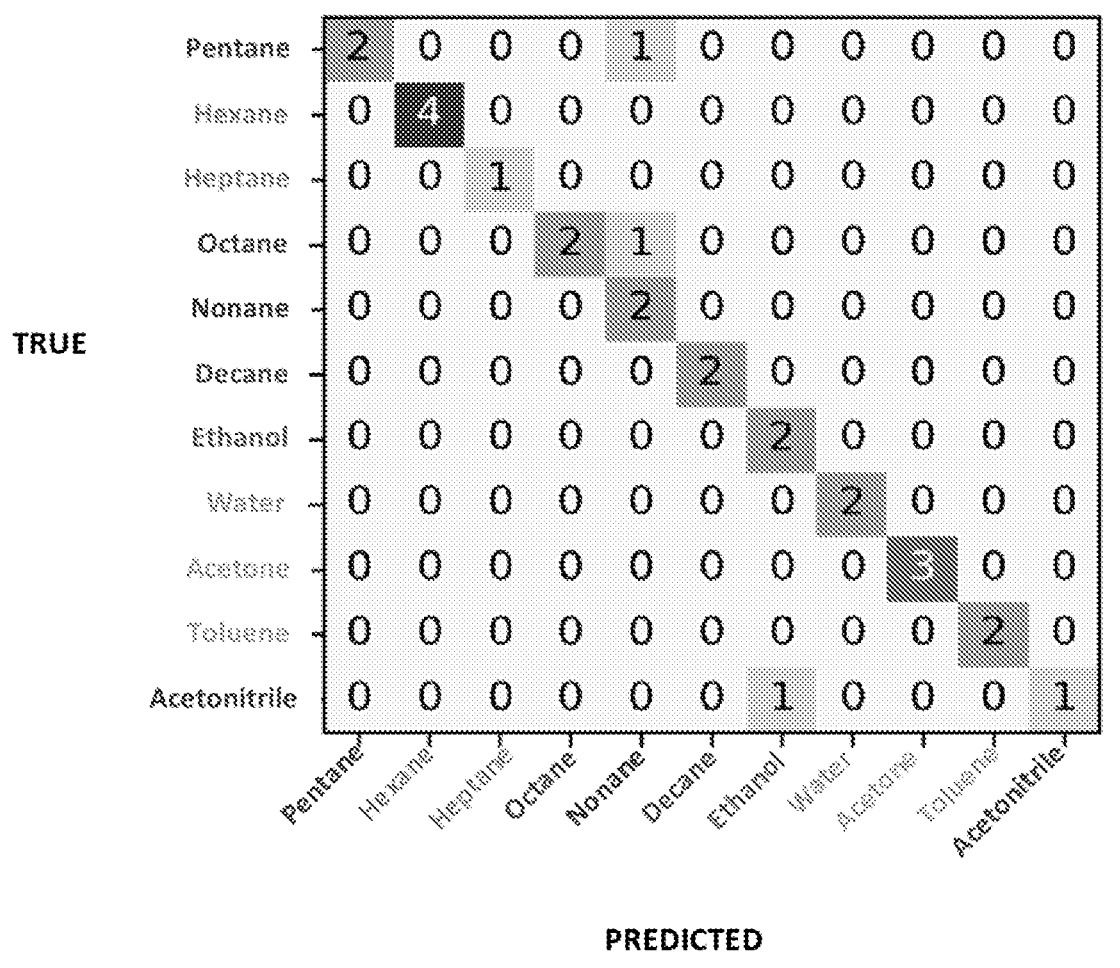
Figure 26A:
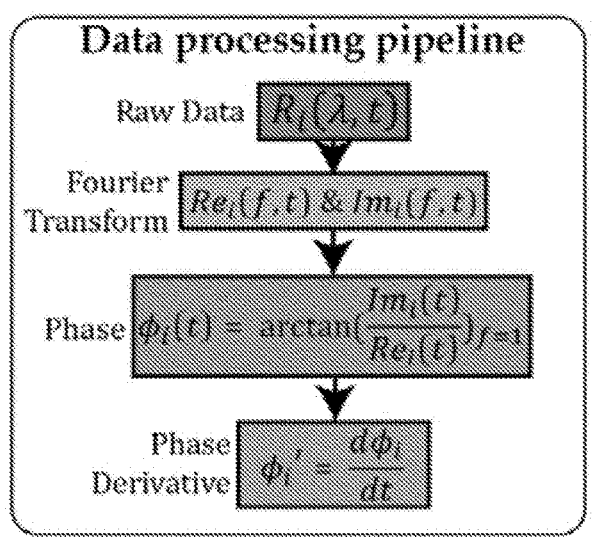
FIG. 26A shows the data processing workflow used to obtain the feature vectors for the predictive modelling of volatile liquid mixtures, according to one or more embodiments.

As shown in FIG. 24A to apply machine learning frameworks for classification, in one or more embodiments, the experimentally obtained data was first pre-processed by digital signal-processing techniques to extract nuanced features of the signals, xi, e.g., by performing the Fourier transform of the response map and calculating the derivative of the Fourier phase (see also FIG. 26A). The features xi, e.g., the phase derivatives of the time response maps as shown in the FIG. 24B, were then L2-normalized and transposed. The L2-method normalized the length of the vectors to ensure that rapid changes were not over-prioritized. Then, kernel-based principal component analysis and support vector machine, available at Scikit-learn open source Python library (Pedregosa et al., Machine Learning in Python, JMLR 12, pp. 2825-2830, 2011), were utilized to perform the classification tasks. The following data procedure libraries were used: NumPy (Fourier transform and general array functionality), SciPy (savitzky-golay filter), and SK Learn for principal component analysis and support vector machine. In some embodiments, kernel non-linear functions provide a measure of similarity between the datasets in the obtained response library, and kernel-based methods enable the user to perform a "trick" of operating in a higher-dimensional, implicit feature space, in which the previously inseparable data becomes separable. A variety of kernels (polynomial and radial basisfunction) were used to enable high spatial robustness of the principal component analysis and optimize the fitting parameters of the supervised support vector machine model in order to achieve the maximum discrimination between the tested volatile analytes. The 5-fold cross-validation by shuffle splits with 20% reserved for testing was performed on more than 20 types of tested analytes (polar and non-polar solvents and their binary mixtures), and revealed that the disclosed machine learning framework achieves more than 97% accuracy in the chemical classification. As shown in FIG. 25A, regional boundaries were drawn by support vector classification using a rbf (radial bound function) kernel with C=1000, determined by grid search. FIG. 25B shows the corresponding confusion matrix, a table that is used to describe the performance of a classification model on a set of test data for which the true values are known, with an accuracy of 88%, according to one or more embodiments.

Figure 26B:
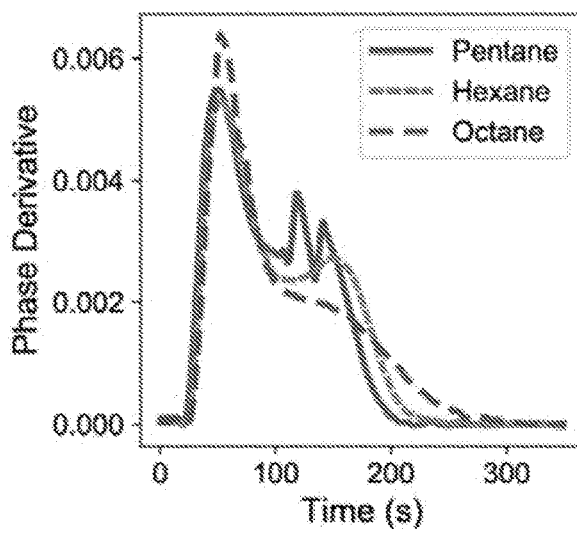
FIG. 26B shows the phase derivative curves calculated for the time response maps of FIG. 26A, according to one or more embodiments.
Figure 27:
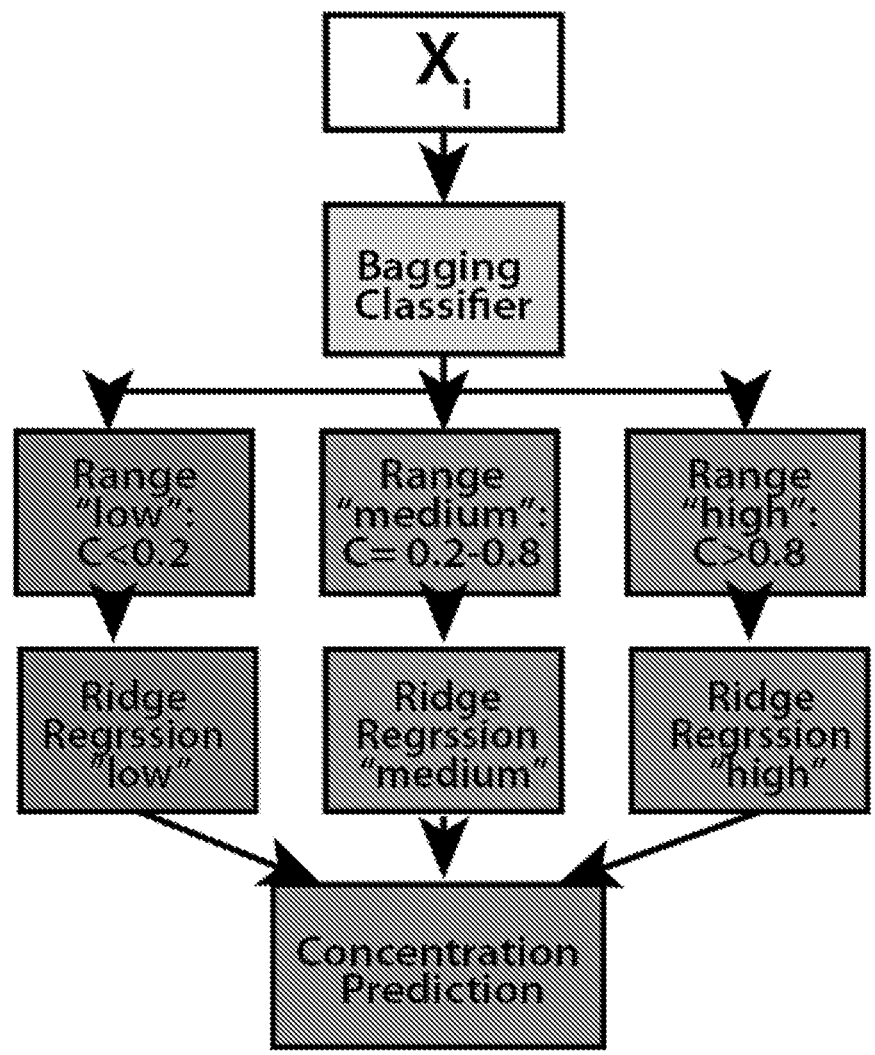
FIG. 27 shows the data processing workflow used for predictive modeling of binary volatile liquid mixtures, according to one or more embodiments.
Figure 28A:
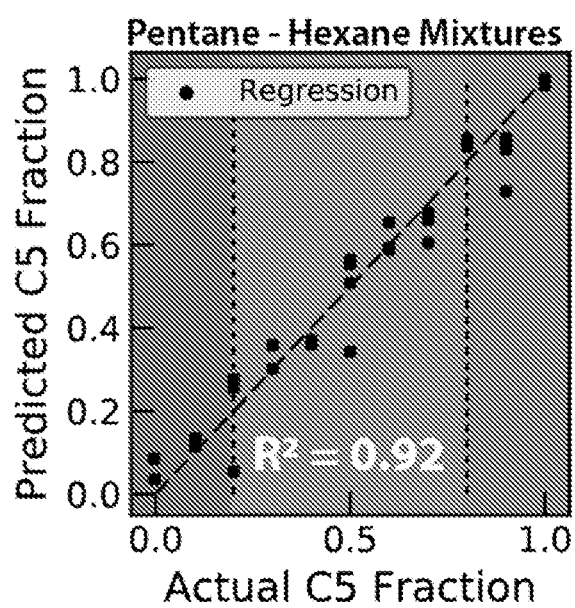
FIG. 28A shows the predicted concentrations of pentane compared to the actual concentration set points for a binary mixture of pentane and hexane calculated by a LASSO regression model, according to one or more embodiments.
Figure 28B:
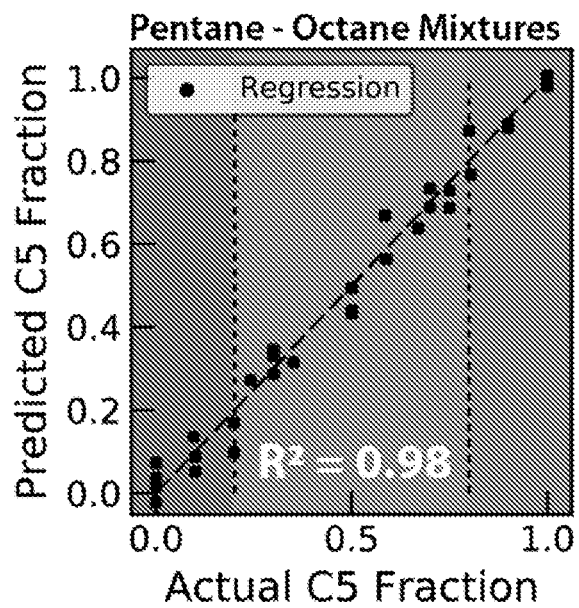
FIG. 28B shows the predicted concentrations of pentane compared to the actual concentration set points for a binary mixture of pentane and octane calculated by a LASSO regression model, according to one or more embodiments.

To evaluate the capability of the machine learning according to one or more embodiments to discriminate volatile liquid mixtures via machine learning tools, predictive multivariate regression models were used. In some embodiments, regression models can be applied to relate complex sensor responses to a quantitative property of the analyzed sample, for example, a concentration. As shown in FIGS. 26A-26B, to apply machine learning frameworks for regression, experimentally obtained data ("raw data") was first pre-processed by digital signal processing techniques ("Fourier transform") to extract nuanced features of the signals, xi, e.g., by performing the Fourier transform of the response map and calculating the derivative ("phase derivative") of the Fourier phase ("phase"). FIG. 27 shows a schematic illustration of the methodology for compositional analysis of complex volatile liquid mixtures based on monitoring dynamic mass transfer phenomena. The features xi, e.g., the phase derivatives of the time response maps, were then imported into a classifier with optimized performance, e.g., Bootstrap Aggregating (Bagging) Classifier, to perform pattern recognition and/or classification of the initial data set into subcategories for convenience, as shown in the data processing pipeline in FIG. 27. For example, in some embodiments, the Bagging classifier can be used to split the initial concentration range of the mixtures into three or more ranges, e.g., low, medium and high concentrations, in order to more precisely compositionally analyze within each individual subcategory (FIG. 27, third row). In each region, the corresponding dataset was fit with polynomial kernel ridge regression, where the datapoints are first passed through a polynomial function (Kernel) before performing a least-squares regression (Tikhonov regularization). This resulted in a matrix expression that was used to predict the concentration of new datapoints. The polynomial kernel ridge regression for each low, medium, and high region was tested first for binary mixtures of pentane and hexane, and pentane and octane, with various molar ratios. A series of 33 experiments (0-100% in 10% intervals with 3 repetitions) was performed for each mixture. All time-dependent responses were measured in the range of 375-800 nm, at a frequency of 2 Hz. The predictions were plotted against the actual values in FIG. 28A for the pentane/hexane mixture and in FIG. 28B for the pentane-octane mixture. The $R^2$, or the number that indicates the proportion of the variance in the dependent variable that is predictable from the independent variable, for the kernel ridge regression model was 0.92 for the pentane/hexane mixture and 0.98 for the pentane/octane mixture, demonstrating the high accuracy of the predictive model.

Figures 28C, 28D:
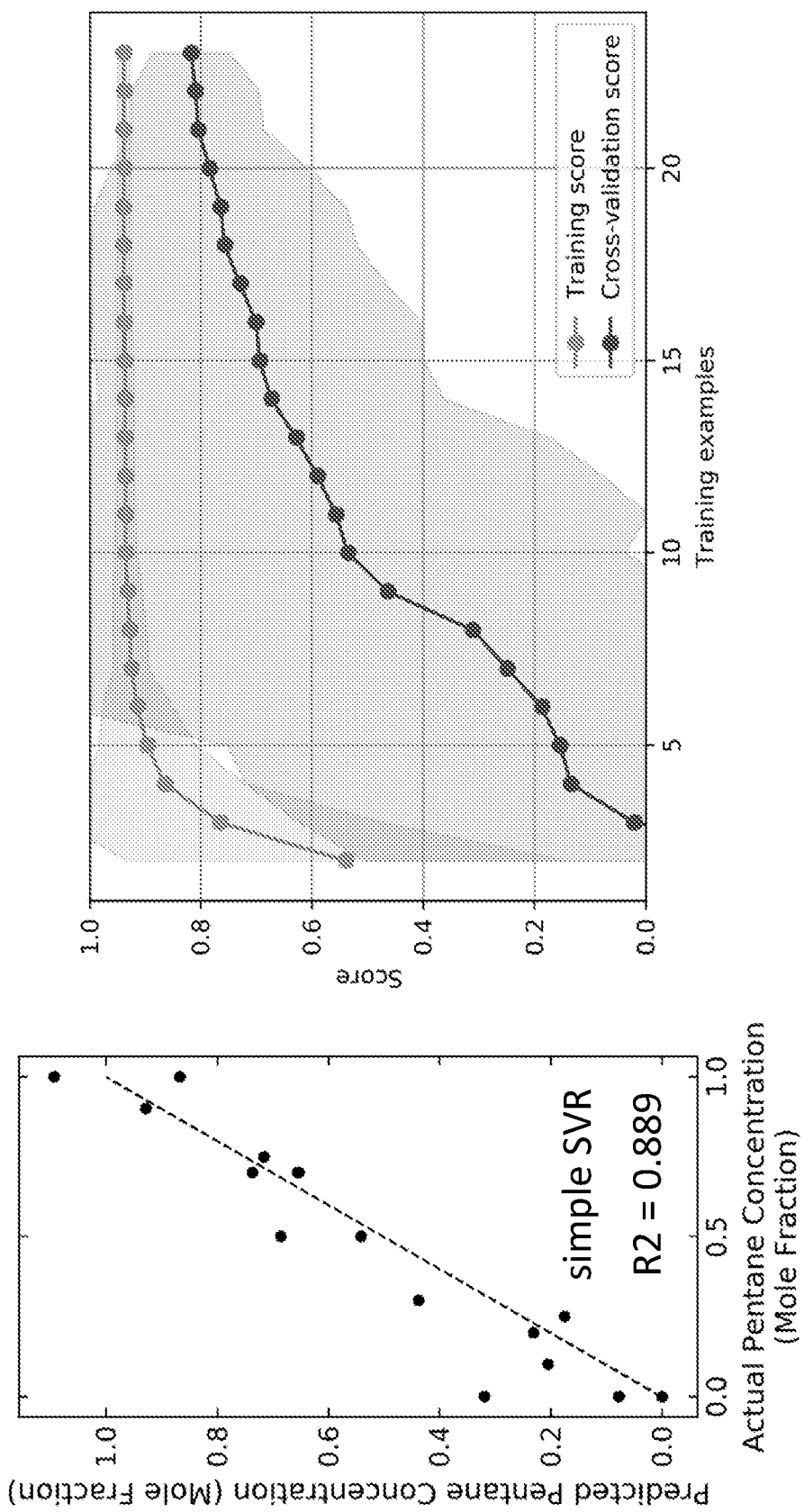
FIG. 28C shows the prediction of the pentane concentration in octane using a support vector regression (SVR) model, according to one or more embodiments.
FIG. 28D shows the increase in prediction accuracy with the size of the training set for prediction of the concentration of pentane in octane using the support vector regression (SVR) model of FIG. 28C, according to one or more embodiments.
Figure 28F:
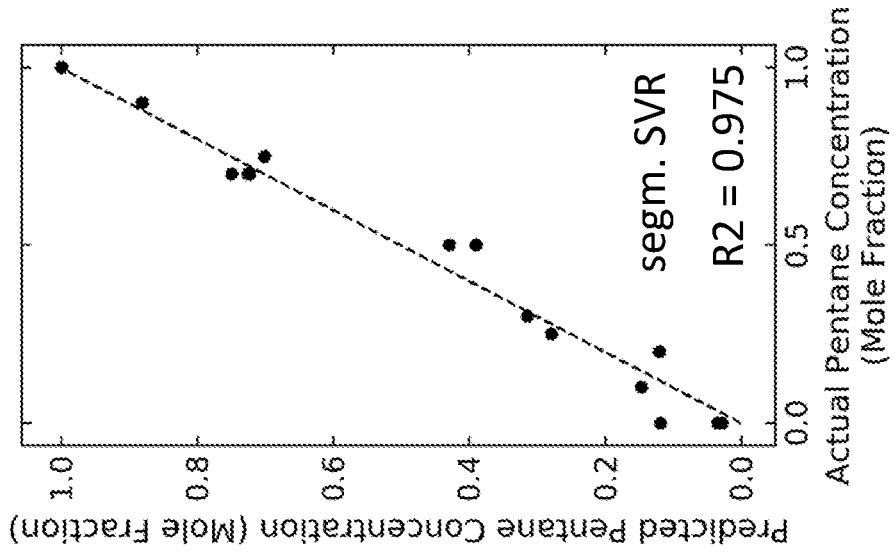
FIG. 28F shows the accuracy for the prediction of the concentration of pentane in octane using the segmented regression of FIG. 28E, according to one or more embodiments.
Figure 28E:
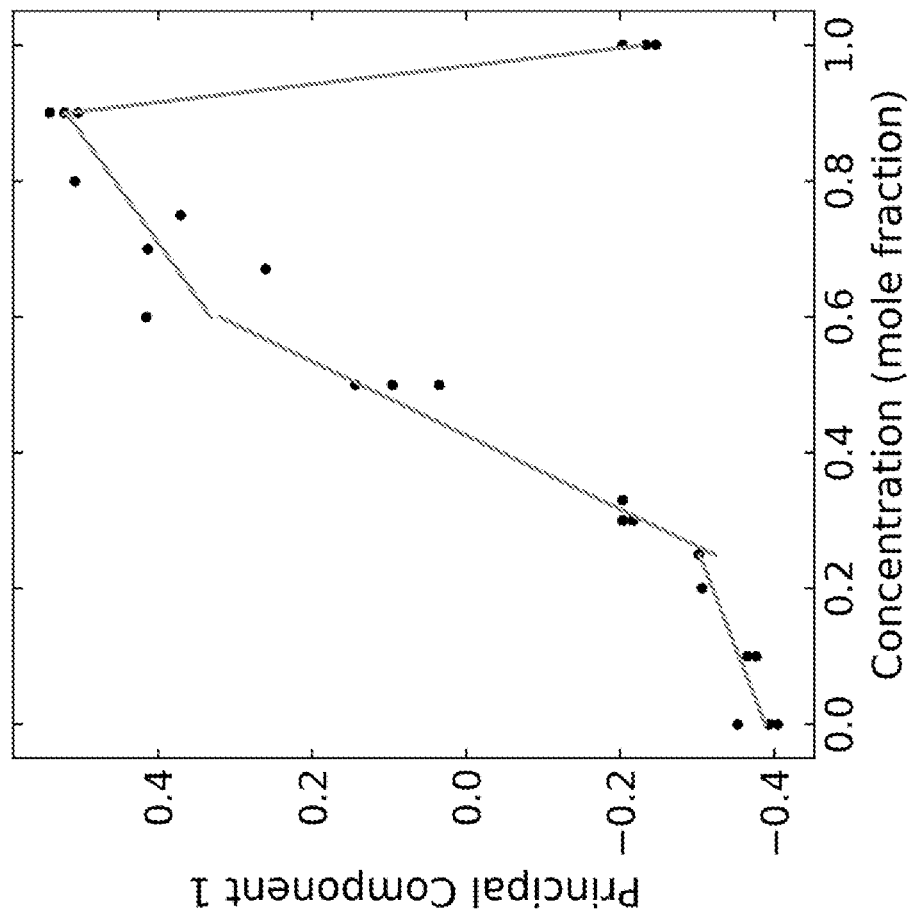
FIG. 28E shows the segmentation of the range of concentrations of pentane in octane tested using segmented regression and principle component analysis, according to one or more embodiments.

In some embodiments, the prediction of concentrations using machine learning in several regions can be automated further to handle non-linear mixtures, such as hexane and octane. As shown in FIG. 28C, these mixtures can be more difficult to predict over the entire range of concentrations, although prediction can still be made. For example, as shown in FIG. 28D, in some embodiments the prediction accuracy increases with the size of the training set, or only a few fixed regions and a small dataset. Segmented regression (piecewise) was used to divide the dataset into regions set by an error threshold and training kernel ridge regressors for each region, as shown in the FIG. 28E. As shown in FIG. 28F, in these embodiments, this approach was able to further improve the prediction accuracy to $R^2$ of 0.975 (compared to 0.889) for non-linear mixtures.

Figure 28G:
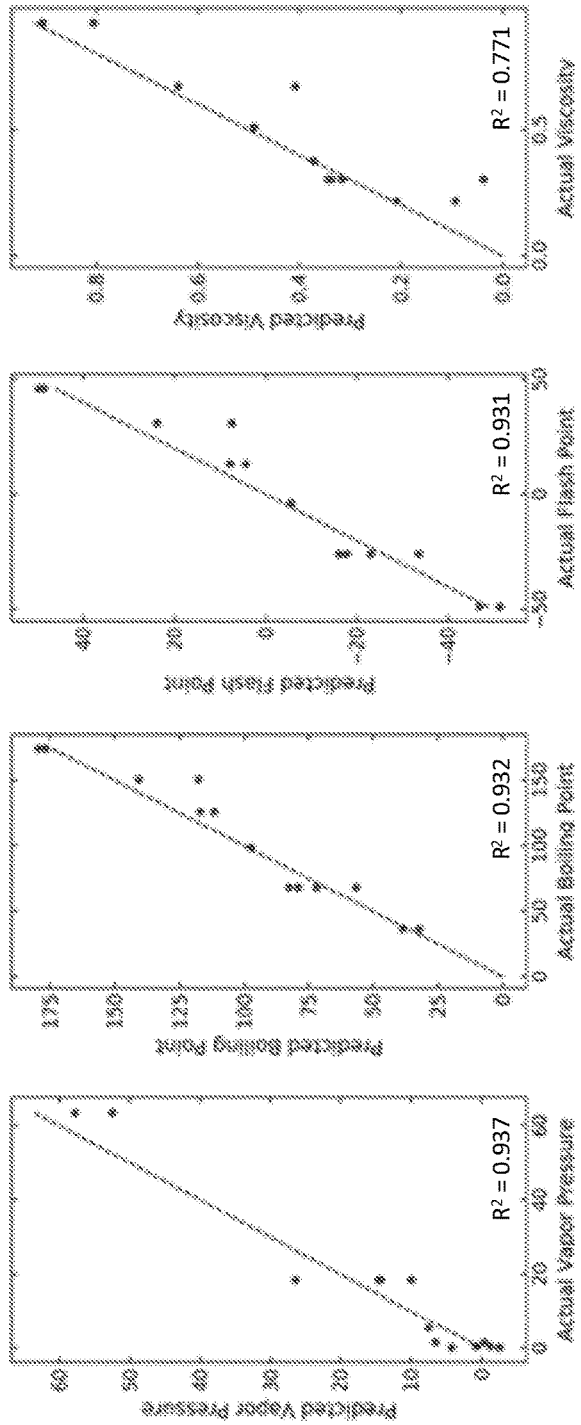
FIG. 28G shows the prediction of vapor pressures, boiling points, and flash points of alkanes using training data from all possible alkanes, according to one or more embodiments.
Figure 28H:
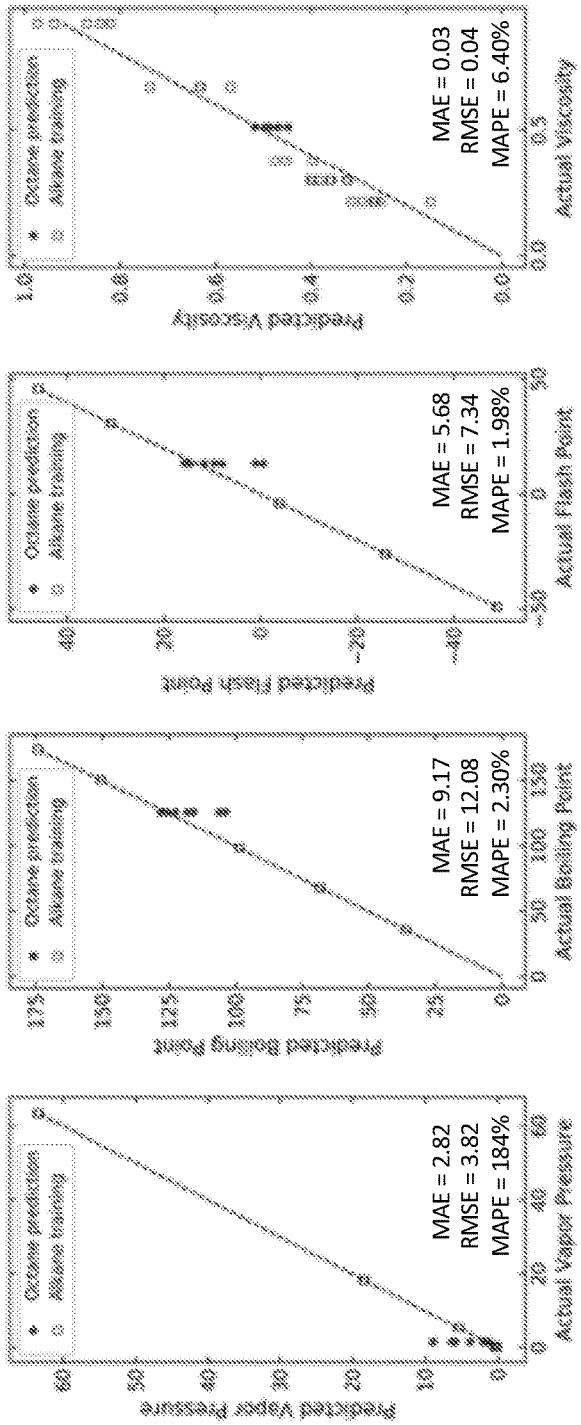
FIG. 28H shows the prediction of physical properties (e.g., vapor pressure, boiling point, and flash point) for an alkane vapor not included in the training data, according to one or more embodiments.

In some embodiments, machine learning regression can be used to predict the physical properties of compounds sorbed onto the sensor. Pre-processing of the spectral data of alkanes from pentane to decane was performed. The dataset was then divided into a training set and a test set in a ratio of 5:2. A support vector regression module was then trained using the training set and parameter gridsearch. As shown in FIG. 28G, the vapor pressure, boiling point, flash point, and viscosity of the alkanes was predicted. In some embodiments, the capability of prediction of physical properties unknown to the machine learning was also demonstrated. The above dataset of alkanes was separated into a training set containing pentane, hexane, heptane, nonane, and decane, and the test set containing all experiments for octane. As shown in FIG. 28H, the dataset was then trained using alkanes excluding octane and the vapor pressure, boiling point, flash point, and viscosity of octane predicted with high accuracy. The reported errors were mean absolute error (MAE), root mean squared error (MRSE), and mean absolute percentage error (MAPE).

Figure 28I:
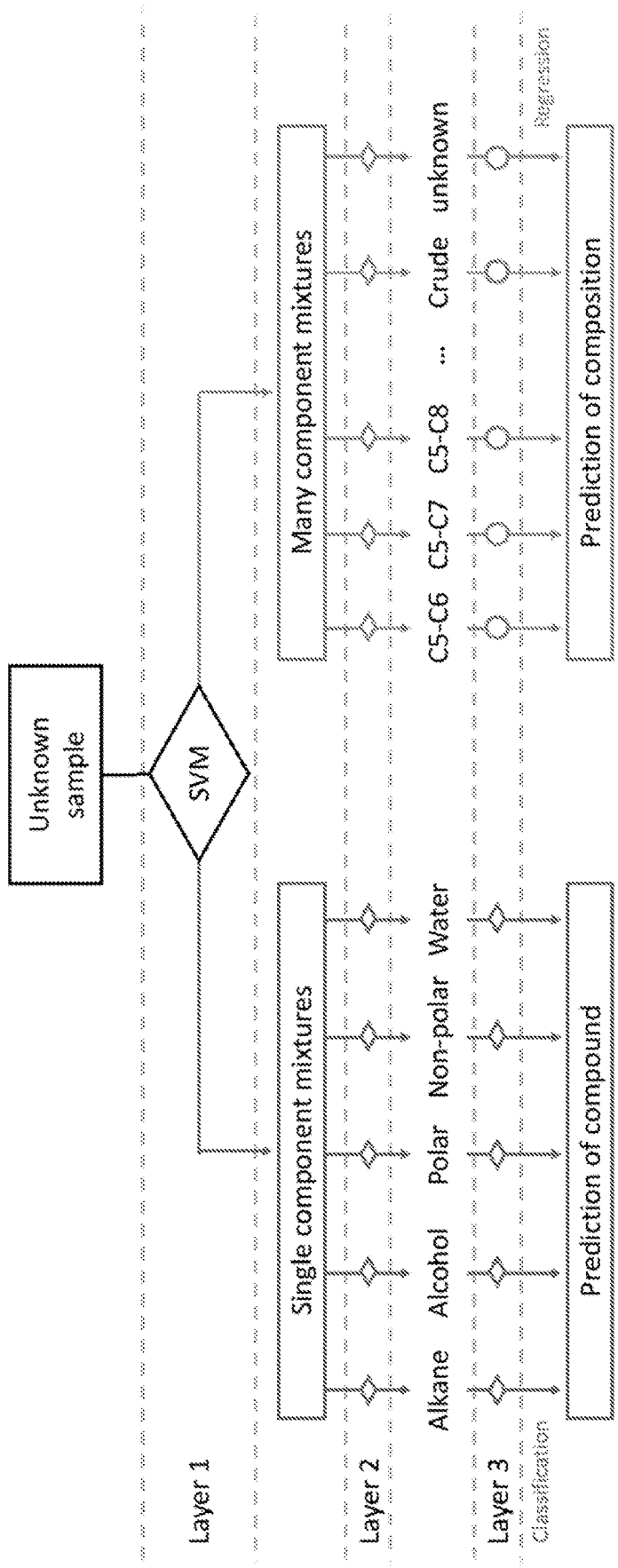
FIG. 28I shows a schematic illustration of a machine learning framework using three layers for the analysis, according to one or more embodiments.

To show that the above machine learning tools can be applied broadly to samples of unknown composition and number of components, the classification and regression algorithms were combined into a general analysis scheme, according to one or more embodiments, as shown in FIG. 28I. In these embodiments, the scheme can be divided into three layers that are each on subsets of a training set containing individual compounds and mixtures. In the first layer, in some embodiments, a classifier is trained to distinguish pure compounds from mixtures. In the second layer, in some embodiments, single components can be further divided into several predefined categories including, for example, alkanes, alcohols, other polar and non-polar compounds, and water. In some embodiments, volatile liquid mixtures can be similarly compared to a library of different volatile liquid mixtures to determine the most similar reference. In the third layer, in some embodiments, the unknown analyte can be fully predicted to determine the corresponding chemical or concentration based on the results from the first two layers. Using this layered approach to analyze complex mixtures, in some embodiments, the prediction accuracy can be improved from around 22% for several tens of different compounds and mixtures, to over 72%. In some embodiments, the architecture of the machine layer network can further be optimized for the specific sensing task (see, for example, FIG. 28I). In some embodiments, this framework allows for making increasingly precise predictions about the compound or the composition of a measured sample than would be possible in a single step.

Figure 29A:
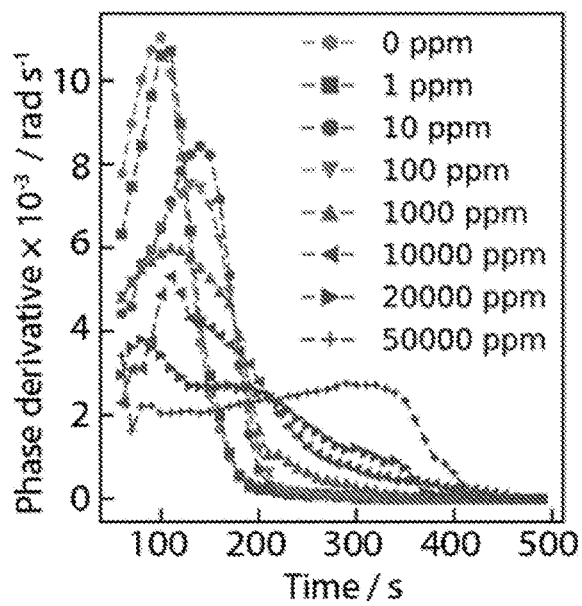
FIG. 29A shows the shapes of phase derivatives of the spectral shifts of the photonic crystal response to ethanol/water mixtures, according to one or more embodiments.
Figure 29B:
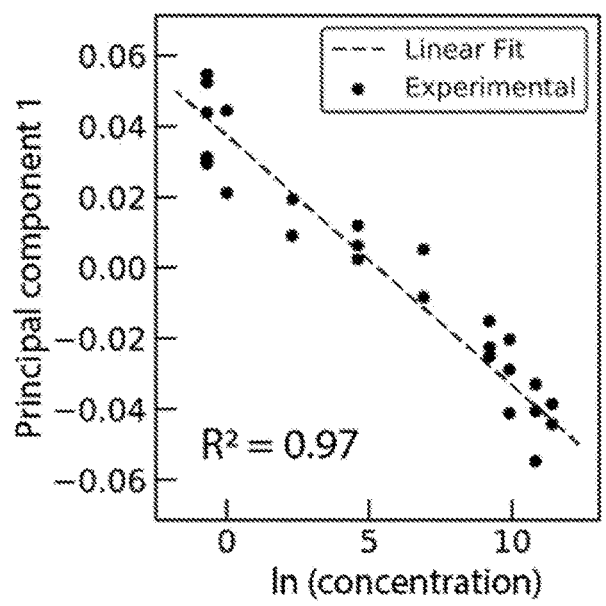
FIG. 29B shows the predicted concentrations of ethanol compared to the actual concentration set points for a binary mixture of ethanol and water calculated by a LASSO regression model, according to one or more embodiments.

As shown in FIGS. 29A-29B, the machine learning disclosed in one or more embodiments herein was used to analyze mixtures of polar components, such as ethanol-water mixtures. The sensing method demonstrated high efficacy in discriminating mixtures with an ethanol content of <20 vol %.

Figure 30:
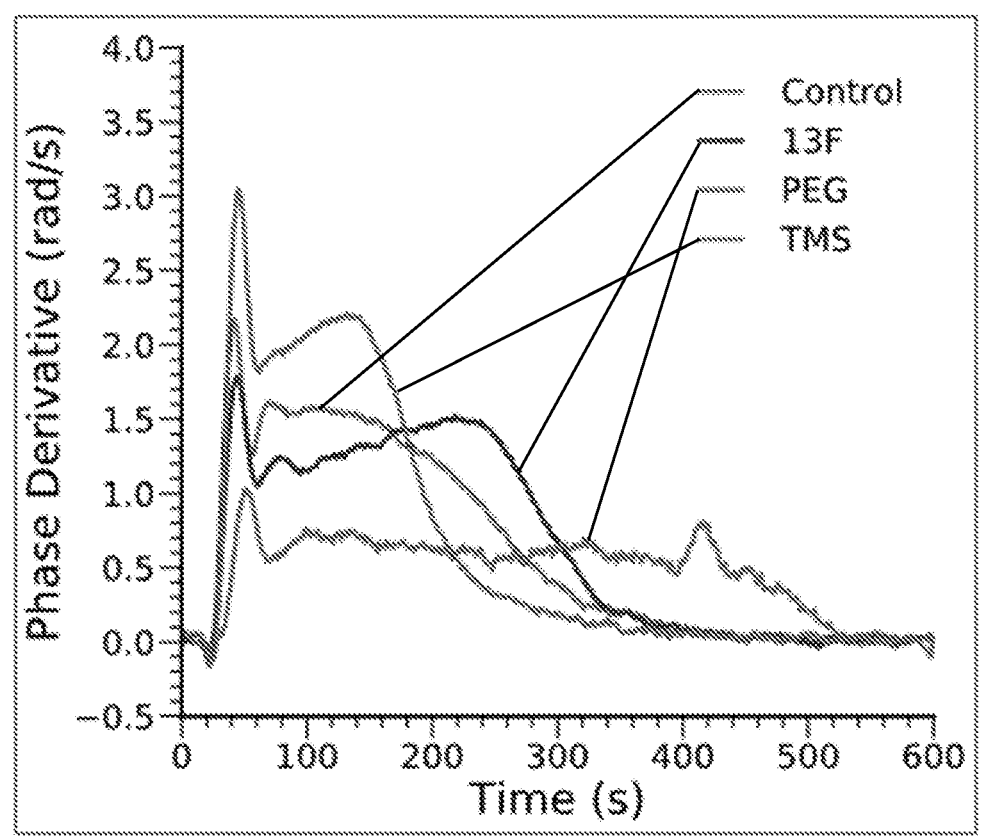
FIG. 30 shows Fourier transform phase derivatives of water deposited on different surfaces, demonstrating the effect of the surface energy of the base, according to one or more embodiments.

Surface Modifications for Control of Convection in an Experimental Chamber to Improve Ability of the Sensor to Identify Concentrations of Components In some embodiments, surface chemistry and topography modifications can be applied to one or more inside surfaces (e.g., the bottom inside surface or base) of the chamber to achieve control of the movement of the liquid analyte after it is injected, and, therefore, to improve the performance of the sensor. In some embodiments, sensing outcomes depend on mass transfer phenomena, such as the bulk flow of at least some of the liquid analyte away from the injection site and across the bottom of the chamber, evaporation, and convection of the analyte in vapor phase. In some embodiments, the performance of the sensor can be improved by increasing differences in mass transfer behavior for various analytes. For example, as shown in FIG. 30, silicon wafers functionalized with homogenous monolayers of 1H,1H,2H,2H-perfluorooctyldimethylchlorosilane ("13F"), 2-[methoxy (polyethyleneoxy) 6-9propyl]trimethylsilane (PEG), and trimethylsilyl (TMS) used as a base showed noticeable differences in the phase derivative of the spectrum shift map.

In some embodiments, the enhancement of sensor selectivity is particularly important for discrimination of alcohol-water mixture, or other mixtures demonstrating highly non-linear trends in physical properties. In some embodiments, a notable example of such mixtures is an ethanol-water mixture that demonstrates an independence of surface tension on the fraction of alcohol above 20 vol %. A number of sensing parameters were tested to enable efficient discrimination of such mixtures. FIG. 31A demonstrates the effect of different kinds of surface modifications-homogenous and gradient 1H,1H,2H,2H-perfluorooctyldimethylchlorosilane-on spreading of pure water and ethanol-water mixtures with ethanol concentrations of 25%, 50%, 75%, and 100%, according to one or more embodiments. As seen in FIG. 32A, a continuous chemical gradient resulted in an even more pronounced difference in coverage of substrate than a homogenous chemical functionalization. FIG. 32B demonstrates the difference in the fraction of the area covered by the analytes, according to one or more embodiments.

Next, discrete multicomponent chemical gradients, fabricated by selectively functionalizing a silicon surface with different silanes (e.g., trimethylsilane (TMS), trichloro(3,3, 3-trifluoropropyl) silane (3FS), n-decylsilane (DEC), and 1H,1H,2H,2H-perfluorooctyldimethylchlorosilane (13F)), was evaluated. The different end groups were chosen based on their surface energy. As shown in FIG. 33A, this gradient accentuated the difference between medium concentrations of water and ethanol, however, it showed worse performance at discriminating between different concentrations at higher concentrations. A 20 uL droplet of water deposited in the center of the gradient had an average speed of movement equal to 0.002 cm/s. The second type of gradient, a surface with a continuous diffusion based single-component chemical gradient, which was fabricated by exposing a silicon surface to a vapor phase diffusion gradient of 1H,1H,2H, 2H-perfluorooctyldimethylchlorosilane, resulted in a continuous gradient depending on the surface concentration of functional groups, was evaluated. This gradient showed an improvement over the other gradient surface for the particular case of water and ethanol. A 20 uL droplet of water deposited in the center of the gradient moved at a speed of 0.404 cm/s. In some embodiments, the third type of gradient, shown in FIGS. 34A-C, is based on lithographic patterning of the surface with hydrophobic 1H,1H,2H,2H-perfluorooctyldimethylchlorosilane stripes and employs homogenous nanoscale roughness to enhance the gradient. A 20 uL droplet of water deposited in the center moved with a speed of 3.633 cm/s.

In some embodiments, whereas the isotropic chemical gradients can differentiate between different component mixtures based primarily on their spreading and final puddle size, surfaces with topographic patterns can add another degree of freedom to differentiate mixtures based on the shape of the analyte puddles. In some embodiments, as shown in FIGS. 35A-B, these surfaces can affect the shape of the droplet based on the concentration, and showed a dramatic change in puddle volume at higher concentrations. In some embodiments, this offers yet another avenue for liquid differentiation.

Figure 36:
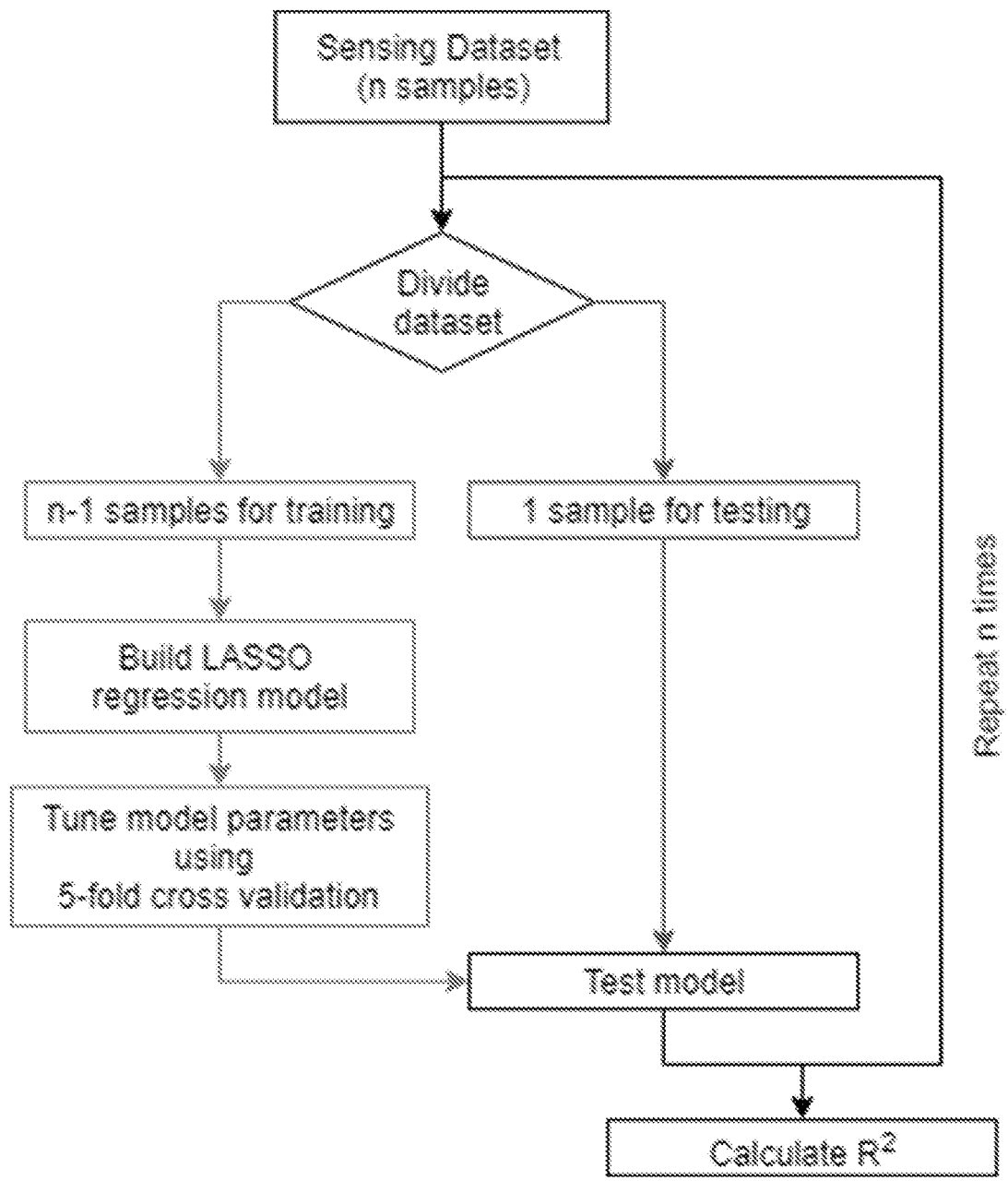
FIG. 36. shows a schematic illustration of the workflow for training a LASSO regression model and calculating the $R^2$ value, according to one or more embodiments.
Figure 37:
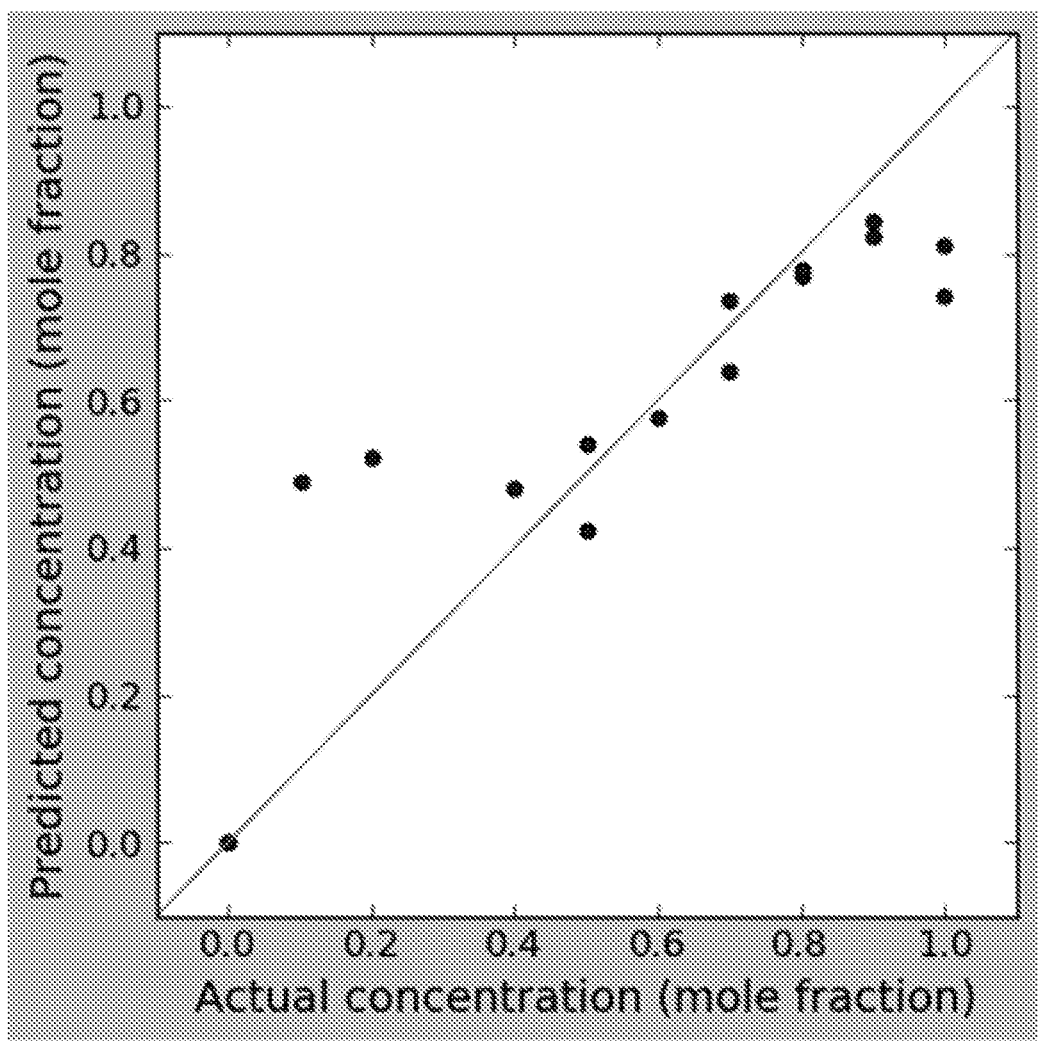
FIG. 37 shows predicted concentrations of ethanol in ethanol/water mixtures compared to the actual concentration, calculated by a LASSO regression model and using a surface with a homogenous chemical functionalization of 13F functionalized silicon, according to one or more embodiments.
Figure 38:
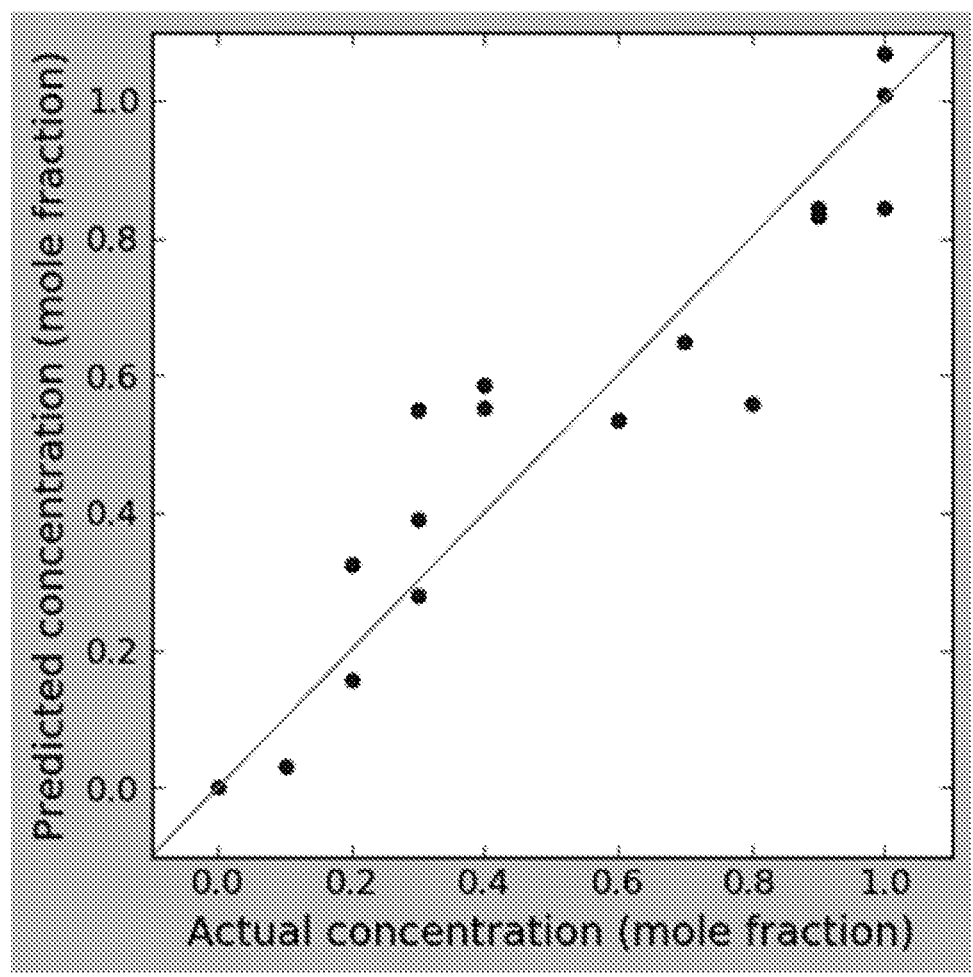
FIG. 38 shows predicted concentrations of ethanol in ethanol/water mixtures compared to the actual concentration, calculated by a LASSO regression model and using a surface with a continuous diffusion-based single-component chemical gradient of 13F functionalization, according to one or more embodiments.

The improvements in the performance of the sensor enabled by the surface modifications were quantified by performing experiments using different concentrations of ethanol with the different surfaces that were prepared. The data was processed using the steps shown in FIG. 36 to ultimately calculate an $R^2$ value for the surface. As shown in FIG. 36, a sensing dataset of "n" samples is divided into 1 sample for testing and "n−1" samples for training, in some embodiments. In the latter embodiments, a LASSO regression model is constructed and the model parameters tuned using 5-fold cross validation. These embodiments together with the 1 sample for testing feed into the test model. In some embodiments, this process is repeated n times, ultimately leading to prediction of a property of a volatile analyte (e.g., concentration) with calculated $R^2$ value. Experiments were performed for the surfaces with homogenous chemical functionalization using 1H,1H,2H,2H-perfluorooctyldimethylchlorosilane (13F) and with a gradient of 1H,1H,2H,2H-perfluorooctyldimethylchlorosilane (13F) functionalization. The result of the experiments performed for the homogenous surface is shown in FIG. 37. For this surface, there were 16 samples tested and the $R^2$ value was 0.81. The results of the experiments performed for the surface with the gradient is shown in FIG. 38. For this surface, there were 17 samples tested and the $R^2$ value was 0.88.

Figure 39:
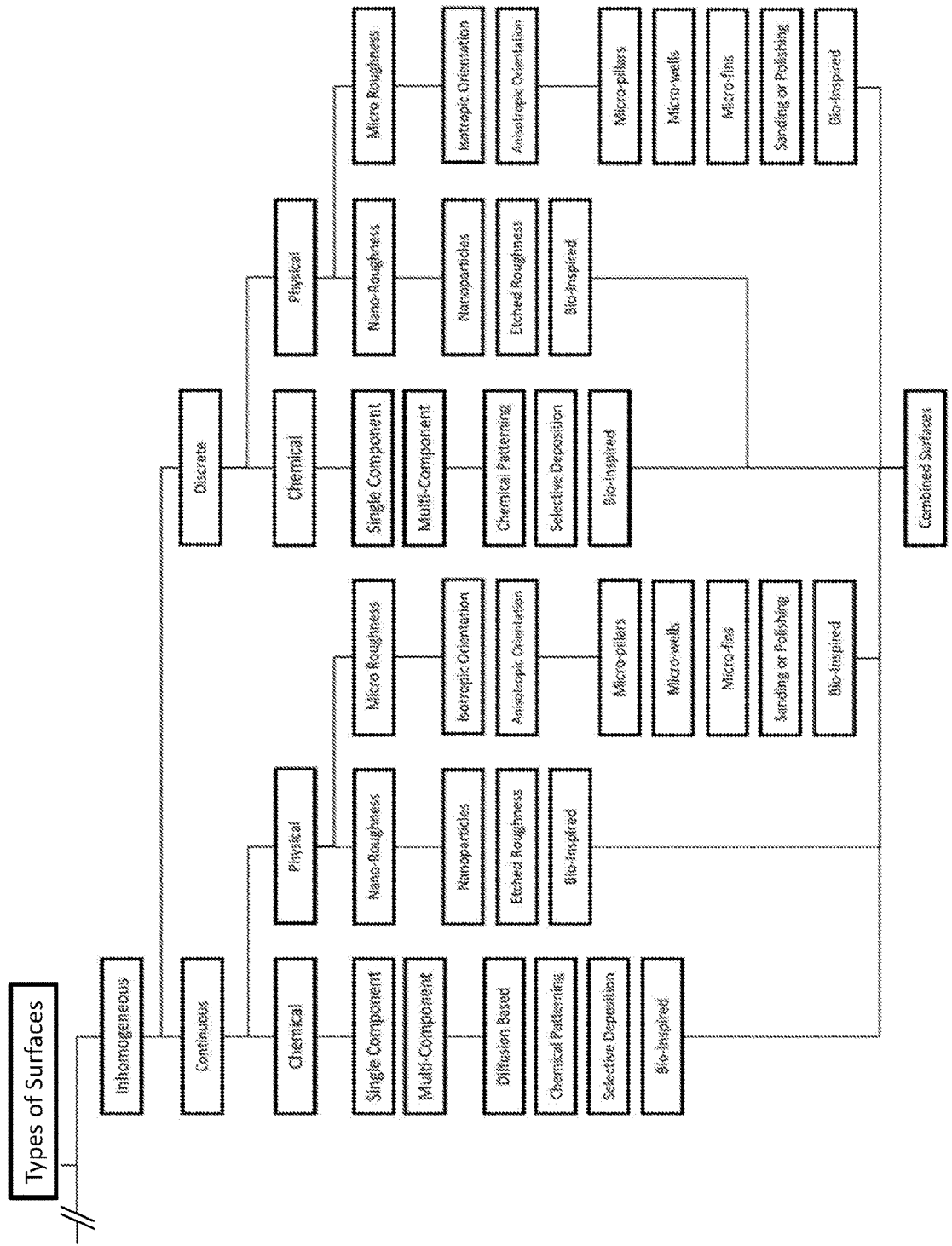
FIG. 39 shows a schematic illustration of surfaces that can be used to enhance the ability of the device to analyze volatile liquid mixtures, according to one or more embodiments.
Figure 39:
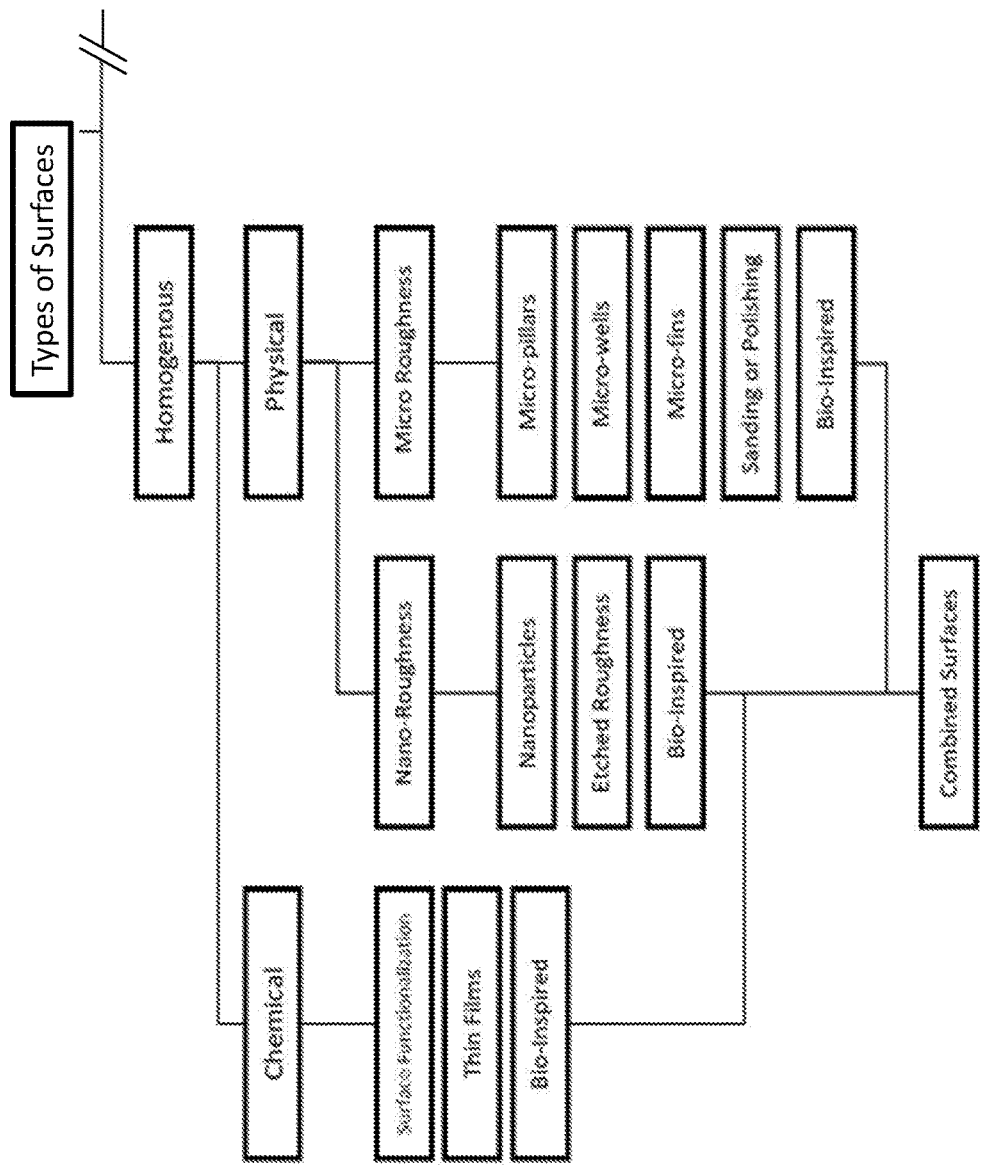

FIG. 39 shows examples of the surfaces that can be manipulated to tune the sensitivity and selectivity of the device and methods disclosed herein for one or more volatile analytes, in accordance with one or more embodiments. Of particular note are the anisotropic surfaces, where, in some embodiments, the surface has a directionality that is a different direction as the direction of the surface tension or contact angle change. In some embodiments, these surfaces can provide differentiation ability beyond that of surface energy or contact angle-related spreading. In some embodiments, there are bio-inspired options in every category that provide new dynamics by drawing on structures and designs found in nature.

In certain embodiments, the non-equilibrium machine-learning-based chemical sensing platform discussed above unlocks a variety of advanced applications, including low-cost hand-held devices for non-invasive diagnosis and therapy, sensors for safeguarding against chemical poisoning and food contamination, and anti-counterfeiting technologies, and provide a rich data-driven methodology for in silico measuring of key physico-chemical properties of the tested analytes.

Physical Modeling of Sensor Responses

In some embodiments, the physical parameters of the tested volatile analyte can be inferred directly from the observed measurement by applying a physical model of the convection, diffusion and, sorption of the tested vapor. In some embodiments, this is useful when the machine learning framework (MLF) library is small or for compounds and mixtures that do not belong to the existing machine learning framework (MLF) library of spatiotemporal responses of the non-equilibrium sensor platform. In some embodiments, this approach is also be useful to predict the parameters for measurements performed at temperatures outside the typical range of the sensor, where the underlying evaporation, diffusion, and adsorption kinetics are different.

In this model, the spectral shift of the photonic sensors was predicted by describing the measurement at three stages: injection, convection-diffusion, and adsorption. In these embodiments, this enabled, for example, matching of the rate of the spectral shift of a given analyte to that for a known analyte, and subsequently enabled the physical properties of the analyte to be inferred. In the first stage, the velocity of convection introduced during injection was modeled. Since the boundary layer movement and evaporation-induced vapor flow can be challenging to model precisely, the velocity profile obtained by image analysis Schlieren experiments (FIG. 3H) was used to derive a phenomenological description before, during, and after injection of the analyte described by the equation:

$$v(t) = \begin{cases} 0, & t < t_{inj,start} \\ a(t - t_{inj,start})\exp\left(-\frac{(t - t_{inj,start})}{\frac{v}{\sigma^2}}\right), & t_{inj,start} < t < t_{inj,end} \\ a(t_{inj,end} - t_{inj,start})\exp\left(-\frac{(t - t_{inj,start})}{\frac{v}{\sigma^2}}\right), & t_{inj,end} < t \end{cases},$$

where v is the kinematic viscosity of the liquid and $\alpha$ and $\sigma$ are fit parameters to describe the injection process and the rate of slowdown due to collisions of gas molecules in the chamber atmosphere.

With the velocity term calculated, the evaporation, convection, and diffusion of the analyte towards the sensor was then modeled. In these embodiments, this modeling is based on numerically solving the convection-diffusion equation, $$\frac{dc}{dt} = D\frac{d^2c}{dx^2} - v(t)\frac{dc}{dx},$$

between x=0 and x=$l_c$ with a constant, initial concentration at x=0, to model evaporation as an semi-infinite source of analyte. In these embodiments, D is the diffusion coefficient of the vapor, $l_c$ is the separation distance between the injection site and the sensor, and v(t) is the velocity profile of the injection. From the numerical solution to the convection diffusion equation, the change in concentration of the analyte over time, c(t), at the surface of the sensor at x=$l_c$ was obtained.

Knowing the concentration of the vapor, c(t), at the surface of the sensor, the adsorption into the sensor was modeled based on Derjaguin-Broekhoff-de Boer theory. Specifically, the four-parametric "isotherm of structural forces" solution, $$\Pi(h) = \Pi_1 \exp\left(-\frac{h}{\lambda_1}\right) + \Pi_2 \exp\left(-\frac{h}{\lambda_2}\right)$$

subject to $$\left.\frac{d\Pi(h)}{dh}\right|_{h=h_c} + \frac{\gamma}{(R - h_c)^2} = 0,$$

were used to derive the adsorption isotherm and formation of a vapor film on the sensor as a function of the pressure relative to the vapor pressure, $$\frac{p}{p_0},$$

of the analyte: ln $$\left(\frac{p}{p_0}\right) = -\frac{V_L}{R_g T}\Pi(h),$$

where $\Pi_1$, $\Pi_2$, $\lambda_1$, $\lambda_2$ are the Derjaguin-Broekhoff-de Boer parameters for a given analyte, $h_c$ and $\gamma$ are the critical film thickness and surface tension of the analyte and R is the pore size of the sensor, $V_L$ is the molar volume, $R_g$ the universal gas constant, and T the absolute temperature. In these embodiments, the film thickness of the analyte is directly proportional to the change in refractive index leading to the spectral shift measured by the photonic sensor. Therefore, in these embodiments, the derivative of the film thickness directly corresponds to the phase derivative measured by the sensor. In these embodiments, physical parameters (e.g., diffusion coefficient, viscosity, and vapor pressure) of the analyte can be obtained by fitting the above set of equations to the derivative of the measured spectral shift by the sensor.

It will be appreciated that while one or more particular materials or steps have been shown and described for purposes of explanation, the materials or steps may be varied in certain respects, or materials or steps may be combined, while still obtaining the desired outcome. Additionally, modifications to the disclosed embodiment and the invention as claimed are possible and within the scope of this disclosed invention. For example, different sensor types and configurations, surface treatments, measurement parameters, data analysis techniques, and other aspects discussed above can be combined in various combinations to tune the apparatus to particular analytes or characteristics to measure, as will be apparent to those of skill in the art.

What is claimed is:

1. A device comprising:
   a chamber having a) an injection site inside the chamber, and b) an opening connecting the chamber to an outside atmosphere;
   an injection port to a) receive injection of a volatile liquid mixture and b) transport the volatile liquid mixture from outside the chamber to the injection site; and
   a sensor at least partially disposed inside the chamber and capable of detecting over time a plurality of non-equilibrium sensor responses when at least one of the following occurs:
   (1) the volatile liquid mixture undergoes accumulation at the injection site,
   (2) the volatile liquid mixture undergoes movement away from the injection site, wherein the movement comprises spreading and wetting of one or more surfaces of the inside of the chamber,
   (3) the volatile liquid mixture undergoes evaporation into a plurality of vaporized analytes, wherein the plurality of vaporized analytes undergoes convection and diffusion throughout the inside of the chamber, and
   (4) the volatile liquid mixture and/or at least one of the plurality of vaporized analytes undergoes sorption onto the sensor;
   wherein each of the plurality of non-equilibrium sensor responses corresponds to at least one of the spreading and wetting, the evaporation, the convection, the diffusion, and the sorption;
   wherein, during the detection of the plurality of non-equilibrium sensor responses, the opening is configured to allow molecular exchange between the chamber and the atmosphere; and
   wherein the plurality of non-equilibrium sensor responses is indicative of a composition or property of the volatile liquid mixture, or a change over time thereof.

2. The device of claim 1, wherein the composition is a chemical composition and the property is a physical property, selected from the group consisting of vapor pressure, boiling point, flash point, viscosity, water content, corrosivity, petroleum testing parameters, and a combination thereof.

3. The device of claim 1, wherein the accumulation, the spreading and wetting, the evaporation, the sorption, or a combination thereof corresponds to the composition, the property, or a combination thereof.

4. The device of claim 1, wherein the sensor comprises a non-porous material configured to, upon sorption of at least one of the plurality of vaporized analytes onto the sensor, undergo at least one of a physical modification and a chemical modification.

5. The device of claim 4, wherein the physical or the chemical modification comprises at least one of a density change, a refractive index change, or a combination thereof.

6. The device of claim 1, wherein the sensor comprises a plurality of layers disposed on a substrate, the plurality of layers comprising at least a first layer and a second layer.

7. The device of claim 6, wherein the plurality of layers comprises 1 to 50 layers.

8. The device of claim 6, wherein the first layer comprises a plurality of first porogens and the second layer comprises a plurality of second porogens, the first layer comprising a plurality of first pores defined by interstitial spaces between the plurality of first porogens and the second layer comprising a plurality of second pores defined by interstitial spaces between the plurality of second porogens.

9. The device of claim 8, wherein the plurality of first pores and the plurality of second pores each have a dimension between about 0.1 nm and about 500 nm.

10. The device of claim 6, wherein the first layer comprises a plurality of first nanoparticles and the second layer comprises a plurality of second nanoparticles, the first layer comprising a plurality of first pores defined by interstitial spaces between the plurality of first nanoparticles and the second layer comprising a plurality of second pores defined by interstitial spaces between the plurality of second nanoparticles.

11. The device of claim 10, wherein the plurality of first nanoparticles comprise silica and the plurality of second nanoparticles comprise titania.

12. The device of claim 6, wherein the substrate comprises glass and at least one of the plurality of layers is chemically functionalized.

13. The device of claim 6, wherein the first layer comprises a first non-porous vapor-responsive material and the second layer comprises a second non-porous vapor-responsive material.

14. The device of claim 1, wherein the sensor is selected from the group consisting of a photonic crystal, a field effect transistor, a nanogenerator, and a photomechatronic nanostructure.

15. The device of claim 14, wherein the photonic crystal comprises a 1-dimensional, a 2-dimensional, or a 3-dimensional porous photonic crystal.

16. The device of claim 14, wherein the photomechatronic nanostructure comprises at least one of a surface-acoustic-wave-actuated piezo-electric nanogenerator or a triboelectric photonic nanogenerator.

17. The device of claim 1, wherein the surface of the inside of the chamber has at least one nanoscale or microscale chemical pattern and/or at least one nanoscale or microscale topography pattern, wherein the at least one chemical pattern and topography pattern are independently homogeneous or inhomogeneous.

18. The device of claim 1, wherein one or more of the plurality of non-equilibrium sensor responses comprises a spectral response, a bandgap shift, a color change, or a combination thereof.

19. The device of claim 18, further comprising a spectrophotometer and/or a camera configured to detect the spectral response, the bandgap shift, the color change, or the combination thereof.

20. The device of claim 1, further comprising at least one processor configured to run one or more machine learning algorithms on data representing the plurality of non-equilibrium sensor responses;
    wherein the one or more machine learning algorithms is capable of predicting, determining, or measuring the composition and/or the property of the volatile liquid mixture based on discriminating and independent features of the data representing the plurality of non-equilibrium sensor responses; and
    wherein the one or more machine learning algorithms comprises a pattern recognition, a classification, a regression, a segmented regression, or a combination thereof.

21. The device of claim 20, wherein the one or more machine learning algorithms are selected from the group consisting of least absolute shrinkage and selection operator (LASSO), kernel ridge regression, decision trees, bagging classifiers, multiclass logistic regression, principle component analysis, linear discriminant analysis, supervised machine learning, semi-supervised machine learning, non-supervised machine learning, support vector machines, transfer learning neural networks, segmented regression, and a combination thereof.

22. The device of claim 1, wherein the sensor is further capable of detecting one or more non-volatile contaminants in the volatile liquid mixture by measuring the concentration of, one or more physical properties of, and/or the chemical composition of, or changes over time thereof, of the one or more non-volatile contaminants.

23. The device of claim 22, wherein the one or more non-volatile contaminants is water, hydrogen sulfide, metals, biological substances, agricultural substances, sediments, or a combination thereof.

24. The device of claim 22, wherein the concentration of, one or more physical properties of, and/or the chemical composition of, or changes over time thereof, of the one or more non-volatile contaminants are predicted by one or more machine learning algorithms.

25. The device of claim 1, wherein the composition or the property of the volatile liquid mixture is determined by comparing one or more of the plurality of non-equilibrium sensor responses to a library of non-equilibrium sensor responses.

26. The device of claim 1, wherein the change over time of the composition or the property of the volatile liquid mixture is determined by applying a mathematical model of the composition or the property to one or more of the plurality of non-equilibrium sensor responses.

27. The device of claim 1, wherein the opening comprises a tube.

28. A method for analyzing a volatile liquid mixture, the method comprising:
    providing a sensor including a substrate and a sensor material, wherein the sensor is partially disposed within a chamber;
    injecting an analyte liquid into an injection port, wherein the injection port transports the analyte liquid from outside the chamber to inside the chamber;
    storing the analyte liquid in the chamber for a duration sufficient to achieve at least one of the following:
        (1) movement of the analyte liquid, including spreading and wetting at the surface at the bottom of the inside of the chamber from the source of the injection,
        (2) evaporation of at least a portion of the analyte liquid into a vaporized analyte,
        (3) convection and diffusion of the vaporized analyte through the chamber to the sensor, and
        (4) sorption of the vaporized analyte on the sensor material;
    detecting, over time and by the sensor, a plurality of non-equilibrium sensor responses, each of the plurality of non-equilibrium sensor responses corresponding to at least one of the spreading and wetting, the evaporation, the diffusion, and the sorption;
    allowing molecular exchange between the chamber and the atmosphere during the detection of the plurality of non-equilibrium sensor responses; and
    determining a compositional change in the analyte liquid based on the plurality of non-equilibrium sensor responses.

* * * * *